(12) United States Patent
Knight et al.

(10) Patent No.: US 8,289,440 B2
(45) Date of Patent: Oct. 16, 2012

(54) LIGHT FIELD DATA ACQUISITION DEVICES, AND METHODS OF USING AND MANUFACTURING SAME

(75) Inventors: Timothy J. Knight, Palo Alto, CA (US);
Yi-Ren Ng, San Mateo, CA (US);
Colvin Pitts, Mountain View, CA (US)

(73) Assignee: Lytro, Inc., Mountain View, CA (US)

( * ) Notice: Subject to any disclaimer, the term of this patent is extended or adjusted under 35 U.S.C. 154(b) by 479 days.

(21) Appl. No.: 12/632,979

(22) Filed: Dec. 8, 2009

(65) Prior Publication Data

US 2010/0141802 A1    Jun. 10, 2010

Related U.S. Application Data

(60) Provisional application No. 61/120,530, filed on Dec. 8, 2008, provisional application No. 61/170,620, filed on Apr. 18, 2009.

(51) Int. Cl.
*H04N 5/232* (2006.01)
*H04N 5/225* (2006.01)
*H04N 5/228* (2006.01)
*G03B 13/00* (2006.01)

(52) U.S. Cl. ...... 348/349; 348/345; 348/340; 348/222.1

(58) Field of Classification Search .................. None
See application file for complete search history.

(56) References Cited

U.S. PATENT DOCUMENTS

| 725,567 A | 4/1903 | Ives |
| 4,383,170 A | 5/1983 | Takagi et al. |
| 4,661,986 A | 4/1987 | Adelson |
| 4,694,185 A | 9/1987 | Weiss |
| 4,920,419 A | 4/1990 | Easterly |

(Continued)

FOREIGN PATENT DOCUMENTS

DE      19624421      6/1996

(Continued)

OTHER PUBLICATIONS

Yi-Ren Ng, Digital Light Field Photography, Doctoral Thesis, Stanford University, 2006 (203 pages).

(Continued)

*Primary Examiner* — Justin P Misleh
(74) *Attorney, Agent, or Firm* — Raubvogel Law Office

(57) ABSTRACT

A light field data acquisition device includes optics and a sensor to acquire light field image data of a scene. In at least one embodiment, the sensor is located at a substantially fixed, predetermined location relative to the focal point of the optics. The device determines a first virtual focus depth different from an optical focus depth of the light field image data, and automatically generates and outputs data representative of a first image of the scene at the first virtual focus depth. In response to user input, the device determines a second virtual focus depth and generates data representative of a second image of the scene at the second virtual focus depth.

36 Claims, 35 Drawing Sheets

U.S. PATENT DOCUMENTS

| | | | |
|---|---|---|---|
| 5,076,687 A | 12/1991 | Adelson | |
| 5,282,045 A | 1/1994 | Mimura et al. | |
| 5,748,371 A | 5/1998 | Cathey, Jr. et al. | |
| 5,757,423 A | 5/1998 | Tanaka et al. | |
| 5,949,433 A | 9/1999 | Klotz | |
| 6,023,523 A | 2/2000 | Cohen et al. | |
| 6,028,606 A | 2/2000 | Kolb et al. | |
| 6,097,394 A | 8/2000 | Levoy et al. | |
| 6,201,899 B1 | 3/2001 | Bergen | |
| 6,320,979 B1 | 11/2001 | Melen | |
| 6,483,535 B1 | 11/2002 | Tamburrino et al. | |
| 6,577,342 B1 | 6/2003 | Webster | |
| 6,597,859 B1 | 7/2003 | Leinhardt et al. | |
| 6,842,297 B2 | 1/2005 | Dowski, Jr. et al. | |
| 6,900,841 B1 | 5/2005 | Mihara | |
| 6,927,922 B2 | 8/2005 | George et al. | |
| 7,034,866 B1 | 4/2006 | Colmenarez et al. | |
| 7,336,430 B2 | 2/2008 | George et al. | |
| 7,620,309 B2 | 11/2009 | Georgiev | |
| 7,623,726 B1 | 11/2009 | Georgiev | |
| 7,723,662 B2 * | 5/2010 | Levoy et al. | 250/208.1 |
| 7,936,392 B2 * | 5/2011 | Ng et al. | 348/349 |
| 2002/0159030 A1 | 10/2002 | Frey et al. | |
| 2003/0103670 A1 | 6/2003 | Schoelkopf et al. | |
| 2003/0117511 A1 | 6/2003 | Belz et al. | |
| 2003/0156077 A1 | 8/2003 | Balogh | |
| 2004/0114176 A1 | 6/2004 | Bodin et al. | |
| 2004/0257360 A1 | 12/2004 | Sieckmann | |
| 2005/0080602 A1 | 4/2005 | Snyder et al. | |
| 2007/0071316 A1 | 3/2007 | Kubo | |
| 2007/0230944 A1 * | 10/2007 | Georgiev | 396/322 |
| 2007/0252074 A1 | 11/2007 | Ng et al. | |
| 2008/0007626 A1 * | 1/2008 | Wernersson | 348/211.9 |
| 2008/0018668 A1 | 1/2008 | Yamauchi | |
| 2008/0131019 A1 | 6/2008 | Ng | |
| 2008/0180792 A1 | 7/2008 | Georgiev | |
| 2008/0187305 A1 * | 8/2008 | Raskar et al. | 396/268 |
| 2008/0193026 A1 | 8/2008 | Horie et al. | |
| 2008/0226274 A1 | 9/2008 | Spielberg | |
| 2008/0266655 A1 | 10/2008 | Levoy et al. | |
| 2008/0309813 A1 * | 12/2008 | Watanabe | 348/340 |
| 2009/0027542 A1 * | 1/2009 | Yamamoto et al. | 348/340 |
| 2009/0041381 A1 | 2/2009 | Georgiev et al. | |
| 2009/0041448 A1 | 2/2009 | Georgiev et al. | |
| 2009/0102956 A1 | 4/2009 | Georgiev | |
| 2009/0128658 A1 * | 5/2009 | Hayasaka et al. | 348/222.1 |
| 2009/0128669 A1 | 5/2009 | Ng et al. | |
| 2009/0140131 A1 | 6/2009 | Utagawa | |
| 2009/0185801 A1 | 7/2009 | Georgiev et al. | |
| 2009/0268970 A1 | 10/2009 | Babacan et al. | |
| 2009/0273843 A1 * | 11/2009 | Raskar et al. | 359/601 |
| 2009/0295829 A1 | 12/2009 | Georgiev et al. | |
| 2010/0026852 A1 | 2/2010 | Ng et al. | |
| 2010/0128145 A1 | 5/2010 | Pitts et al. | |
| 2010/0129048 A1 | 5/2010 | Pitts et al. | |

FOREIGN PATENT DOCUMENTS

| | | |
|---|---|---|
| WO | WO 03/052465 | 6/2003 |
| WO | 2006039486 | 4/2006 |
| WO | 2007092545 | 8/2007 |
| WO | 2007092581 | 8/2007 |

OTHER PUBLICATIONS

Ng, "Light Field Photography with a Hand-held Plenoptic Camera" Stanford Tech Report CTSR Feb. 2005, pp. 1-11.

Ng et al., "Fourier Slice Photography" ACM Transactions on Graphics, Proceedings of SIGGRAPH 2005, vol. 24, No. 3, 2005, pp. 735-744.

Vaish et al., "Using plane + parallax for calibrating dense camera arrays", In Proceedings CVPR 2004, pp. 2-9.

Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.

Jin-Xiang Chai et al., "Plenoptic Sampling", ACM SIGGRAPH 2000, Annual Conference Series, 2000, pp. 307-318.

Jackson et al., "Selection of a Convolution Function for Fourier Inversion Using Gridding" IEEE Transactions on Medical Imaging, Sep. 1991, vol. 10, No. 3, pp. 473-478.

Naemura et al., "3-D Computer Graphics based on Integral Photography" Optics Express, Feb. 12, 2001. vol. 8, No. 2, pp. 255-262.

Okano et al., "Three-dimensional video system based on integral photography" Optical Engineering, Jun. 1999. vol. 38, No. 6, pp. 1072-1077.

Adelson et al., "Single Lens Stereo with a Plenoptic Camera" IEEE Translation on Pattern Analysis and Machine Intelligence, Feb. 1992. vol. 14, No. 2, pp. 99-106.

Levoy et al., "Light Field Rendering" SIGGRAPH 96 Proceeding, 1996. pp. 31-42.

Isaksen et al., "Dynamically Reparameterized Light Fields" SIGGRAPH 2000, Computer Graphics Proceedings. 10 pgs.

Agarwala et al., "Interactive Digital Photomontage" ACM SIGGRAPH 2004, vol. 23, No. 3, pp. 292-300.

Haeberli, "A Multifocus Method for Controlling Depth of Field" GRAPHICA Obscura, 1994, pp. 1-3.

Dowski et al., "Wavefront coding: a modern method of achieving high performance and/or low cost imaging systems" SPIE Proceedings, vol. 3779.

Georgeiv, et al. "Spatio-Angular Resolution Tradeoff in Integral Photography" Proceedings of Eurographics Symposium on Rendering, 2006.

Tanida et al., "Thin observation module by bound optics (TOMBO): concept and experimental verification" Applied Optics 40, 11 (April), pp. 1806-1813.

Gortler et al., "The lumigraph" SIGGRAPH 96, pp. 43-54.

Lumsdaine et al., "Full Resolution Lightfield Rendering" Adobe Technical Report Jan. 2008, pp. 1-12.

Levoy, "Light Fields and Computational Imaging" IEEE Computer Society, Aug. 2006, pp. 46-55.

Lippmann, "Reversible Prints", Communication at the French Society of Physics, Journal of Physics, 7, 4, Mar. 1908, pp. 821-825.

Sokolov, "Autostereoscopy and Integral Photography by Professor Lippmann's Method", 1911, pp. 23-29.

Levoy, M., et al., "Light Field Microscopy," ACM Transactions on Graphics, vol. 25, No. 3, Proceedings SIGGRAPH 2006.

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.

* cited by examiner

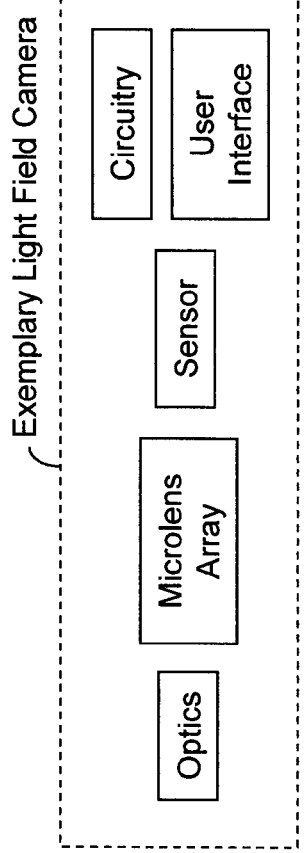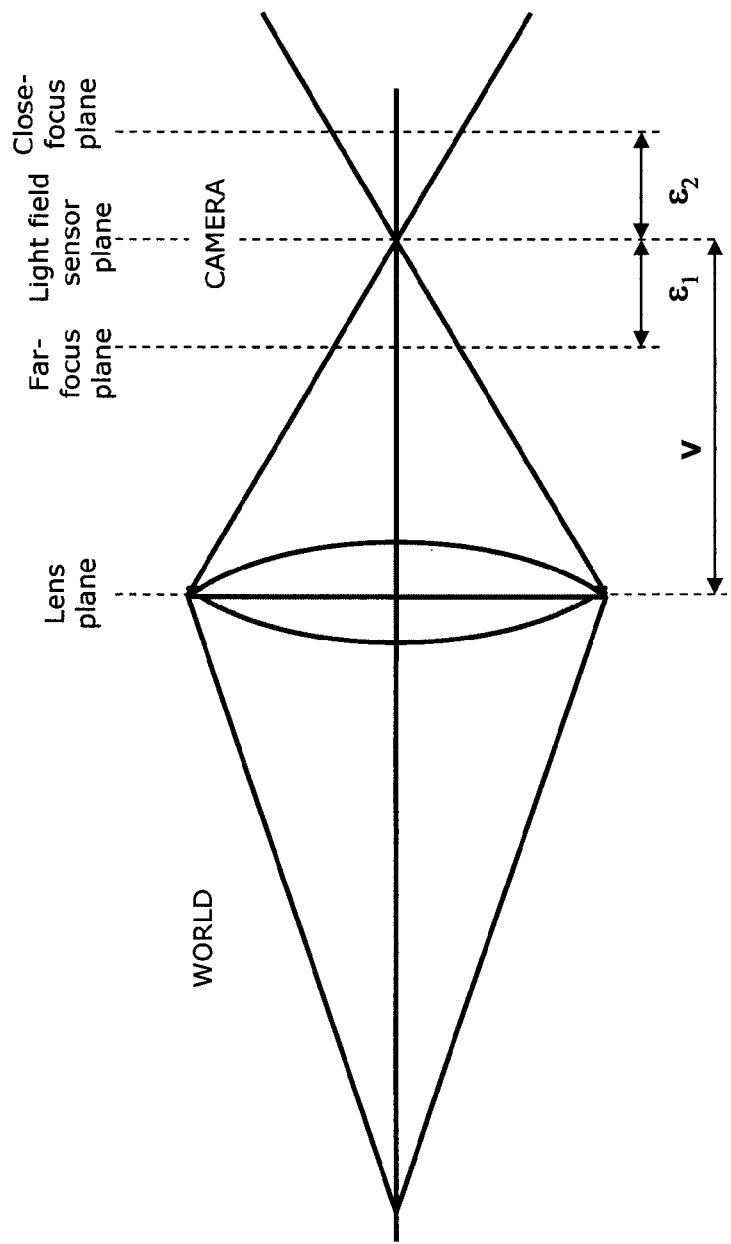

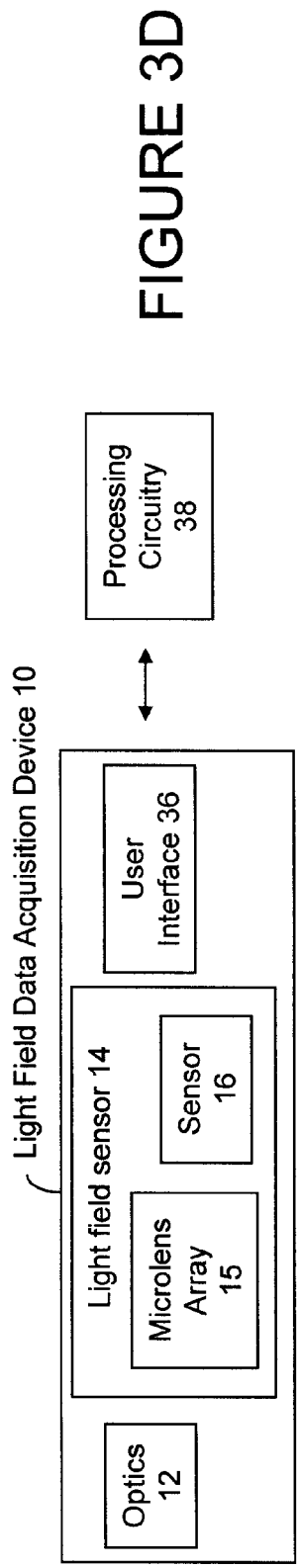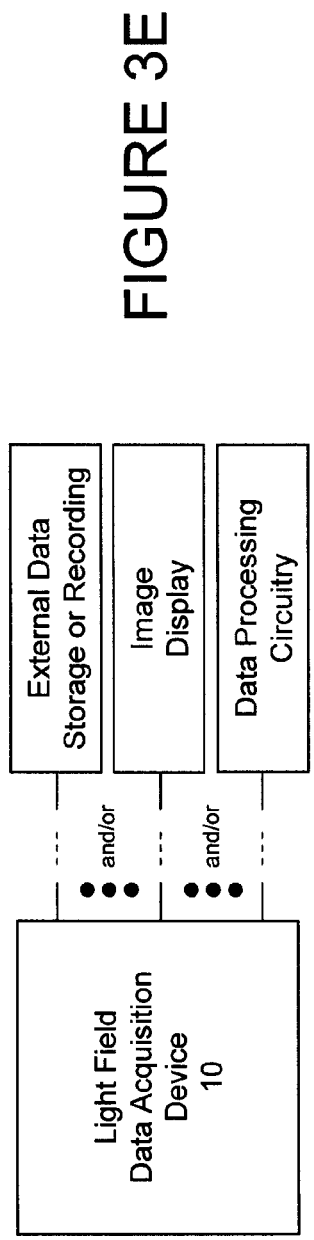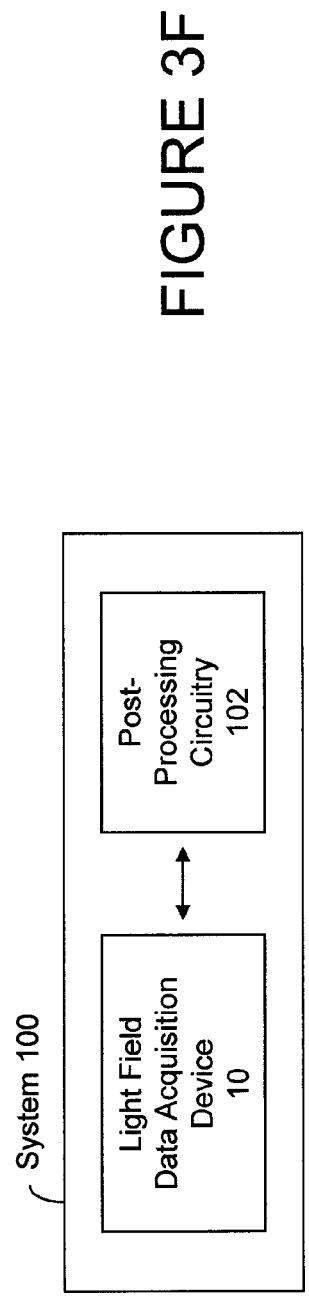

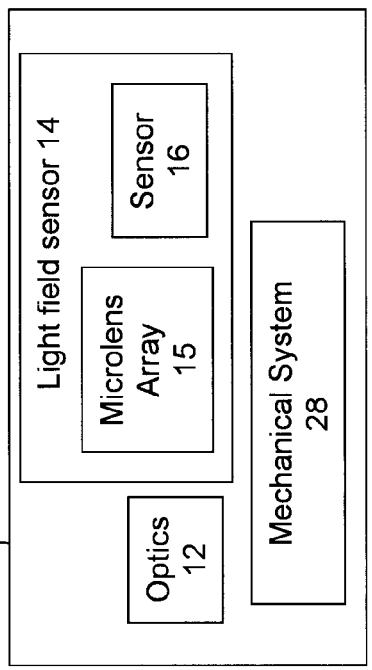
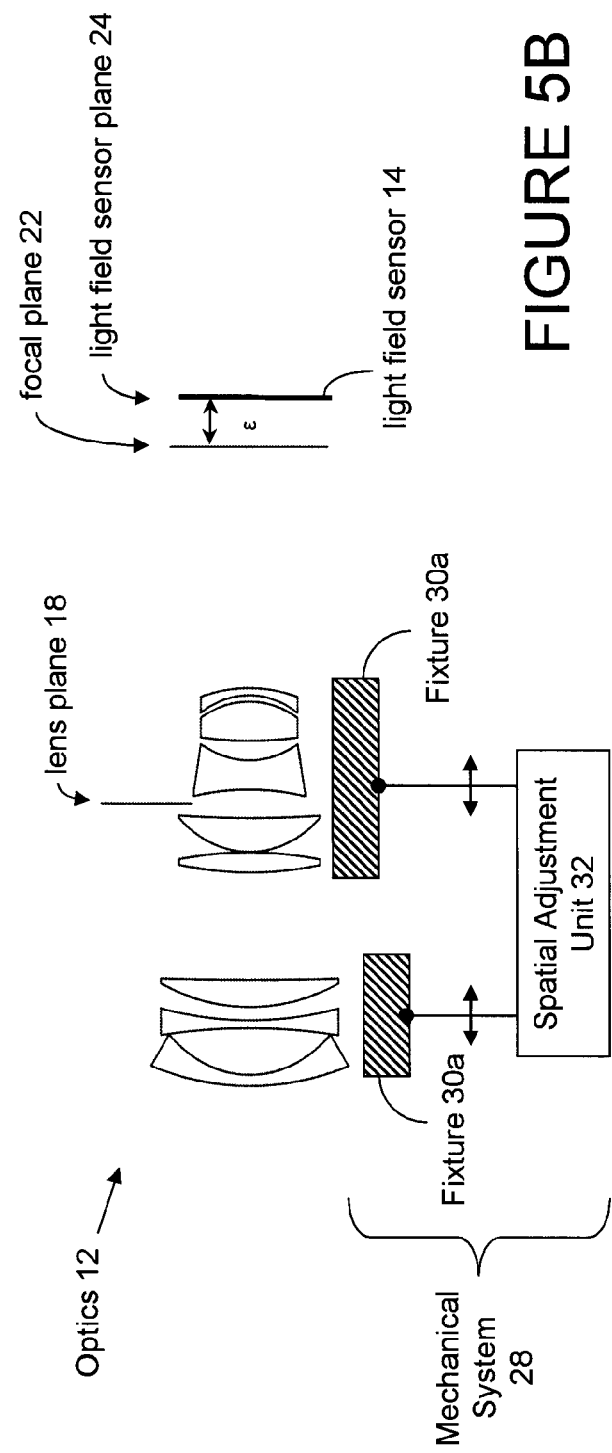
FIGURE 5A
FIGURE 5B

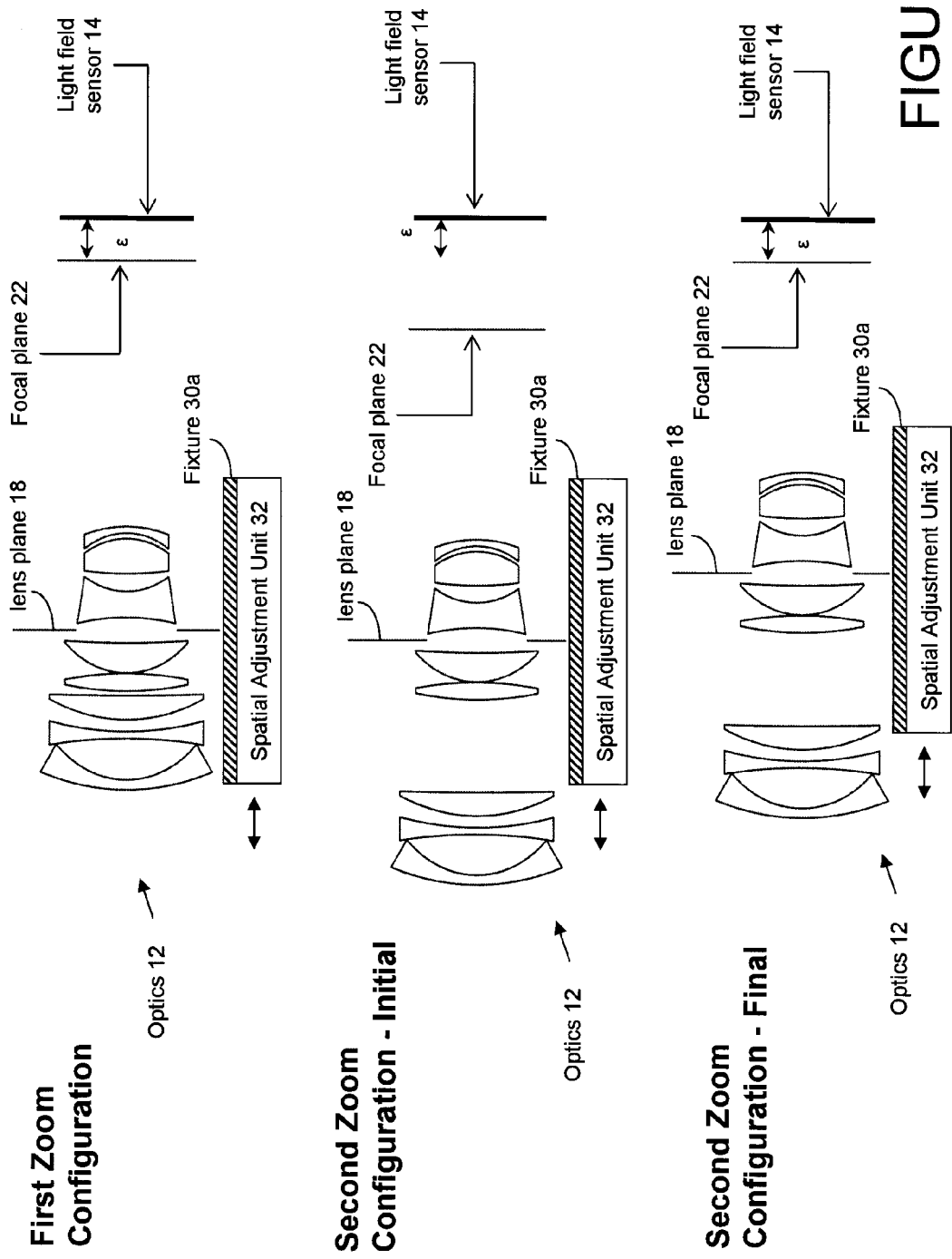

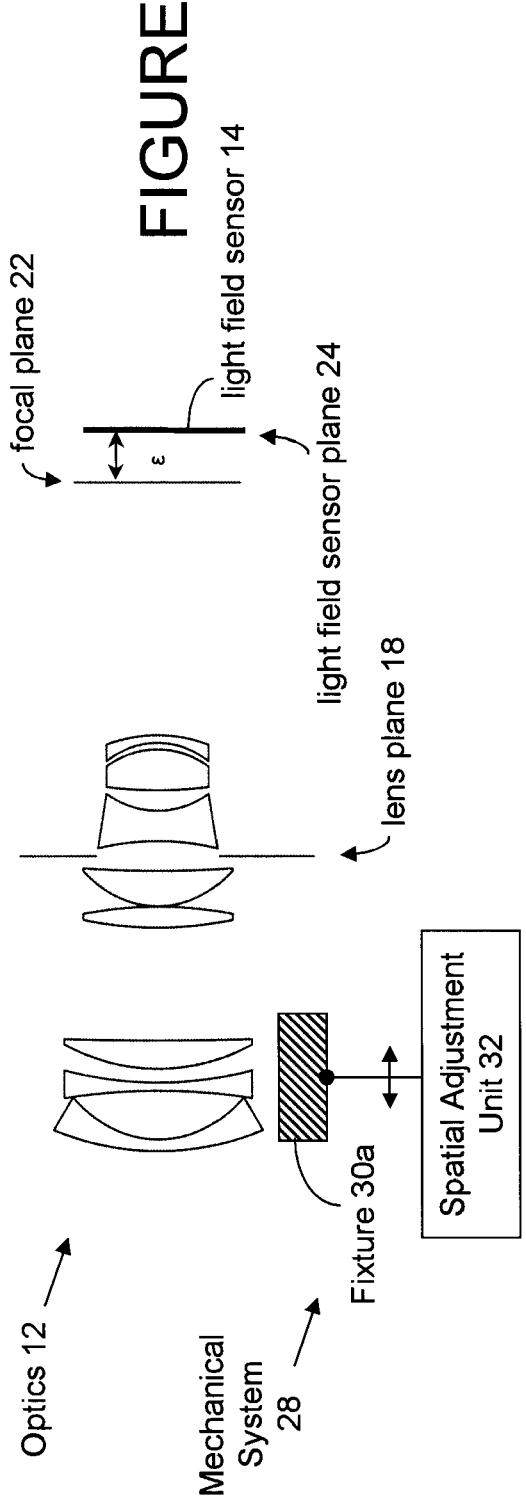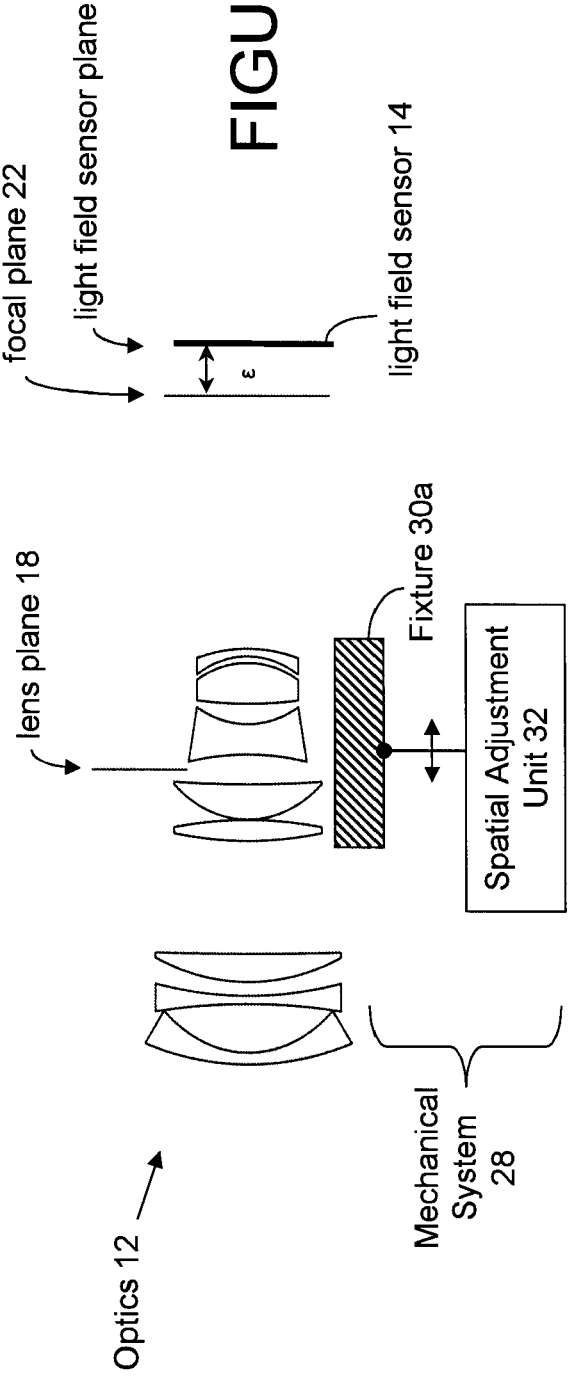

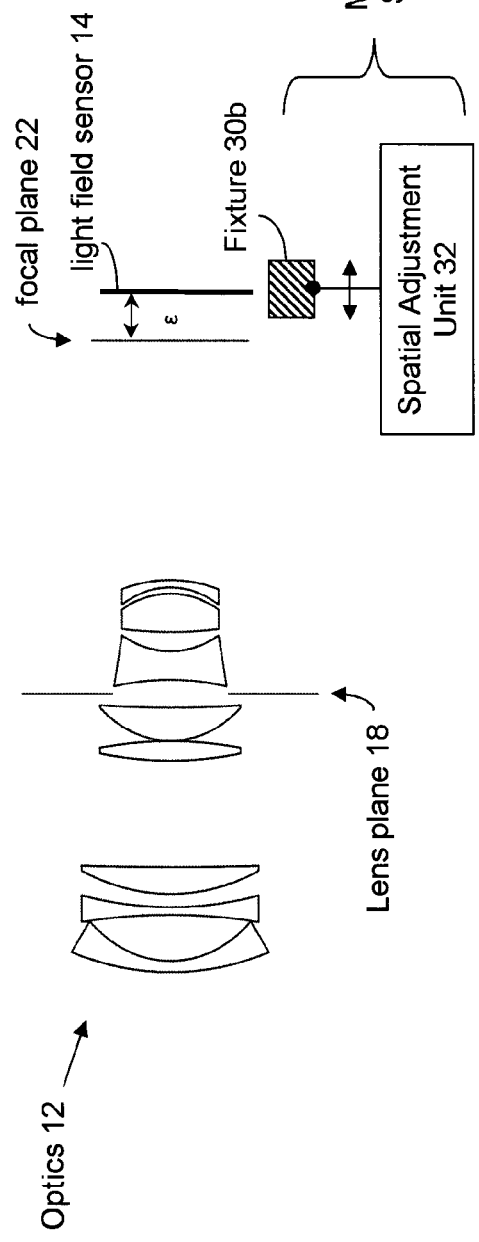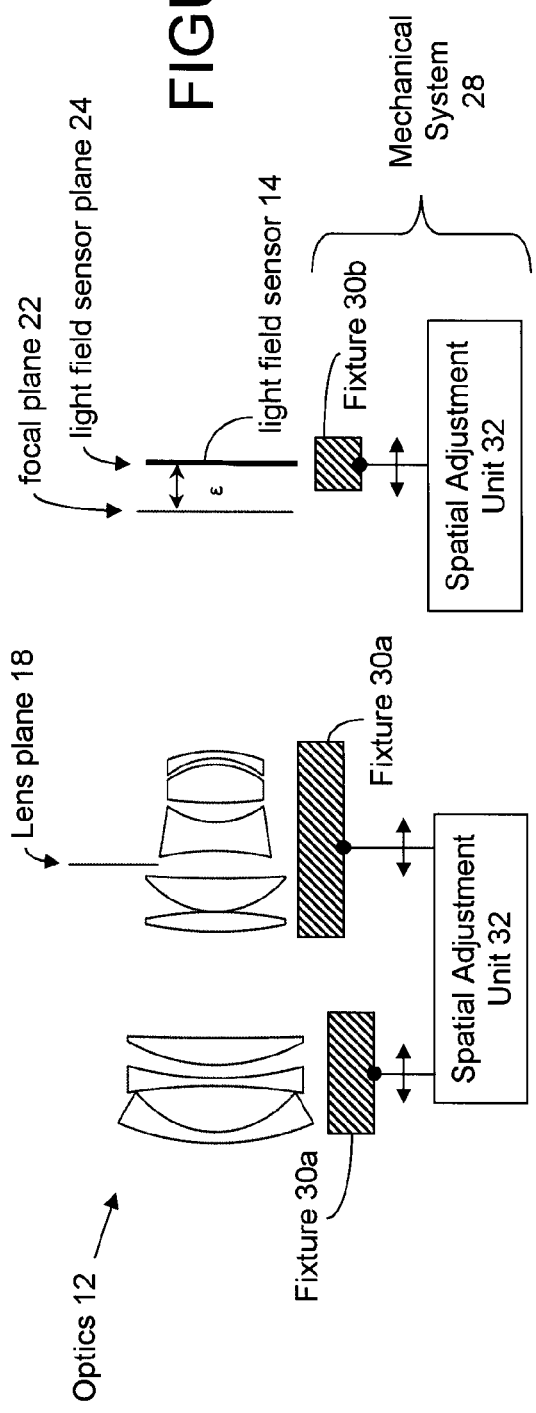

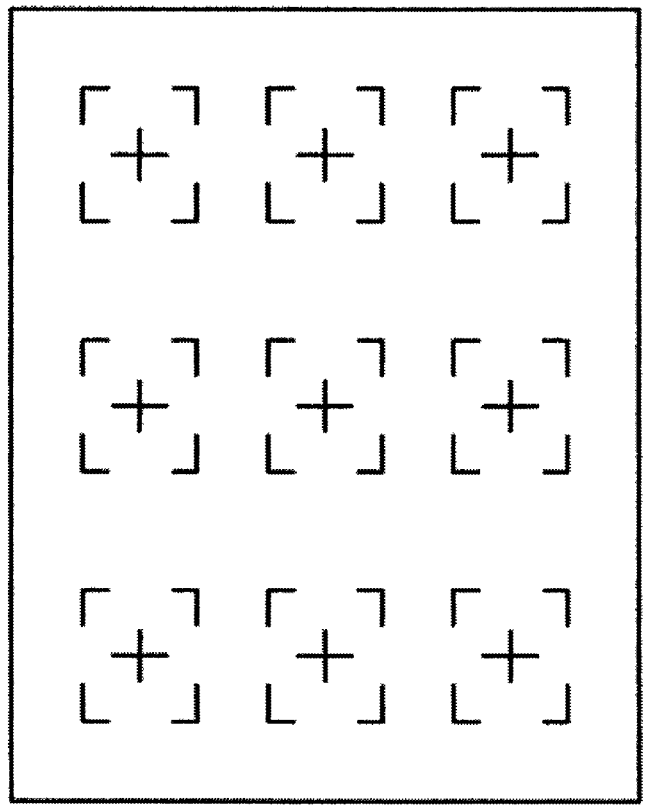
FIGURE 12

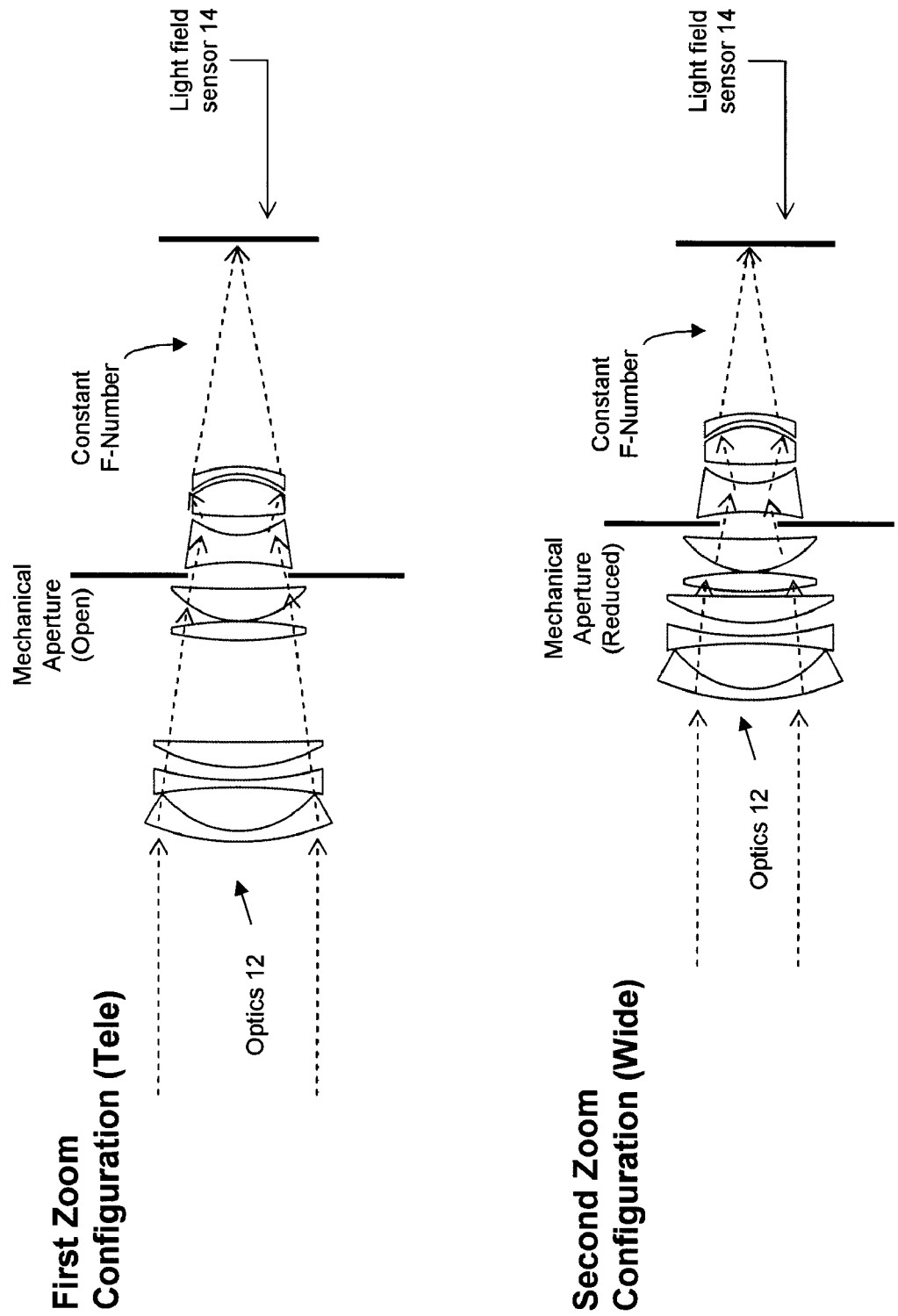

LIGHT FIELD DATA ACQUISITION DEVICES, AND METHODS OF USING AND MANUFACTURING SAME

RELATED APPLICATION

This application claims priority to U.S. Provisional Application Ser. No. 61/120,530, entitled "Light Field Camera and System, and Methods of Using and Manufacturing Same", filed Dec. 8, 2008; and U.S. Provisional Application Ser. No. 61/170,620, entitled "Light Field Camera Image, File and Configuration Data, and Method of Using, Storing and Communicating Same", filed Apr. 18, 2009. The contents of these provisional applications are incorporated by reference herein, in their entirety.

INTRODUCTION

In one aspect, the present inventions are directed to, among other things, light field data acquisition devices (for example, light field cameras) and methods of using and manufacturing such devices. In another aspect, the present inventions are directed to characteristics, parameters and configurations of light field data acquisition devices, and methods of using and manufacturing same. Notably, light field data acquisition devices obtain, acquire, generate, manipulate and/or edit (for example, adjust, select, define and/or redefine the focus and/or depth of field—after initial acquisition or recording of the image data and/or information) image data and/or information of, for example, a scene. (See, for example, United States Patent Application Publication 2007/0252074, and the provisional application to which it claims priority, and Ren Ng's PhD dissertation, "Digital Light Field Photography", Stanford University 2006, all of which are incorporated here in their entirety by reference; and the block diagram illustration of a light field camera in FIG. 1).

Optical Notation

A typical characteristic of a light field data acquisition device provides the user the ability to compute images that are sharply focused over a range of depths, corresponding to a range of virtual image planes about the physical plane where the light field sensor was positioned. With reference to FIG. 2A, this range of sharp focusing corresponds to the range of (virtual) image plane depths a distance of $\epsilon$ about the physical light field sensor plane. In FIG. 2A:

Lens plane may be characterized as the principal plane of the lens; it may be advantageous to employ thin-lens simplifications of lenses in the illustrative diagrams, although the concepts apply to any lens configuration and/or system;

Far-focus plane may be characterized as the virtual plane optically conjugate to the furthest objects in the world that can be brought into a predetermined focus, for example, sharply into focus) using post image data acquisition focusing techniques of the light field;

Focal plane may be characterized as the plane in which rays emanating from optical infinity are brought into sharpest focus by the optics.

Light field sensor plane may be characterized as the plane in the data acquisition device where the principal plane of the microlens array in the light field sensor (e.g. microlens array and image sensor assembly) is physically located;

Close-focus plane may be characterized as the virtual plane optically conjugate to the closest objects in the world that can be brought sharply into focus through software focusing of the light field;

v is equal to the distance between the lens plane and the light field sensor plane; and $\epsilon_1$ and $\epsilon_2$ are equal to the maximum distances from the light field sensor plane that can be focused sharply after exposure—that is, after acquisition of image data.

Notably, in FIG. 2A, the "world" or everything outside of the light field data acquisition device is drawn to the left of the lens plane, and the device internals are illustrated to the right of the lens plane. Moreover, FIG. 2A is not drawn to scale; indeed, $\epsilon_1$ and $\epsilon_2$ are often smaller than v (for example, $\epsilon_1 < 0.01*v$ and $\epsilon_2 < 0.01*v$).

As intimated herein, although the present inventions are often described in the context of a light field capture system or device, which acquire or obtain refocusable data or information and/or processes or methods of acquiring, generating, manipulating and/or editing such refocusable image data or information (i.e., post image data acquisition focusing techniques), it should be clear that the present inventions are applicable to other systems, devices, processes and/or methods of acquiring, generating, manipulating and/or editing refocusable image data or information. In this regard, refocusable image data or information are image data or information, no matter how acquired or obtained, that may be focused and/or re-focused after acquisition or recording of the data or information. For example, in one embodiment, refocusable image data or information is/are light field data or information acquired or obtained, for example, via a light field data acquisition device.

SUMMARY OF CERTAIN ASPECTS OF THE INVENTIONS

There are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

Briefly, a light field data acquisition device according to certain aspects and/or embodiments of the present inventions includes device optics (e.g. one or more lenses of any kind or type), sensors to obtain and/or acquire the light field data or information, and circuitry to process the light field data or information. For example, in one embodiment of the present inventions, a light field data acquisition device includes optics, having one or more, or all of the following elements/features:

a. Main lens such as the image-forming lens on a conventional camera; and/or b. Image sensor fixed at "light field hyperfocal" distance; and/or c. Microlens having a predetermined resolution, for example, a resolution determined using one or more of the techniques of using a human face or other selected, desired or predetermined object or subject as the field of view size of a predetermined refocusable distance (for example, a closest refocusable distance). The microlens array may correspond to, for example, an array of convex, image-forming lenses, and it may be positioned between the main lens and the image sensor at a separation from the sensor surface of approximately the focal length of each microlens in the microlens array.

In such a light field data acquisition device, the sensor and microlens assembly may be referred to herein as a "light field sensor." (See, for example, FIG. 2B).

In other aspects and/or embodiments, the data acquisition device according to certain aspects and/or embodiments of the present inventions includes circuitry (for example, properly programmed processing circuitry) to generate, manipulate and/or edit (for example, adjust, select, define and/or redefine the focus and/or depth of field—after initial acquisition or recording of the image data and/or information) image data and/or information of, for example, a scene.

Notably, the term "circuit" may mean, among other things, a single component (for example, electrical/electronic) or a multiplicity of components (whether in integrated circuit form, discrete form or otherwise), which are active and/or passive, and which are coupled together to provide or perform a desired function or operation. The term "circuitry" may mean, among other things, a circuit (whether integrated, discrete or otherwise), a group of such circuits, one or more processors (digital signal processors (DSPs)), one or more state machines, one or more processors implementing software, one or more Application-Specific Integrated Circuits (ASICs), one or more programmable gate arrays (PGAs) (for example, field-programmable gate arrays (FPGAs), and/or a combination of one or more circuits (whether integrated, discrete or otherwise), one or more state machines, one or more processors, and/or one or more processors implementing software, one or more ASICs, one or more PGAs. Moreover, the term "optics" means a system comprising a plurality of components used to affect the propagation of light, including but not limited to lens elements, windows, apertures and mirrors.

The light field data acquisition device according to certain aspects and/or embodiments of the present inventions may include "automatic focusing" after acquisition of the image data or information (i.e., after the shot has been taken). The "automatic focusing" may employ various techniques including but not limited to:
 a. Scene analysis auto-focus;
 b. Scene analysis depth of field selection; and/or
 c. Scene analysis tilt/shift focal plane selection.

As such, in this embodiment, processing circuitry in the light field data acquisition device, may determine, calculate, assess, generate, derive and/or estimate one or more predetermined, appropriate and/or selected focus(es) (i.e., one or more (virtual) image plane depths or focal planes) after acquisition of the image data or information (i.e., after the shot has been taken), based on, for example, an analysis of one or more characteristics of the scene corresponding to the image data or information.

In addition thereto, or in lieu thereof, the light field data acquisition device according to certain aspects and/or embodiments of the present inventions may include circuitry and/or implement methods to facilitate interaction for "user-guided" and/or "user-defined" one or more focus selections/determinations and/or depth of field selections/determinations. For example, in the context of focus selection, the light field data acquisition device may include circuitry and/or implement techniques to:
 a. Touch-screen click/selection to designate, identify and/or select one or more objects/subjects to focus on;
 b. "Push/pull" focus—that is, drag the focus nearer or closer; and/or
 c. Modify, edit and/or adjust a depth of field by specifying one or more ranges of depths to, for example, bring one or more objects or subjects into a predetermined focus.

In addition thereto, the light field data acquisition device and system according to certain aspects and/or embodiments of the present inventions may include circuitry and/or perform methods to implement live-viewing—before capture, sampling and/or acquisition of the light field image data which is employed to generate the final image. For example, the light field data acquisition device and system may implement:
 a. Extended depth of field (EDOF) by, for example, selective sampling of the acquired/observed array of pixel values on the sensor in a light field data acquisition device; and/or
 b. Focusing techniques on one or more objects or subjects of interest.

In one exemplary embodiment of the live viewing, the light field data acquisition device according to certain aspects of the present inventions may be employed as follows:
 1. The user or operator may point the light field data acquisition device at, for example, a target and set a predetermined and/or desired zoom position, for example, to frame an object or a subject.
 2. The user or operator may instruct or enable the data acquisition device to obtain or acquire image data or information by, for example, "clicking" the shutter button. In response, the light field data acquisition device acquires or obtains image data of a picture/scene without a delay that is typically associated with cameras having physical auto focus optics and/or circuitry. The operation of the light field data acquisition device may be designed such that all other operations, some of which may typically occur during the delay of physical auto focus (e.g. exposure metering, auto-exposure calculations and/or exposure settings), occur prior to the click of the shutter button so as to minimize and/or eliminate all delay between "clicking" the shutter button and the light field data acquisition device acquiring the image data of information of a picture/scene.
 3. The user, operator and/or light field data acquisition device may store, edit and/or analyze the acquired or recorded light field data or information; for example, such data or information may be edited to adjust, select, define and/or redefine the focus and/or depth of field using the system (as properly programmed). Indeed, a user may edit or manipulate the acquired or recorded light field data or information to focus (manually or automatically) on one or more subjects or objects of interest, which may be visually presented to the user via a display (for example, an LCD) that may be disposed on the light field data acquisition device. The user may, before and/or after editing (if any), store the light field data or information (or a representation thereof) in internal or external memory (for example, an external memory storage that is coupled to the data acquisition device).
 4. The user or operator may instruct the light field data acquisition device to, for example, focus or refocus on one or more different subjects/objects by, for example, selecting, clicking and/or pointing on a "touch screen" disposed on the data acquisition device or system. Notably, the user may also instruct the light field data acquisition device or system to edit other characteristics of the acquired image—for example, adjust the depth of field (for example, increase or decrease the depth of field).

Importantly, the present inventions are neither limited to any single aspect nor embodiment, nor to any combinations and/or permutations of such aspects and/or embodiments. Moreover, each of the aspects of the present inventions, and/ or embodiments thereof, may be employed alone or in combination with one or more of the other aspects and/or embodiments thereof. For the sake of brevity, many of those permutations and combinations will not be discussed and/or illustrated separately herein.

Notably, it should be clear that certain of the present inventions of generating, manipulating and/or editing light field image data or information are applicable to light field data acquisition devices and systems physically configured according to one or more of the exemplary embodiments of the present inventions and/or data acquisition devices and systems not physically configured according to one or more of the exemplary embodiments of the present inventions. In this regard, the techniques of generating, manipulating and/or editing light field image data or information may be implemented on data acquisition devices and systems according to one or more of the exemplary embodiments described and/or illustrated herein as well as any data acquisition device and/or system that provides the capability to edit or manipulate image data or information, for example, focus an image to a range of focal depths after "exposure" or acquisition of image data.

In a first principle aspect, certain of the present inventions are directed to a light field imaging device for acquiring light field image data of a scene, the device of this aspect includes optics, wherein the optics includes an optical path and a focal point, wherein the focal point is associated with a focal length of the optics, and light field sensor to acquire light field image data in response to a first user input and located at a substantially fixed, predetermined location relative to the focal point of the optics, wherein the predetermined location is substantially independent of the scene. The optical depth of field of the optics with respect to the light field sensor extends to a depth that is closer than optical infinity. The device also includes processing circuitry, coupled the user interface, to: (a) determine a first virtual focus depth of the light field image data, wherein the first virtual focus depth is different from the optical focus depth of the light field image data, (b) automatically generate data which is representative of a first image of the scene using the light field image data, wherein the first image includes a focus which corresponds to the first virtual focus depth, (c) output the data which is representative of the first image, and, after outputting the data which is representative of the first image and in response to the second user input, (d) determine a second virtual focus depth of the light field image data using data which is representative of the second user input, wherein the second user input is indicative of the second virtual focus depth, and (e) generate data which is representative of a second image of the scene which includes a focus that corresponds to the second virtual focus depth.

Notably, in response to outputting the first image, the user interface receives the second user input which is indicative of the second virtual focus depth. In this regard, the user interface may include a display to (i) receive the data which is representative of the first image and (ii) output the first image. Moreover, the light field imaging device may include memory, coupled to the processing circuitry, to store the data which is representative of the second image.

In one embodiment, the optics is configurable to include a plurality of different focal lengths having associated focal points. In this embodiment, the substantially fixed, predetermined location of the light field sensor, relative to the focal point of the optics, changes in accordance with the focal length of the optics.

In another embodiment, the optics may include a zoom lens system (for example, providing a continuous or non-continuous zoom) having a plurality of zoom positions. Here, the device may include a mechanical system (an active or a passive system), coupled to the light field sensor, to maintain the light field sensor unit at the same fixed, predetermined location relative to the focal point of the optics for the plurality of the zoom positions. The mechanical system may maintain the light field sensor unit at the predetermined location relative to the focal point of the optics for the plurality of the zoom positions of the zoom lens system. Indeed, the mechanical system may maintain the light field sensor unit at the predetermined location relative to the focal point of the optics for a plurality of focuses of the optics. Notably, the light field sensor, in these embodiments, may maintain the predetermined location relative to the focal point of the optics for the plurality of the zoom positions of the zoom lens system.

The light field imaging device of this aspect of the inventions may further include (i) a spatial adjustment unit, coupled to the light field sensor and/or the optics, to responsively move the light field sensor unit, and (ii) control circuitry, coupled to the spatial adjustment unit, to control the spatial adjustment unit to maintain the light field sensor unit at the predetermined location relative to the focal point of the optics. The device may also include memory, coupled to the control circuitry, to store data which is representative of a plurality of locations of the light field sensor corresponding to a plurality of associated zoom positions. Indeed, the memory may include a database or lookup table which correlates a plurality of locations of the light field sensor according to a plurality of associated zoom positions. Here, the control circuitry may access the database or lookup table having data which is representative of the location based on the zoom position of the zoom lens system and generates control signal which are applied to the spatial adjustment unit to responsively move the light field sensor unit.

In one embodiment, the processing circuitry of the light field imaging device computes output images having an array of output pixels, and wherein the light field sensor includes (i) a microlens array having a plurality of microlenses and (ii) a sensor having an array of sensor pixels, and wherein the predetermined distance is between $(0.7*N_{usable}*W_{MLA}*F\#_{optics}*m)/(W_{output})$ and $(3.0*N_{usable}*W_{MLA}*F\#_{optics}*m)/(W_{output})$, where:

$N_{usable}$ is equal to the number of pixels containing usable directional information across a microlens disk image that is formed, through each microlens, on the sensor, or are located under a microlens, $W_{MLA}$ is representative of a number of microlenses across a width of the microlens array, $W_{output}$ is representative of a number of pixels across a width of the array of output pixels, m is equal to a distance between the centers of two neighboring microlenses in the microlens array, and $F\#_{optics}$ is equal to an F-number of the optics.

In another embodiment, the light field sensor includes (i) a microlens array having a plurality of microlenses and (ii) a sensor having an array of pixels, and wherein the predetermined distance is greater than $(m*F\#_{optics})$, where:

m is equal to the distance between the centers of two neighboring microlenses in the microlens array, and $F\#_{optics}$ is equal to an F-number of the optics.

In yet another embodiment, the light field sensor includes (i) a microlens array having a plurality of microlenses and (ii) a sensor having an array of pixels, and wherein the predetermined distance is less than ($N_{usable}*m*F\#_{optics}$), where:

$N_{usable}$ is equal to the number of pixels containing usable directional information across a microlens disk image that is formed, through each microlens, on the sensor, or are located under a microlens, m is equal to the distance between the centers of two neighboring microlenses in the microlens array, and $F\#_{optics}$ is equal to an F-number of the optics.

In another principal aspect, the present inventions are directed to a light field imaging device for acquiring light field image data of a subject in a scene, wherein the subject is in a focal plane, the device of this aspect of the inventions comprises: (a) optics, wherein the optics includes an optical path, an optical depth of field and an autofocus mechanism, wherein the autofocus selects between a plurality of focuses including a first focus which is related to a focal plane of the subject, (b) a light field sensor, located (i) in the optical path of the optics to acquire light field image data and (ii) at a predetermined location, relative to the optics, during acquisition of the light field data, wherein the predetermined location is at a substantially fixed separation relative to the focal plane corresponding to the subject, and wherein the focal plane of the subject is outside of the optical depth of field of the optics with respect to the light field sensor, and (c) processing circuitry to generate an output image data which is representative of an image including the subject in the scene, the processing circuitry to: (i) determine a virtual focus depth of the light field image data, wherein the virtual focus depth is different from the optical focus depth of the light field image data, and (ii) automatically generate data which is representative of the image of the scene using the light field image data and data which is representative of the virtual focus depth, wherein the image includes a focus which corresponds to the virtual focus depth.

Notably, the light field imaging device may also include memory, coupled to the processing circuitry, to store the data which is representative of the image of the scene.

In one embodiment, the light field imaging device further includes a user interface to receive a plurality of user inputs, including first and second user inputs, wherein, in response to the first user input, the light field sensor acquires the light field image data of the scene, and wherein the processing circuitry outputs the data which is representative of the image of the scene, and, after outputting the data which is representative of the image of the scene and in response to the second user input, (i) determines a final virtual focus depth of the light field image data using data which is representative of the second user input, wherein the second user input is indicative of the final virtual focus depth, and (ii) generates data which is representative of the final image of the scene using the light field image data wherein the final image includes a focus which corresponds to the final virtual focus depth.

The light field imaging device may also include control circuitry and wherein the autofocus mechanism includes an autofocus image sensor to acquire focus data, the control circuitry determines focus metrics using the focus data, and the optics includes a second optics to provide at least a portion of the light in the optical path onto the autofocus image sensor.

In yet another principal aspect, the present inventions are directed to a light field imaging device for acquiring light field image data of a subject in a scene, wherein the subject is in a focal plane, the device comprises: (a) optics, wherein the optics includes an optical path, an optical depth of field and an autofocus mechanism, wherein the autofocus selects between a plurality of focuses including a first focus which is related to a focal plane of the subject, (b) a light field sensor, located (i) in the optical path of the optics to acquire light field image data and (ii) at a predetermined separation, relative to the optics, during acquisition of the light field data, wherein the focal plane of the subject is outside of the optical depth of field of the optics with respect to the light field sensor, (c) control circuitry to adjust the separation between the light field sensor and the optics between a plurality of discrete, fixed-focus separations, wherein each discrete separation provides a refocusing range of the light field image data, and (d) processing circuitry to generate an output image data which is representative of an image including the subject in the scene, the processing circuitry to: (i) determine a virtual focus depth of the light field image data, wherein the virtual focus depth is different from the optical focus depth of the light field image data, and (ii) automatically generate data which is representative of the image of the scene using the light field image data and data which is representative of the virtual focus depth, wherein the image includes a focus which corresponds to the virtual focus depth.

In one embodiment of this aspect of the invention, the discrete, fixed-focus separations overlap in refocusing range of the light field image data.

In another embodiment, the control circuitry selects a discrete, fixed-focus separation based on which of the discrete, fixed-focus separations provides a range of refocusing which is the furthest towards optical infinity and the in-focus plane of the subject is within the range of refocusing of the selected discrete, fixed-focus separation. Here, the autofocus mechanism includes an autofocus image sensor to acquire focus data, wherein the control circuitry determines focus metrics using the focus data, and the optics includes a second optics to divert at least a portion of the light in the optical path onto the autofocus image sensor.

Again, the light field imaging device may further include a user interface to receive a plurality of user inputs, including first and second user inputs, wherein, in response to the first user input, the light field sensor acquires the light field image data of the scene, and wherein the processing circuitry outputs the data which is representative of the image of the scene, and, after outputting the data which is representative of the image of the scene and in response to the second user input, (i) determines a final virtual focus depth of the light field image data using data which is representative of the second user input, wherein the second user input is indicative of the final virtual focus depth, and (ii) generates data which is representative of the final image of the scene using the light field image data wherein the final image includes a focus which corresponds to the final virtual focus depth.

Moreover, the light field imaging device may also include control circuitry and wherein the autofocus mechanism includes an autofocus image sensor to acquire focus data, the control circuitry determines focus metrics using the focus data, and the optics includes a second optics to provide at least a portion of the light in the optical path onto the autofocus image sensor.

In yet another principal aspect, the present inventions are directed to a light field imaging device for acquiring light field image data of a scene, wherein the light field image device includes a maximum output image resolution, the device comprising: (a) optics, wherein the optics includes an optical path and a focal point, (b) a light field sensor, located (i) in the optical path of the optics to acquire light field image data and (ii) at a substantially fixed location relative to the focal point of the optics, wherein the substantially fixed location is substantially independent of the scene and creates an optical depth of field of the optics with respect to the light field sensor that extends to a depth that is closer than optical infinity. The light field imaging device of this aspect of the inventions also includes processing circuitry to generate and output image data which is representative of an output image of the scene, the processing circuitry to: (i) determine a virtual focus depth of the light field image data, wherein the virtual focus depth is different from the optical focus depth of the light field image data, and (ii) automatically generate data which is representative of the output image of the scene using the light field image data and data which is representative of the virtual focus depth, wherein the output image includes a focus which corresponds to the virtual focus depth. In this aspect of the inventions, the light field sensor, which is located at the substantially fixed location relative to the focal point of the optics, acquires light field image data which corresponds to an output image of the scene which includes a virtual focus of optical infinity and a resolution in lines per picture height (LPH) that is at least 0.5 times the maximum output image resolution of the light field imaging device.

The maximum output image resolution of the device may be a number of rows of pixels in an image output by the device. The maximum output image resolution of the device may be the maximum resolution in LPH of any image output by the device virtually refocused to any subject depth.

Notably, the light field sensor, which is located at the substantially fixed location relative to the focal point of the optics, may acquire light field image data which corresponds to an output image of the scene which includes a focus of optical infinity and a resolution in lines per picture height (LPH) that is less than 0.8 times the maximum output image resolution of the light field imaging device Again, there are many inventions, and aspects and embodiments of the inventions, described in this Summary and/or described and/or illustrated herein. This Summary is not exhaustive of the scope, aspects and/or embodiments of the present inventions. Indeed, this Summary may not be reflective of or correlate to the inventions protected by the claims in this or in continuation/divisional applications hereof.

Moreover, this Summary is not intended to be limiting of the inventions or the claims (whether the currently presented claims or claims of a divisional/continuation application (if any)) and should not be interpreted in that manner. While certain embodiments have been described and/or outlined in this Summary, it should be understood that the present inventions are not limited to such embodiments, description and/or outline, nor are the claims limited in such a manner (which should also not be interpreted as being limited by this Summary).

Indeed, many other aspects, inventions and embodiments, which may be different from and/or similar to, the aspects, inventions and embodiments presented in this Summary, will be apparent from the description, illustrations and claims, which follow. In addition, although various features, attributes and advantages have been described in this Summary and/or are apparent in light thereof, it should be understood that such features, attributes and advantages are not required whether in one, some or all of the embodiments of the present inventions and, indeed, need not be present in any of the embodiments of the present inventions.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed and/or illustrated separately herein.

FIG. 1 is a block diagram representation of an exemplary light field data acquisition device, according to at least certain aspects of certain embodiments of the present inventions and/or which may implement certain aspects of certain embodiments of the present inventions;

FIG. 2A is a block diagram representation of certain optical characteristics of an exemplary light field data acquisition device including certain focus planes such as a far-focus plane, a physical light field sensor plane, and the close-focus plane;

FIGS. 3C and 3D are block diagram representations of exemplary light field data acquisition device wherein the processing circuitry is not integrated therein, according to at least certain aspects of certain embodiments of the present inventions and/or which may implement certain aspects of certain embodiments of the present inventions;

FIG. 3E is a block diagram representation of exemplary light field data acquisition device, according to at least certain aspects of certain embodiments of the present inventions and/or which may implement certain aspects of certain embodiments of the present inventions, wherein the light field data acquisition device couples to external systems/devices (for example, external storage, video display, recording device and/or data storage);

FIG. 3F is a block diagram representation of an exemplary system including light field data acquisition device and post-processing circuitry, according to at least certain aspects of certain embodiments of the present inventions and/or which may implement certain aspects of certain embodiments of the present inventions;

FIG. 5A is a block diagram representation of an exemplary light field data acquisition device, according to at least certain aspects of certain embodiments of the present inventions and/or which may implement certain aspects of certain embodiments of the present inventions, wherein the exemplary light field data acquisition device of this embodiment includes a mechanical system that mechanically couples to the optics and/or the microlens array and/or the photo sensor to provide or maintain the value of ε (the distances between the in-focus focal plane and the light field sensor plane) constant or substantially constant across a predetermined zoom range of the exemplary light field data acquisition device, and the lens plane of optics (via, for example, a fixture) maintains or provides the focal point of the optics (i.e. position of infinity focus) in a fixed location or position relative to the light field sensor plane as the zoom position changes (i.e. the focal length F changes) in response to, for example, a user input;

FIG. 5B is a block diagram representation of an exemplary light field data acquisition device, according to at least certain aspects of certain embodiments of the present inventions and/or which may implement certain aspects of certain embodiments of the present inventions, wherein the mechanical system includes one or more fixtures that mechanically couple to one or more elements of the optics to provide or maintain the value of ε (the distance between the in-focus focal plane and the light field sensor plane) constant or substantially constant across a predetermined zoom range of the exemplary light field data acquisition device, and the lens plane of optics (via, for example, a fixture) maintains or provides the focal point of the optics (i.e. position of infinity focus) in a fixed location or position relative to the light field sensor plane as the zoom position changes (i.e. the focal length F changes) in response to, for example, a user input;

FIG. 5C is a block diagram representation of an exemplary light field data acquisition device, according to at least certain aspects of certain embodiments of the present inventions and/or which may implement certain aspects of certain embodiments of the present inventions, wherein the offset between the focal plane and light field sensor may be kept constant or substantially constant for each acquisition or capture by mechanically adjusting the location of the optics relative to the light field sensor after a change in the zoom configuration;

FIGS. 5G and 5H are block diagram representations of exemplary light field data acquisition devices, according to at least certain aspects of certain embodiments of the present inventions and/or which may implement certain aspects of certain embodiments of the present inventions, wherein the mechanical system includes one or more fixtures that mechanically couple to one or more elements or portions of the optics to control, adjust, move, provide and/or maintain a predetermined position of the optics relative to the sensor and microlens array, for example, to control, adjust, move, provide and/or maintain the focal point of the optics (i.e. position of infinity focus) in a predetermined location or position relative to the light field sensor plane to provide a predetermined, discrete and/or fixed focus of the light field data acquisition device (in response to, for example, a user input);

FIG. 5I is a block diagram representation of an exemplary light field data acquisition device, according to at least certain aspects of certain embodiments of the present inventions and/or which may implement certain aspects of certain embodiments of the present inventions, wherein the mechanical system includes one or more fixtures that mechanically couple to the sensor and microlens array to control, adjust, move, provide and/or maintain a predetermined position of the sensor and microlens array relative to the optics to, for example, control, adjust, move, provide and/or maintain the focal point of the optics (i.e. position of infinity focus) in a predetermined location or position relative to the light field sensor plane to provide a predetermined, discrete and/or fixed focus of the light field data acquisition device (in response to, for example, a user input);

FIG. 5J-5L are block diagram representations of exemplary light field data acquisition devices, according to at least certain aspects of certain embodiments of the present inventions and/or which may implement certain aspects of certain embodiments of the present inventions, wherein the mechanical system includes one or more fixtures that mechanically couple to one or more elements of the optics, and the sensor and microlens array to control, adjust, move, provide and/or maintain a predetermined relative position of the optics and/or sensor and microlens array to, for example, control, adjust, move, provide and/or maintain the focal point of the optics (i.e. position of infinity focus) in a predetermined location or position relative to the light field sensor plane to provide a predetermined, discrete and/or fixed focus of the light field data acquisition device (in response to, for example, a user input);

FIG. 12 is an illustrative representation of a view display (for example, view finder and/or live-view LCD or the like display) of the user interface of an exemplary light field data acquisition device, according to at least certain aspects of certain embodiments of the present inventions and/or which may implement certain aspects of certain embodiments of the present inventions;

FIG. 15 illustrates, in a block diagram manner, optics and light field sensor of an exemplary light field data acquisition device including a mechanical aperture that may change the size of the aperture during zoom in order for the optics to maintain a constant F-number as the zoom configuration changes, according to at least certain aspects of certain embodiments of the present inventions and/or which may implement certain aspects of certain embodiments of the present inventions;

Figure 2B:
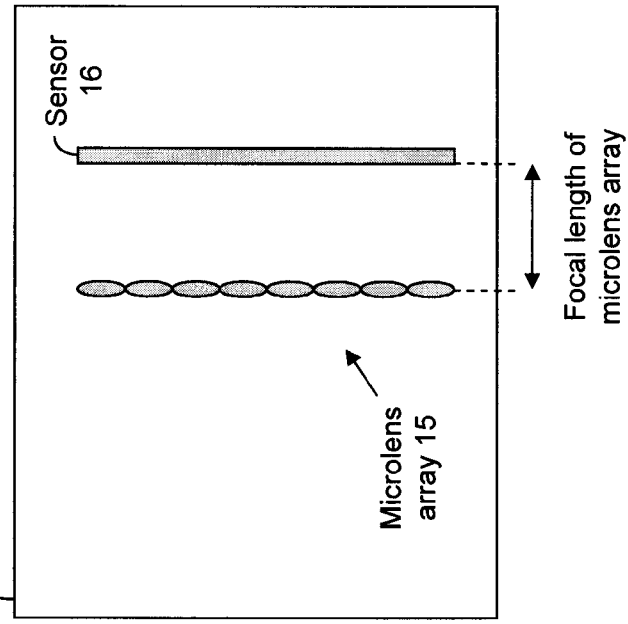
FIG. 2B is a block diagram representation of an exemplary light field sensor including, among other things, a microlens array and imaging sensor, which may be separated by (or substantially separated by) the focal length of the microlens array, according to at least certain aspects of certain embodiments of the present inventions and/or which may implement certain aspects of certain embodiments of the present inventions.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

DETAILED DESCRIPTION

There are many inventions described and illustrated herein, as well as many aspects and embodiments of those inventions. In one aspect, the present inventions are directed to the physical optical design of the light field acquisition device or system (hereinafter "device" and "system" are collectively "device" unless indicated otherwise). In another aspect, the present inventions are directed to methods of operating a light field data acquisition device including user interaction therewith and "live-view" or real-time processing of images prior to collection, acquisition and/or sampling of the final light field image data or information by the light-field acquisition device. In yet another aspect, the present inventions are directed to techniques and/or methods of "after-the-shot automatic" focusing.

Exemplary Use of Light Field Data Acquisition Device

In one exemplary embodiment, the light field data acquisition device 10, according certain aspects of the present inventions may be, among other things or ways, employed as follows:

1. The user or operator may point the light field data acquisition device at, for example, a target and set a predetermined and/or desired "zoom position", for example, to frame an object or a subject. Briefly, a zoom position refers to a configuration of optics allowing a variable or configurable focal length (for example, a zoom lens), such that a particular focal length is selected. Herein, changing and/or varying the zoom position may be used interchangeably with changing and/or varying the focal length of optics allowing a variable or configurable focal length.

2. The user or operator may instruct or enable the data acquisition device to obtain or acquire image data or information via the user interface (for example, by "clicking" or engaging the shutter button). In response, the light field data acquisition device acquires or obtains image data of a picture/scene which may be without a delay that is typically associated with conventional cameras (for example, conventional cameras having physical auto focus optics and/or circuitry). The operation of the light field data acquisition device may be designed such that all other operations, some of which may typically occur during the delay of physical auto focus (e.g. exposure metering, auto-exposure calculations and/or exposure settings), occur prior to the click of the shutter button so as to reduce, minimize and/or eliminate all delay between "clicking" or engaging the shutter button and the light field data acquisition device acquiring the image data or information of a picture/scene.

3. The user, operator and/or light field data acquisition device may store, edit and/or analyze the acquired or recorded light field data or information; for example, such data or information may be edited to adjust, select, define and/or redefine the focus and/or depth of field using the system (as properly programmed). Indeed, a user may edit or manipulate the acquired or recorded light field data or information to focus (manually or automatically) on one or more subjects or objects of interest, which may be visually presented to the user via a display (for example, an LCD) that may be disposed on the light field data acquisition device. The user may, before and/or after editing (if any), store the light field data or information (or a representation thereof) in internal or external memory (for example, an external memory storage that is coupled to the data acquisition device).

4. The user or operator may instruct the light field data acquisition device to, for example, focus or refocus on one or more different subjects/objects by, for example, selecting, clicking and/or pointing on a "touch screen" disposed on the data acquisition device or system. Notably, the user may also instruct the light field data acquisition device or system to edit other characteristics of the acquired image—for example, adjust the depth of field (for example, increase or decrease the depth of field).

Notably, the operation described above may be employed in conjunction with any of the light field data acquisition device embodiments described and/or illustrated herein. For the sake of brevity, the discussion of the operation will not be repeated in conjunction with each light field data acquisition device embodiments described and/or illustrated herein.

Light Field Data Acquisition Device Optics

Briefly, with reference to FIGS. 3A-3E, light field data acquisition device 10 may include optics 12 (including, for example, a main lens), light field sensor 14 including microlens array 15 and sensor 16 (for example, a photo sensor). The microlens array 15 is incorporated into the optical path to facilitate acquisition, capture, sampling of, recording and/or obtaining light field data via sensor 16. Notably, the light field data acquisition discussions set forth in United States Patent Application Publication 2007/0252074, the provisional applications to which it claims priority (namely, U.S. Provisional Patent Application Ser. Nos. 60/615,179 and 60/647,492), and Ren Ng's PhD dissertation, "Digital Light Field Photography") are incorporated herein by reference.

The light field data acquisition device 10 may also include control circuitry to manage or control (automatically or in response to user inputs) the acquisition, sampling, capture, recording and/or obtaining of light field data. The light field data acquisition device 10 may store the light field data (for example, output by sensor 16) in external data storage and/or in on-system data storage. All permutation and combinations of data storage formats of the light field data and/or a representation thereof are intended to fall within the scope of the present inventions.

Figure 3A:
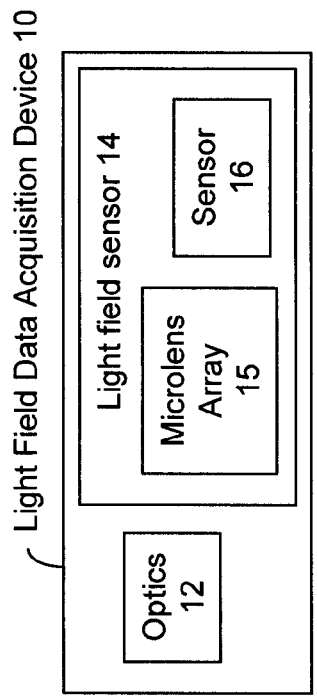
FIG. 3A is a block diagram representation of an exemplary light field data acquisition device, according to at least certain aspects of certain embodiments of the present inventions and/or which may implement certain aspects of certain embodiments of the present inventions.
Figure 3B:
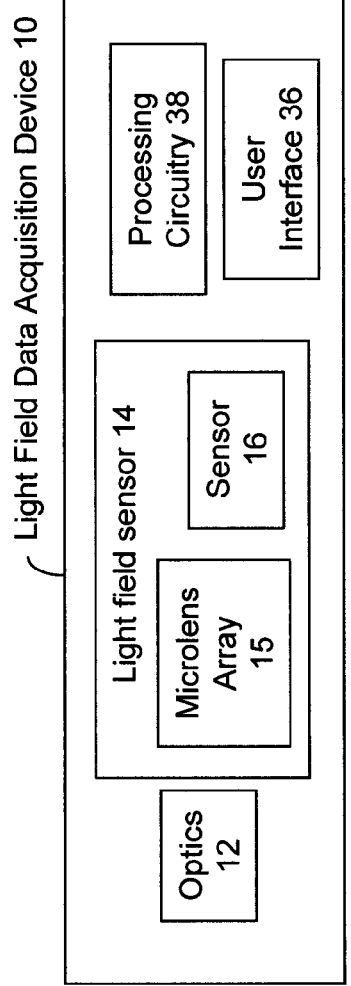
FIG. 3B is a block diagram representation of an exemplary light field data acquisition device including, among other things, processing circuitry integrated therein, according to at least certain aspects of certain embodiments of the present inventions and/or which may implement certain aspects of certain embodiments of the present inventions.
Figure 3C:
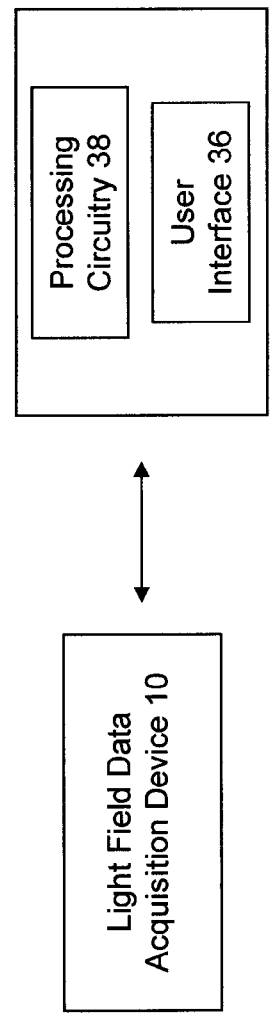

Notably, light field data acquisition device 10 of the present inventions may be a stand-alone acquisition system/device (see, FIGS. 3A, 3C, 3D and 3E) or may be integrated with processing circuitry (see, FIGS. 3B and 3F). That is, light field data acquisition device 10 may be integrated (or substantially integrated) with processing circuitry which may be employed to generate, manipulate and/or edit (for example, adjust, select, define and/or redefine the focus and/or depth of field—after initial acquisition or recording of the light field data) image data and/or information of, for example, a scene; and, in other exemplary embodiments, light field data acquisition device 10 is separate from processing circuitry which generates, manipulates and/or edits, for example, the focus and/or depth of field, after initial acquisition or recording of the light field data.

Notably, a light field data acquisition device, during capture and/or acquisition, may have a light field sensor located such that the "optical depth of field" with respect to the light field sensor does not include the location of a subject. Briefly, the "optical depth of field" may be characterized as depth of field the device would have if used as a conventional imaging device containing a conventional imaging sensor.

As noted above, in one aspect, the present inventions are directed to the physical and/or optical design of light field data acquisition device 10. In one embodiment of this aspect of the present inventions, light field data acquisition device 10 includes optics, microlens array and sensor configuration that provides a fixed focus in connection with the acquisition of light field image data. In this regard, with reference to FIGS. 3A and 4, the physical positions or locations of elements of optics 12 (which, as mentioned above, may include one or more lens, windows, apertures and mirrors) and/or light field sensor 14, comprised of microlens array 15 and sensor 16, are substantially fixed, in a relative manner, to, for example, provide a fixed focus during acquisition of light field image data by light field data acquisition device 10. The relative positions of optics 12 and/or light field sensor 14 may be selected to provide a range of refocusing after image data acquisition or a post-acquisition range of focusing or refocusing of the data or information (via, for example, post-processing circuitry) to extend from a first predetermined distance from an element of optics 12 (for example, a predetermined distance from lens plane 18 (for example, infinity—which may be characterized as optical infinity or essentially optical infinity given the observer's perceptive ability in target output images) which, for illustrative purposes, is illustrated as from main lens 20 to a second predetermined distance from lens plane 18 (for example, as close as possible to the lens plane yet still provides a selected, suitable or predetermined resolution). Notably, herein the term $\epsilon$ may be used to indicate the distance from the light field sensor plane 24 to a virtual plane of focus (for example, the focal plane of the optics or the virtual plane of focus corresponding to an object or subject). Generally, $\epsilon$ may be used without subscript in the context of a single distance. In the context of a plurality of light field sensor planes and/or virtual planes of focus, $\epsilon$ may be used with subscript (for example, $\epsilon_1$ and $\epsilon_2$) to denote the different distances.

Figure 2C:
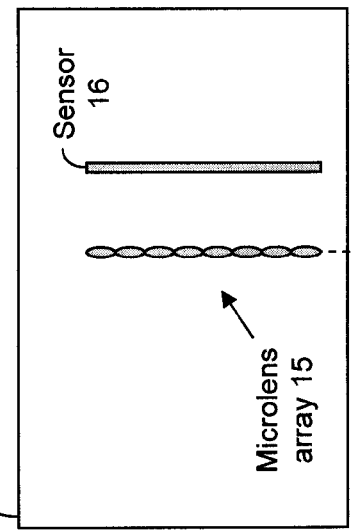
FIG. 2C is a block diagram representation of the light field sensor plane, which may be disposed at the principal plane of the microlens array, according to at least certain aspects of certain embodiments of the present inventions and/or which may implement certain aspects of certain embodiments of the present inventions.

Notably, with reference to FIG. 2C, the location of the light field sensor plane 24 may be considered the same as the principal plane of the elements in the microlens array 15. Herein, the location of light field sensor plane 24 may be referred to as the location and/or placement of the light field sensor 14 (for example, when describing the location and/or placement relative to other components and/or modules in the light field data acquisition device (for example, optics 12)).

Figure 4:
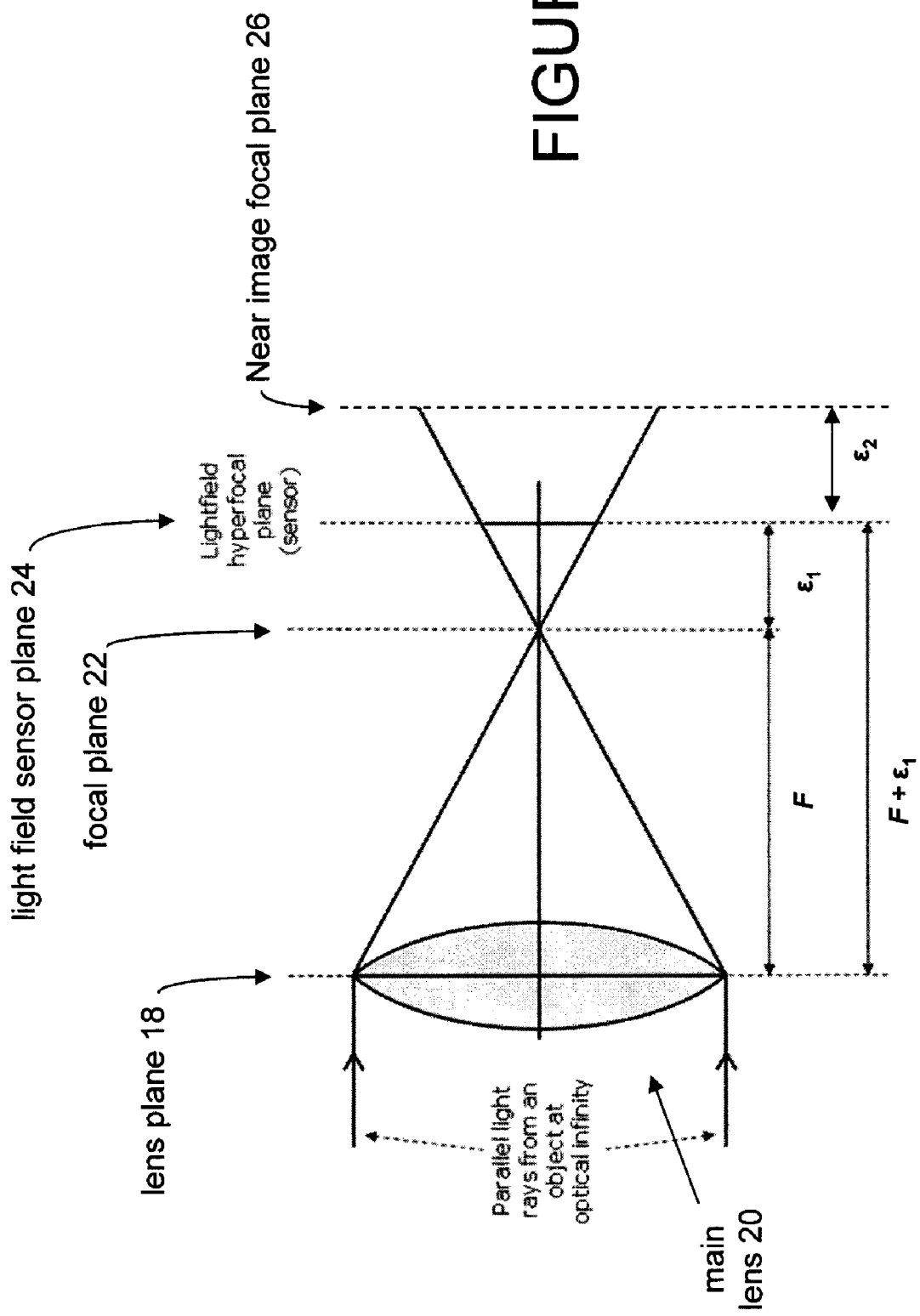
FIG. 4 is a block diagram representation of certain optical characteristics of an exemplary light field data acquisition device, according to at least certain aspects of certain embodiments of the present inventions and/or which may implement certain aspects of certain embodiments of the present inventions, including certain focus planes such as an infinity focal plane, a light field hyperfocal plane (focal plane of the sensor), and a near image focus plane.

In one embodiment, the position or location of light field sensor 14, in a relative manner, may be referred to as the "light field hyperfocal" focus position wherein a first predetermined distance may be optical infinity and a second predetermined distance may be as close to the lens plane which provides a selected, suitable or predetermined resolution. With reference to FIG. 4, light from an object at optical infinity converges at in-focus focal plane 22, and light field sensor 14 may be positioned at light field sensor plane 24, which may be located or positioned a distance of $\epsilon_1$ (which may be, for example, measured in millimeters or micrometers) away to facilitate or enable refocusing from infinity to a predetermined close distance. The predetermined close distance may be characterized as the plane conjugate to the image plane (or near image focal plane 26) which is at a distance $F+\epsilon_1+\epsilon_2$ from the lens plane. Briefly, for a light field sensor including a microlens array and an image sensor, $\epsilon_1$ and/or $\epsilon_2$ may be characterized and/or determined as described below.

Define the following:
Let m equal the distance between the centers of two neighboring microlenses in the microlens array (in millimeters).
Let N equal the number of sensor pixels across a microlens disk image that is formed through the microlens on the sensor, or are located under a microlens.

Let $F\#_{optics}$ equal the F-number of the main lens.

Let $F\#_{MLA}$ equal the F-number of the microlens array.

Let $N_{usable}$ equal the number of pixels containing usable directional information across a microlens disk image that appears or are located under a microlens. In the case where the F-numbers of the main lens and microlens array are equal or nearly equal, $N_{usable}$ may equal N. In cases where the F-numbers are not equal or near equal, $N_{usable}$ may be less than N. In some embodiments, $N_{usable}$ may be calculated by:

$$N_{usable}=N^*\min(F\#_{MLA}/F\#_{optics}, 2.0-F\#_{MLA}/F\#_{optics})$$

where min is a function that takes two arguments and returns the smaller of the two values. The maximum amount of blur that is introduced on the sensor from a point that comes into focus a distance of ε away may be generally described by the following:

$$b=\epsilon/(F\#_{optics})$$

Thus, expressing ε as a function of b gives the maximum distance that the sensor can be placed from the desired image plane to permit the object to be brought into a predetermined focus using a light field processing technique:

$$\epsilon=b(F\#_{optics})$$

To produce a refocused image, the maximum blur size b that may be overcome by post acquisition refocusing of the light field image data (via processing circuitry) may be characterized approximately as follows:

$$b=KN_{usable}m,$$

such that $$\epsilon=KN_{usable}m(F\#_{optics})$$

where K is a constant factor that may vary depending on various factors (for example, the manufacturing process and/or the desired output resolution), and will be discussed later herein.

Notably, in some embodiments, the effective and/or desired value for K (and thus ε) may differ depending on the direction in which the focus is shifted. As an example, in a light field data device containing directionally sensitive pixels on the imaging sensor, it may be possible to generate refocused images with higher resolution for objects in the foreground than objects in the background, given the same optical misfocus. In these embodiments, $\epsilon_1$ may be different than $\epsilon_2$, but is generally within a small multiple (for example, $\epsilon_1 < \epsilon_2 < 2^*\epsilon_1$).

Notably, if a lower-resolution image is computed, then the maximum image blur that may be overcome by post-acquisition refocusing increases, and thus ε may be greater. A related phenomenon is that refocusing at depths corresponding to sensor distances greater than ε results in images that have incrementally lower-resolution, but that may be acceptable, suitable and/or desired for, for example, certain applications. In general, the performance of the light field data acquisition device is affected by other parameters, including output image resolution, desired image sharpness, refocusing range, lens focal length and aperture, sensor size, microlens diameter, and/or macro mode magnification. The choices for these parameters may impact the distance ε (i.e., the range of (virtual) image plane depths about the physical light field sensor plane).

Figure 5D:
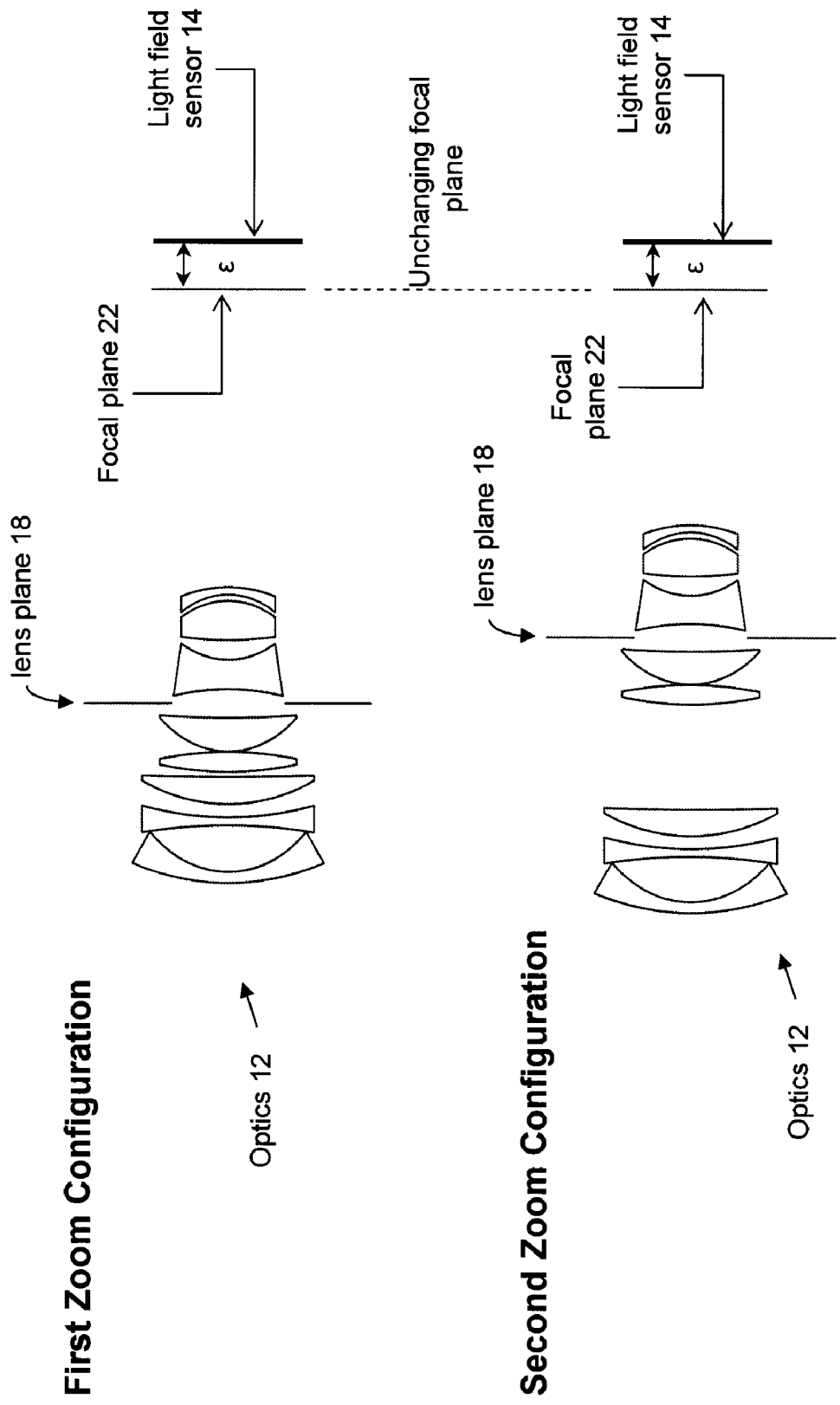
FIG. 5D is a block diagram representation of an exemplary light field data acquisition device, according to at least certain aspects of certain embodiments of the present inventions and/or which may implement certain aspects of certain embodiments of the present inventions, wherein the offset between the focal plane and light field sensor may be kept constant or substantially constant for each acquisition or capture by utilizing a main lens system that maintains a constant or near constant focal plane for a plurality of zoom positions.
Figure 6:
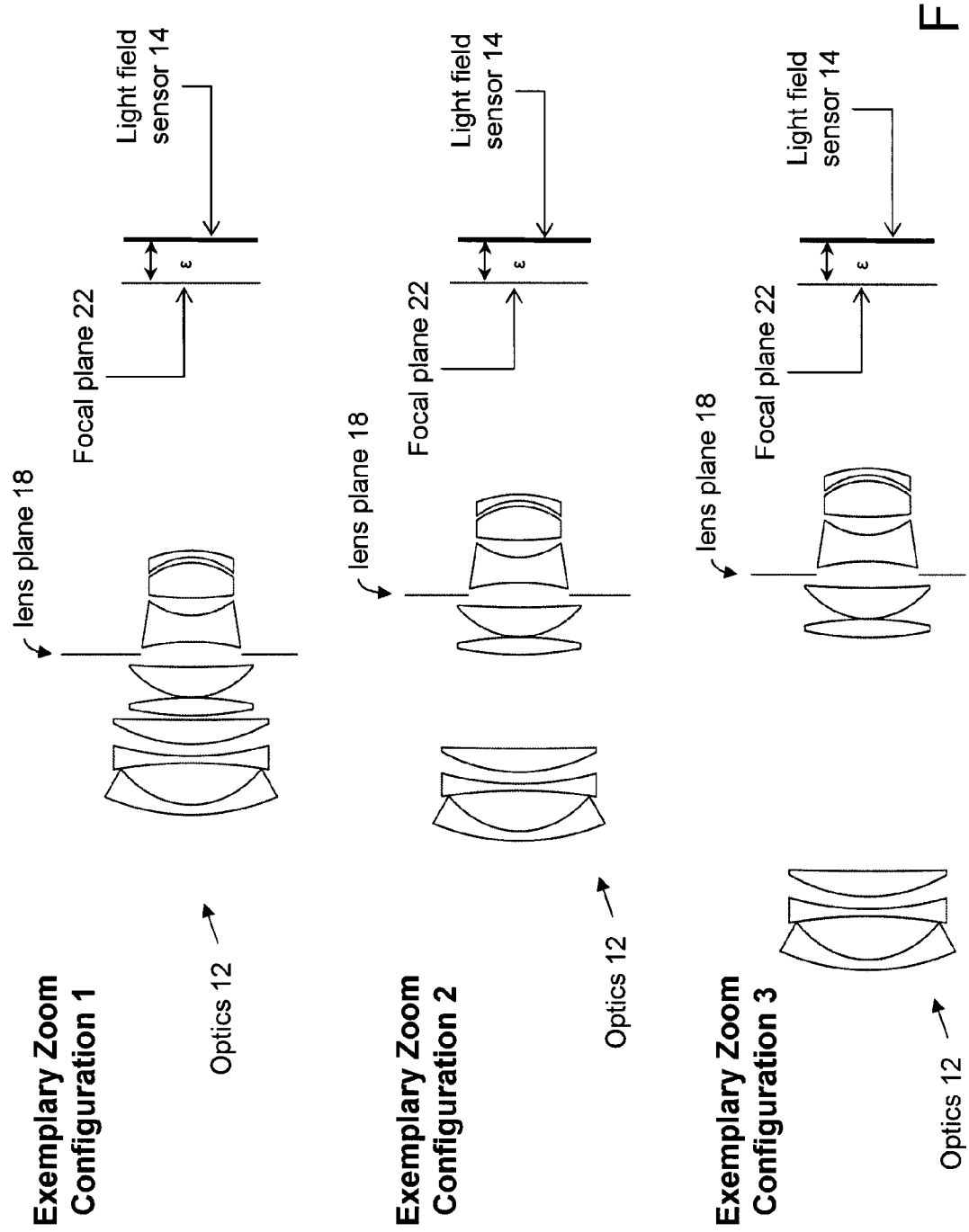
FIG. 6 illustrates an exemplary embodiment of a portion of a light field data acquisition device that utilizes a zoom lens architecture or assembly, in three exemplary zoom configurations corresponding to three different focal lengths, according to at least certain aspects of certain embodiments of the present inventions, wherein in each of the illustrated configurations, as in every zoom configuration, the light field sensor is positioned at substantially the same distance ϵ from the lens plane passing through the focal point of the optics corresponding to that zoom configuration.

In this embodiment, light field sensor 14 may be positioned relative to the infinity focal plane of optics 12 (for example, a distance of F+ε) using a plurality of mechanical and electromechanical configurations. For example, with reference to FIGS. 4 and 5A, one exemplary embodiment employs mechanical system 28 (which may be passive or active), which is physically coupled to one or more elements of optics 12 and/or light field sensor 14 to provide or maintain the value of ε (the distance between in-focus focal plane 22 and light field sensor plane 24) constant or substantially constant across a predetermined zoom range of light field data acquisition device 10. In one embodiment, with reference to FIG. 5B, fixture 30 physically couples to one or more elements of optics 12 and, in combination with spatial adjustment unit 32 (for example, stepper motors, microelectromechanical device, cooperating levers or arms, voicecoil motors, ultrasonic motor (USM), arc-form drive (AFD), and/or micromotor (MM)) maintains or provides the focal point of optics 12 (i.e. position of infinity focus) in a fixed location or position relative to light field sensor plane 24 as the zoom position changes (i.e. the focal length F changes) in response to, for example, a user input. In this way, light field sensor 14 (and light field sensor plane 24) is located or positioned a constant (or substantially constant) distance ε beyond or further from the focal point of optics 12 (for example, the focal point of lens 20). For example, FIG. 6 illustrates an exemplary embodiment of a portion of a light field data acquisition device that utilizes a zoom lens, in three exemplary zoom configurations corresponding to three different focal lengths. In each of the illustrated configurations, as in every zoom configuration, light field sensor 14 is positioned at substantially the same distance ε from lens plane 18 passing through the focal point of optics 12 corresponding to that zoom configuration.

Briefly, the focal point of the optics may be characterized as the location where parallel light rays converge after passing through the optics. Generally, optics determine two focal points, with one on each side of the optics. Herein, the term focal point refers to the focal point inside of the device, determined by rays originating in the world. Further, in certain optical configurations that may contain optical aberrations such that there may be no well-defined point of convergence, the focal point may be characterized as the point that has the lowest root mean squared (RMS) error, where the error may be measured as the distance from the point to lines determined by light rays originating from optical infinity (i.e. parallel light rays in the world).

Figure 5E:
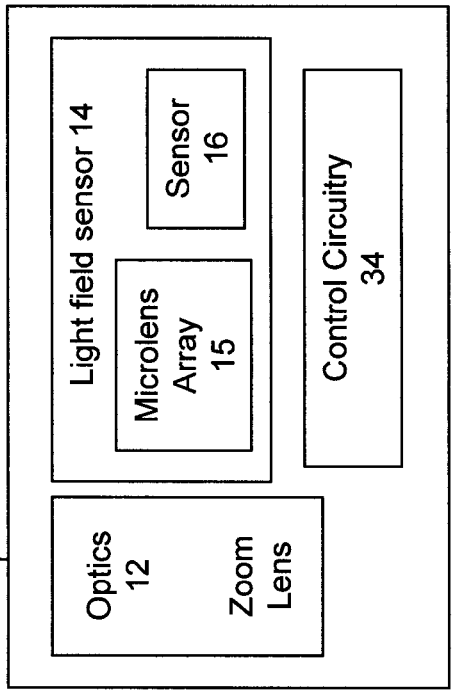
FIG. 5E is a block diagram representation of an exemplary light field data acquisition device, according to at least certain aspects of certain embodiments of the present inventions and/or which may implement certain aspects of certain embodiments of the present inventions, wherein the optics includes a zoom lens configuration or apparatus (for example, a conventional type zoom lens configuration or apparatus) and the exemplary light field data acquisition device of this embodiment includes control circuitry to derive, calculate and/or estimate a predetermined or required focus based on a desired, predetermined and/or new zoom position of the zoom lens configuration and, in response, adjust (for example, automatically) the focus of the optics to correspond to the predetermined or required focus.
Figure 5F:
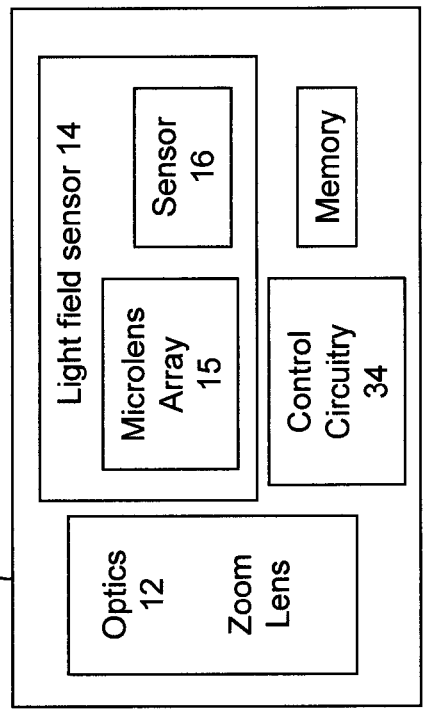
FIG. 5F is a block diagram representation of an exemplary light field data acquisition device, according to at least certain aspects of certain embodiments of the present inventions and/or which may implement certain aspects of certain embodiments of the present inventions, wherein the optics includes a zoom lens configuration or apparatus (for example, a conventional type zoom lens configuration or apparatus) and the exemplary light field data acquisition device of this embodiment includes control circuitry and memory that stores a predetermined database which maps or correlates zoom positions of the zoom lens configuration of the optics to the appropriate or predetermined focus settings.
Figure 5K:
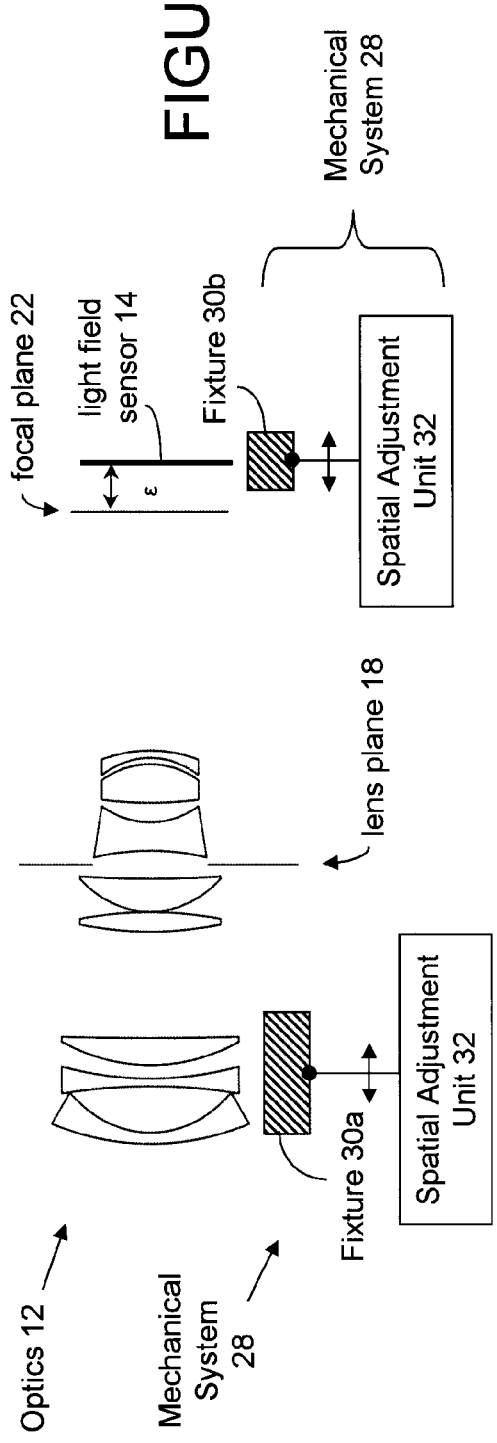
Figure 5L:
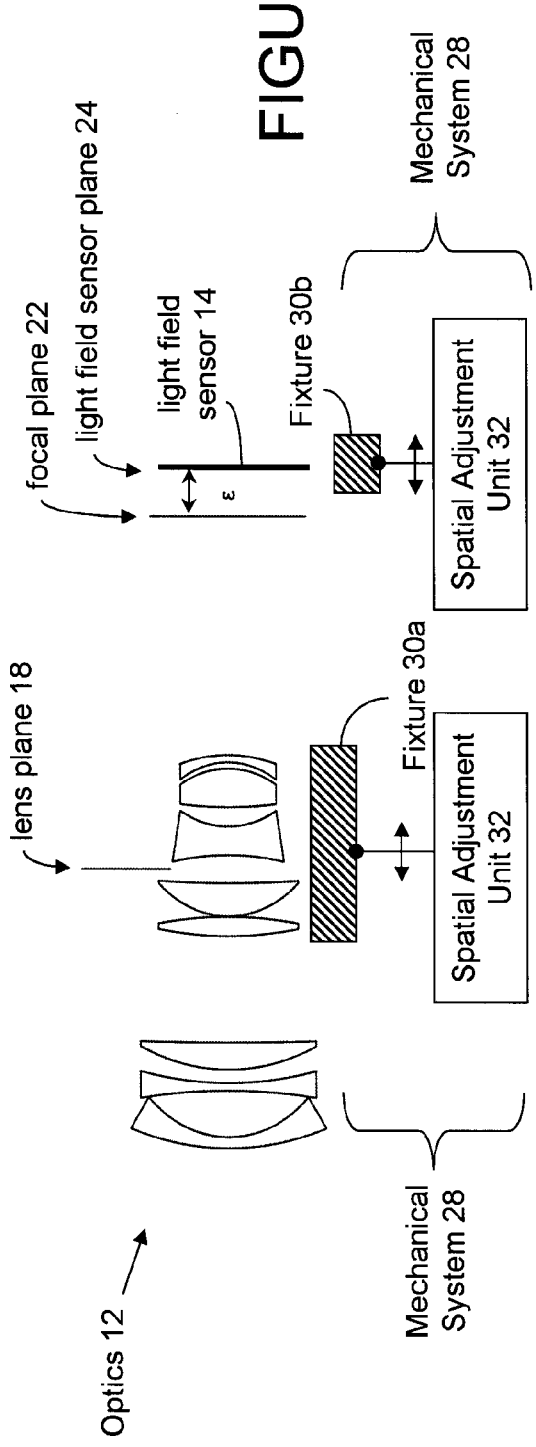

In one embodiment, with reference to FIG. 5C, the light field data acquisition device may adjust the location of optics 12 relative to light field sensor 14 each time the zoom configuration changes, which may place the light field sensor a predetermined distance from focal plane 22 at the time of acquisition. In this regard, the light field data acquisition device may be initially in one zoom position, with light field sensor 14 a predetermined distance, ε, from focal plane 22. The zoom configuration may change (for example, as a result of a user input), which may place focal plane 22 at a different separation from light field sensor 14. In this embodiment, before acquisition of the light field data (for example, immediately or substantially immediately after changing the zoom configuration), the location of light field image sensor 14 relative to focal plane 22 may be adjusted to place light field sensor 14 at a predetermined distance ε relative to focal plane 22. (See, "Second Zoom Configuration—Final") Notably, the necessary adjustment and/or light field sensor position may be stored in a database or look-up table using the zoom position as a key and based thereon, the light field data acquisition device may implement the appropriate adjustments to provide a predetermined distance ε relative to focal plane 22. (See, for example, the control circuitry and memory of FIG. 5F).

In another exemplary embodiment of a passive mechanical system wherein $\epsilon$ varies with the zoom position, the physical focus changes in synchrony with a change in zoom such that the light field sensor plane is maintained or kept a predetermined distance from the lens plane. Here, the zoom lens may be designed to change the physical focus as the zoom changes. In addition thereto, or in lieu thereof, a second lens is configured to change in synchrony with a change in zoom (for example, with one or more other elements of the optics (for example, the zoom lens)) such that the light field sensor 14 maintains a predetermined relative distance from the lens plane. For example, with reference to FIG. 5D, focal plane 22 maintains a constant position, relative to light field sensor 14, over a plurality of zoom configurations. Notably, many zoom lens systems are designed such that the focal plane is constant or nearly constant across the range of zoom positions.

In another exemplary embodiment of a passive mechanical system, the zoom lens of the zoom system includes the property whereby the focal plane of the lens is maintained at approximately a fixed plane in space as the lens is "zoomed," i.e. the focal length of the lens is changed. In this embodiment, the light field sensor is maintained at a constant or near constant $\epsilon$ separation from this focal plane via a passive mechanical spacer, bracket or other mechanical structure that offsets the light field sensor depth from the lens' focal plane.

Notably, a number of exemplary embodiments have been described, with both passive and/or active components and methods, to illustrate the general principle of maintaining a desired or predetermined separation between the focal plane of the lens and the light field sensor. Any method now known or later invented for maintaining this desired separation is intended to fall within the scope of this aspect of the present inventions.

The light field data acquisition device may also include a conventional zoom lens configuration, including separate control of zoom and focus. In this regard, with reference to FIGS. 4 and 5E, in one embodiment, such a light field data acquisition device 10 may independently control the zoom lens and focus via control circuitry 34. In the context of control circuitry 34, when the lens of optics 12 is located or moved to a desired, predetermined and/or new zoom position, the focus of optics 12 (zoom lens) may be adjusted or changed such that light field sensor plane 24 is located or placed an appropriate or predetermined distance from the lens plane 18. The control circuitry 34 may determine, derive, calculate and/or estimate a predetermined or required focus based on a desired, predetermined and/or new zoom position of the zoom lens configuration of optics 12 and, in response, adjust (for example, automatically) the focus of the lens of optics 12 to correspond to the predetermined or required focus.

In another embodiment, control circuitry 34 (for example, a processor, state machine, ASIC, PGA (for example, field-programmable gate array (FPGA)) may be configured, capable and/or programmed to control the lens zoom based on the user's interaction with the zoom input interface (for example, knobs/dials of user interface 36 disposed on or connected with light field data acquisition device 10) to automatically set the lens focus or focus of optics 12 as the user selects/input the desired, predetermined and/or new zoom. In one embodiment, the correlation between zoom position and focus may be determined empirically or analytically based on the mathematical relationship. In another embodiment, the correlation data may be stored in a memory (for example, memory that is integrated in circuitry (for example, control circuitry 34) or that is discrete) such that a predetermined database maps or correlates zoom positions of the zoom lens configuration of optics 12 to the appropriate or predetermined focus settings. (See, for example, FIGS. 5E and 5F).

Notably, in some embodiments, the value of $\epsilon$ may vary with the zoom position of the optics 12. Briefly, as the focal length becomes greater, the depth of field in the "world" generally becomes shallower. In some embodiments, it may be desirable to use larger values of $\epsilon$ for longer focal lengths to provide a larger range of refocusing relative to smaller values of $\epsilon$. However, as noted herein, using a larger value for $\epsilon$ may result in some portions of the refocusing range (for example, near and far extremes) that have lower resolution and/or appear less sharp.

In sum, in one aspect, the present inventions are directed to a single fixed-focus lens configuration with the sensor placed a predetermined distance from a predetermined image plane (such as the plane passing through the lens' focal point) to provide a predetermined and/or desired refocusing performance of light field data acquisition device 10.

Figure 7:
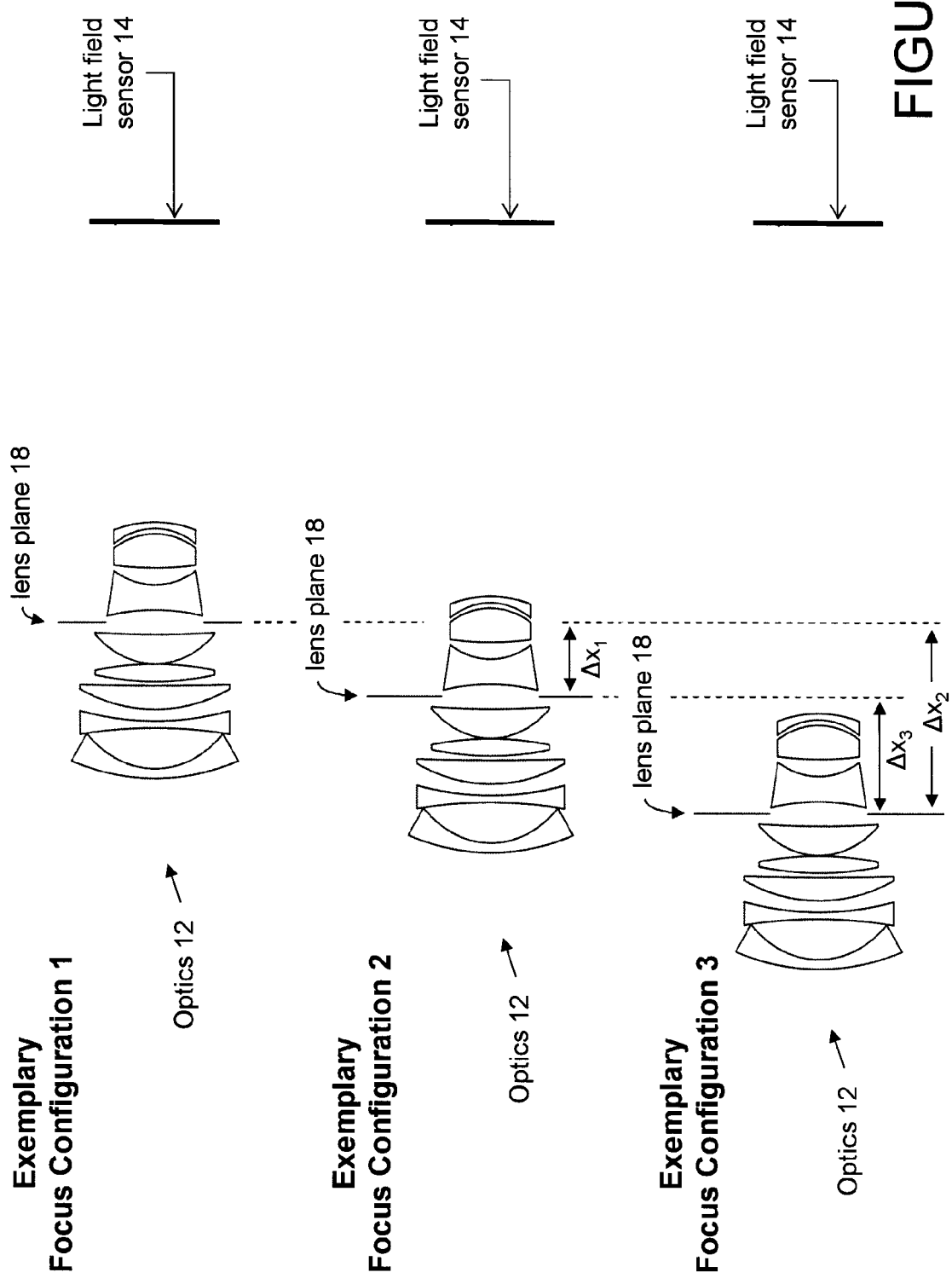
FIG. 7 illustrates an exemplary embodiment of a portion of a light field data acquisition device having an optics section (or portion thereof) which is controllable, adjustable and/or moveable, relative to, for example, the sensor, between a plurality of discrete positions which may provide a plurality of corresponding discrete focus "positions" or characteristics, according to at least certain aspects of certain embodiments of the present inventions, wherein each exemplary focus configuration corresponds to different discrete focus "positions" or characteristics.

Optics and/or Sensor Moves Over Coarse-Grained Focus Positions: In another embodiment of the present inventions, optics 12 and/or light field sensor 14 are/is adjustable or moveable, in a relative manner, between a plurality of discrete, fixed positions which may provide a plurality of corresponding discrete, fixed-focus "positions" or characteristics. For example, with reference to FIGS. 3A and 7, in a first predetermined focus (for example, the focus configuration corresponding to Exemplary Focus Configuration 1), the elements of optics 12 (for example, one or more lenses) are located (relative to the plurality of elements of optics 12 and/or light field sensor 14) in a first position. In a second predetermined focus (for example, the focus configuration corresponding to Exemplary Focus Configuration 2), the elements of optics 12 (for example, one or more lenses) are located (relative to the plurality of elements of optics 12 and/or light field sensor 14) in a second position, such that lens plane 18 is moved a distance $\Delta x_1$ relative to the location of lens plane 18 corresponding to Exemplary Focus Configuration 1. Similarly, in a third predetermined focus (the focus configuration corresponding to Exemplary Focus Configuration 3), the elements of optics 12 (for example, one or more lenses) are located (relative to the plurality of elements of optics 12 and/or light field sensor 14) in a third position, such that lens plane 18 is moved (i) a distance $\Delta x_2$ relative to the location of lens plane 18 corresponding to Exemplary Focus Configuration 1 and (ii) a distance $\Delta x_3$ relative to the location of lens plane 18 corresponding to Exemplary Focus Configuration 2. Each of the discrete locations provides a predetermined focus configuration of the light field data acquisition device.

Notably, one or more of the elements of optics 12 may be positioned (in a relative manner) using any circuitry, mechanisms and/or techniques now known or later developed, including the circuitry, mechanisms and/or techniques described herein (see, for example, FIG. 5B). In these embodiments, however, the elements of optics 12 are moved or positioned between a plurality of discrete locations or positions to provide a plurality of corresponding fixed focus characteristics. Moreover, although the exemplary illustration reflects the relative motion of the entire optics 12, certain of the elements of optics 12 (for example, one or more lenses) may be spatially fixed (for example, relative to light field sensor 14 and other portions/elements of optics 12). (See, for example, FIGS. 5G and 5H).

Figure 8:
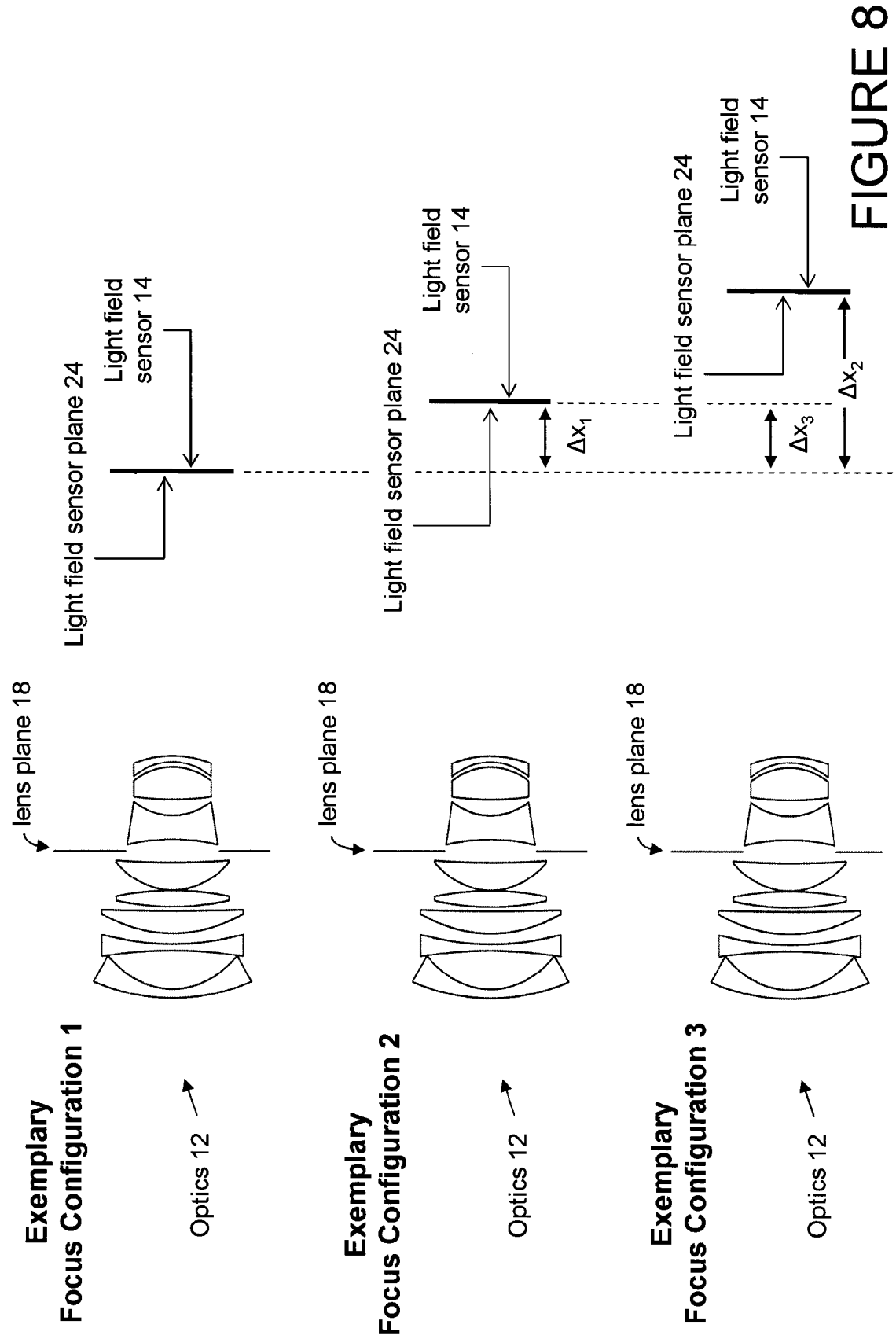
FIG. 8 illustrates an exemplary embodiment of a portion of a light field data acquisition device having a sensor which is controllable, adjustable and/or moveable, relative to, for example, the optics (or portion or elements thereof), between a plurality of discrete positions which may provide a plurality of corresponding discrete focus "positions" or characteristics, according to at least certain aspects of certain embodiments of the present inventions, wherein each exemplary focus configuration corresponds to different discrete focus "positions" or characteristics.

In another embodiment of the present inventions, light field data acquisition device 10 includes light field sensor 14 which is adjustable or moveable, relative to optics 12, between a plurality of fixed positions to provide a plurality of corresponding discrete, fixed-focus "positions" or characteristics. For example, with reference to FIGS. 3A and 8, in a first predetermined focus (for example, the focus configuration corresponding to Exemplary Focus Configuration 1), the elements of optics 12 (for example, one or more lenses) are spatially fixed and light field sensor 14 is located (relative to the plurality of elements of optics 12) in a first position. In a second predetermined focus (for example, the focus configuration corresponding to Exemplary Focus Configuration 2), light field sensor 14 is located in a second position or location relative to optics 12, such that light field sensor plane 24 is moved a distance $\Delta x_1$ relative to the location of light field sensor plane 24 corresponding to Exemplary Focus Configuration 1. Similarly, in a third predetermined focus (the focus configuration corresponding to Exemplary Focus Configuration 3), light field sensor 14 is located (relative to optics 12) in a third position, such that light field sensor plane 24 is moved (i) a distance $\Delta x_2$ relative to the location of lens plane 18 corresponding to Exemplary Focus Configuration 1 and (ii) a distance $\Delta x_3$ relative to the location of light field sensor plane 24 corresponding to Exemplary Focus Configuration 2. Each of the discrete locations provides a predetermined focus configuration of the light field data acquisition device.

Notably, light field sensor 14 may be positioned (in a relative manner) using any of circuitry, mechanisms and/or techniques now known or later developed, including the circuitry, mechanisms and/or techniques described herein (see, for example, FIGS. 5I-5L). In these embodiments, however, light field sensor 14 is moved or positioned between a plurality of discrete locations or positions to provide a plurality of corresponding fixed focus characteristics. Moreover, although the exemplary illustration reflects the movement of light field sensor 14 relative to optics 12, optics 12 (or one or more elements thereof, for example, one or more lenses) may also move (for example, other portions/elements of optics 12). (See, for example, FIGS. 5K and 5L).

Figure 9A:
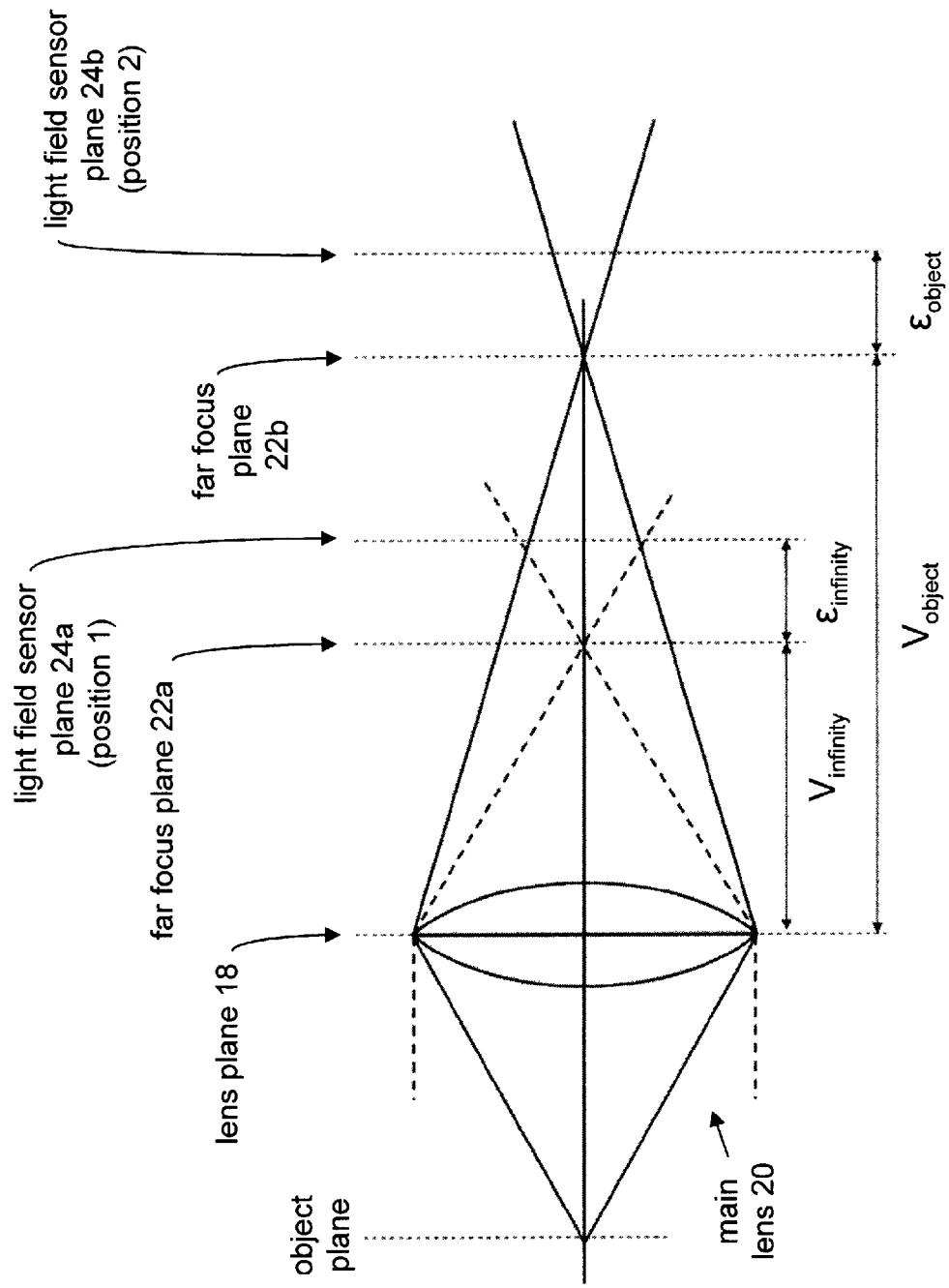
FIG. 9A is a block diagram representation of certain optical characteristics of an exemplary light field data acquisition device, according to at least certain aspects of certain embodiments of the present inventions and/or which may implement certain aspects of certain embodiments of the present inventions, including the relationship between certain focus planes as the position or location of the sensor moves between a plurality of discrete positions which may provide a plurality of corresponding discrete focus "positions" or characteristics.

In another embodiment, with reference to FIGS. 3A and 9A, when imaging an object at or near optical infinity, the image is in a predetermined focus (for example, in-focus) on image plane $v_{infinity}$ and light field sensor 14 is placed at image plane $v_{infinity} + \epsilon_{infinity}$ (i.e., corresponding to light field sensor plane 24a). When imaging a closer object, however, the image is in focus at image plane $v_{object}$ and light field sensor 14 is placed at image plane $v_{object} + \epsilon_{object}$ (i.e., corresponding to light field sensor plane 24b).

Figure 9B:
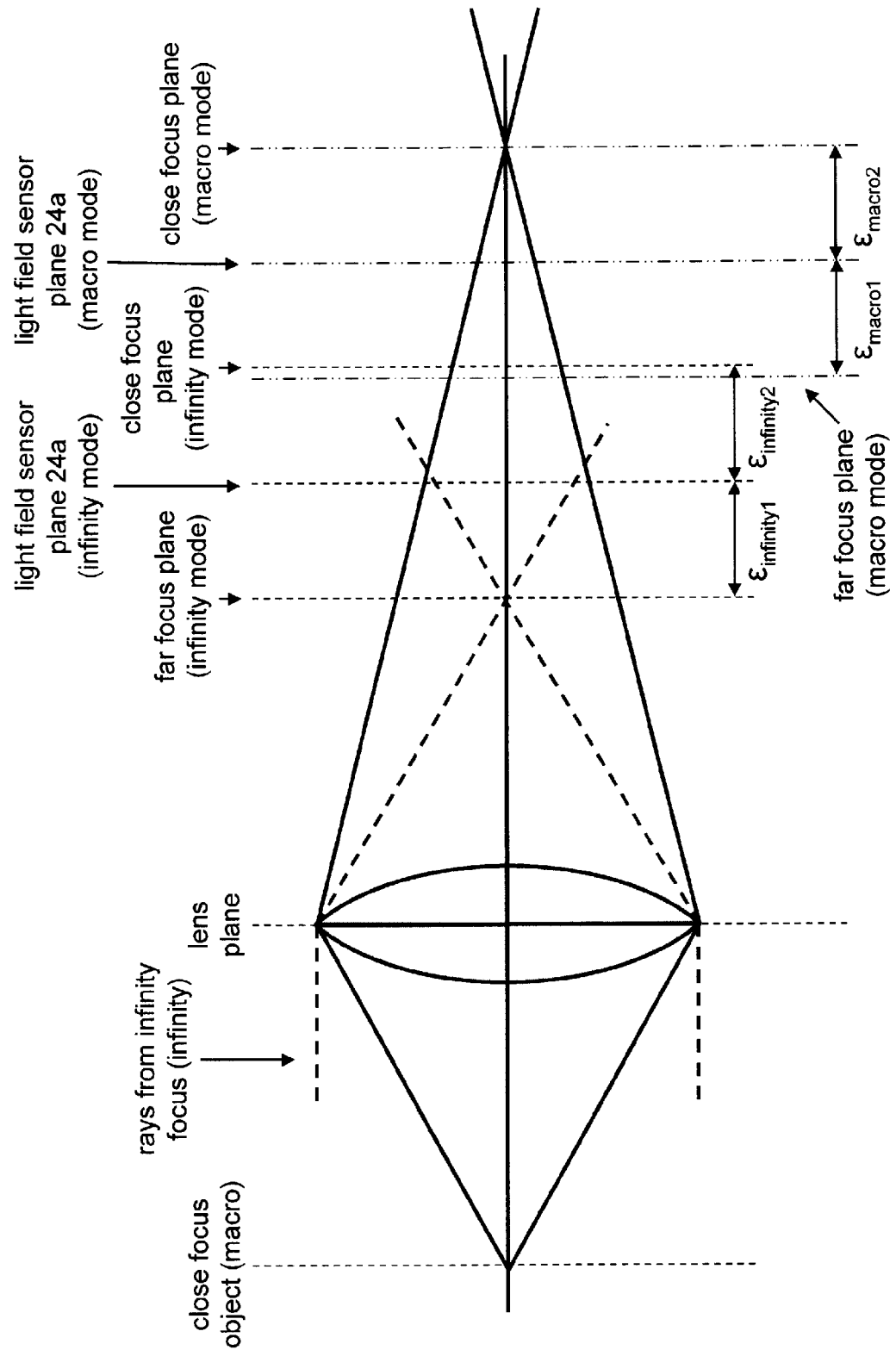
FIG. 9B is a block diagram representation of certain optical characteristics of an exemplary light field data acquisition device, according to at least certain aspects of certain embodiments of the present inventions and/or which may implement certain aspects of certain embodiments of the present inventions, including the relationship between certain focus planes as the position or location of the sensor moves between positions corresponding to an "infinity mode" and a "macro mode" which may provide a plurality of corresponding discrete focus "positions" or characteristics.

With continued reference to FIGS. 3A and 9A, in one exemplary embodiment, light field data acquisition device 10 may include a plurality of fixed-focus positions including a first position for "refocus to infinity" mode and a second position for "macro" mode. The user may select or define the focus configuration of light field data acquisition device 10 by selection of the mode, for example, via a user interface 36. (See, for example, FIGS. 3B, 3D and 7). In this embodiment, with reference to FIG. 9B, when light field data acquisition device 10 is configured (i) in a first mode (infinity mode), light field data acquisition device 10 includes a focus characteristic that extends to infinity (or substantially infinity), and (ii) in a second mode (macro mode), the refocusing range of light field data acquisition device 10 does not extend to infinity but the closest refocusable distance is closer to optics 12 of light field data acquisition device 10 relative to the configuration corresponding to the first mode. Notably, the refocusing ranges covered in the refocusing modes may be adjacent, overlapping (for example, as in the diagram), or non-overlapping.

This embodiment may be implemented via a moveable optics section and/or moveable light field sensor 14. In this regard, the optics 12 and/or the light field sensor 14 may be moveable or adjustable, in a relative manner, between a plurality of discrete positions which provide a plurality of corresponding discrete, fixed-focus "positions" or characteristics corresponding to the plurality of modes. Although the illustrated embodiment intimates that the sensor is moveable between a plurality of positions or locations, such movement is relative to the optics section (for example, the lens plane 18) and, as such, these embodiments may be implemented via a moveable optics section and a fixed or stationary sensor (and microlens array). (See, for example, FIGS. 5B, 5G and 5H).

Notably, it may be advantageous when the light field data acquisition device is in a macro mode, to provide a widened main lens aperture such that the effective or apparent f-number of the aperture of main lens of the optics "matches" the f-number of the aperture of the microlens of the microlens array. A general approximation of the effective or apparent f-number of the main lens aperture is as follows:

$$\text{Microlens } F\# = f/T_{micro} \rightarrow \text{Main lens } F\# = f/T_{main}$$

where: M is the magnification, and $T_{main} = T_{micro}/(1+M)$.

For example, in one embodiment, the magnification M=1, each microlens is f/4, and the main lens is opened up to f/2. In this embodiment, the light field disk images are full-sized.

Figure 10A:
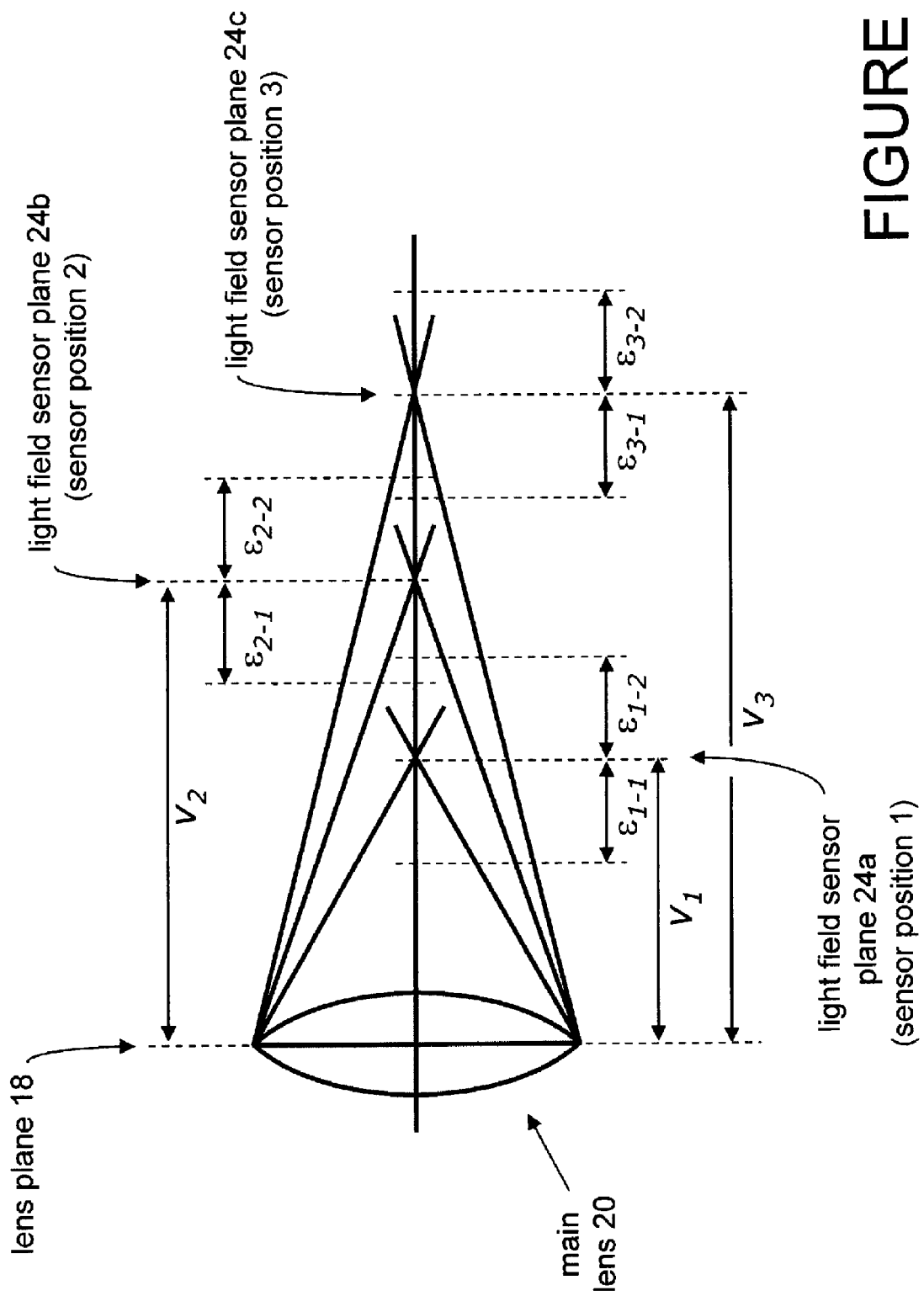
FIG. 10A-10C are block diagram representations of certain optical characteristics of exemplary light field data acquisition devices, according to at least certain aspects of certain embodiments of the present inventions and/or which may implement certain aspects of certain embodiments of the present inventions, including the relationship between certain focus planes as the position or location of the sensor (and microlens array) move between a plurality of course-grained discrete positions which correspond to overlapping or non-overlapping refocusing ranges wherein the separation of the discrete focus positions, relative to neighboring position(s), provides (i) one or more overlapping refocusing position(s) and/or (ii) one or more non-overlapping refocusing position(s)

In another embodiment, the light field data acquisition device 10 includes a plurality of coarse-grained fixed-focus (with overlapping or non-overlapping regions of refocusability) positions. With reference to FIGS. 5A and 10A, in one exemplary embodiment, the separation of the fixed-focus positions provides a plurality of refocusable overlapping in range (see, for example, $v_1$ and $v_2$, and $v_2$ and $v_3$). That is, in this exemplary embodiment, when light field sensor 14 is located in a first position (sensor position 1), the refocusing range of light field data acquisition device 10 corresponds to $+\epsilon_{1-2}$ and $-\epsilon_{1-1}$ relative to light field sensor plane 24a. Similarly, when light field sensor 14 is located in a second position (sensor position 2), the refocusing range of light field data acquisition device 10 corresponds to $+\epsilon_{2-2}$ and $-\epsilon_{2-1}$ relative to light field sensor plane 24b, wherein the refocusing range of light field data acquisition device 10 when light field sensor 14 is located in the first position (sensor position 1) overlaps with the refocusing range of light field data acquisition device 10 when light field sensor 16 is located in the second position (sensor position 2).

Further, when light field sensor 14 is located in a third position (sensor position 3), the refocusing range of light field data acquisition device 10 corresponds to $+\epsilon_{3-2}$ and $-\epsilon_{3-1}$ relative to light field sensor plane 24c and the refocusing range of light field data acquisition device 10 when light field sensor 14 is located in the third position (sensor position 3) overlaps with the refocusing range of light field data acquisition device 10 when light field sensor 14 is located in the second position (second position 2). In sum, in this illustrative exemplary embodiment, light field data acquisition device 10 includes three discrete, fixed-focus overlapping positions.

With continued reference to FIGS. 3A and 10A, in one embodiment, when capturing or acquiring image data or information using the light field data acquisition device of FIG. 10A, light field sensor 14 may be positioned at $v_1$ (sensor position 1), $v_2$ (sensor position 2), or $v_3$ (sensor position 3) thereby enabling light field data acquisition device 10 to provide or produce a refocusable image corresponding to any continuous position from $v_1 - \epsilon_{1-1}$ to $v_3 + \epsilon_{3-2}$ (which is the aggregate of the refocusable range when the photo sensor is located in sensor positions 1, 2 and 3). Where light field data acquisition device 10 includes an auto focus system (see, for example, FIGS. 5M and 5N), the control circuitry 34 (which may control the auto focus system) of light field data acquisition device 10 may select between one of a plurality of discrete, fixed focus positions, rather than, for example, a fine-grained continuum of focus positions. Notably, increasing the overlap between the refocusable ranges of the discrete positions of the data acquisition device of these embodiments, may reduce, lessen, and/or lighten any accuracy requirements or constraints for a physical auto-focus system implemented in light field data acquisition device 10.

It should be noted that this embodiment may be implemented via a moveable optics section and/or moveable light field sensor 14. In this regard, the optics and/or the light field sensor may be moveable or adjustable, in a relative manner, between a plurality of discrete, fixed positions which provide a plurality of corresponding discrete, fixed-focus "positions" or characteristics corresponding to the plurality of overlapping course-grained fixed-focus positions. Although the illustrated embodiment intimates that the light field sensor 14 is moveable between a plurality of positions or locations (see, for example, FIGS. 5I-5L), such movement is relative to the optics section (for example, lens plane 18) and, as such, these embodiments may be implemented via a moveable optics section and a fixed or stationary sensor (and microlens array). (See, for example, FIGS. 5B, 5G and 5H).

In another embodiment of the present inventions, the light field data acquisition device includes a plurality of coarse-grained fixed-focus wherein one or more (or all) of the fixed-focus positions are non-overlapping with respect to the fixed-focus positions corresponding to the neighboring discrete position of the optics and/or sensor (and microlens array). For example, with reference to FIGS. 10B and 10C, light field data acquisition device 10 includes one or more discrete, fixed-focus positions that provide non-overlapping refocusable ranges (see, for example, $v_2$ and $v_3$) with respect to neighboring positions (see, sensor position 2 and sensor position 3). In this exemplary embodiment, when light field sensor 14 is located in a first position (sensor position 1), the refocusing range of light field data acquisition device 10 corresponds to $+\epsilon_{1-2}$ and $-\epsilon_{1-1}$ relative to light field sensor plane 24a, which overlaps with the refocusing range of light field data acquisition device 10 when light field sensor 14 is located in a second position (sensor position 2). However, in this embodiment, when light field sensor 14 is located in a third position (sensor position 3), the refocusing range of light field data acquisition device 10 corresponds to $+\epsilon_{3-2}$ and $-\epsilon_{3-1}$ relative to light field sensor plane 24c, which does not overlap with the refocusing range of light field data acquisition device 10 when light field sensor 14 is located in a second position (sensor position 2).

Figure 10B:
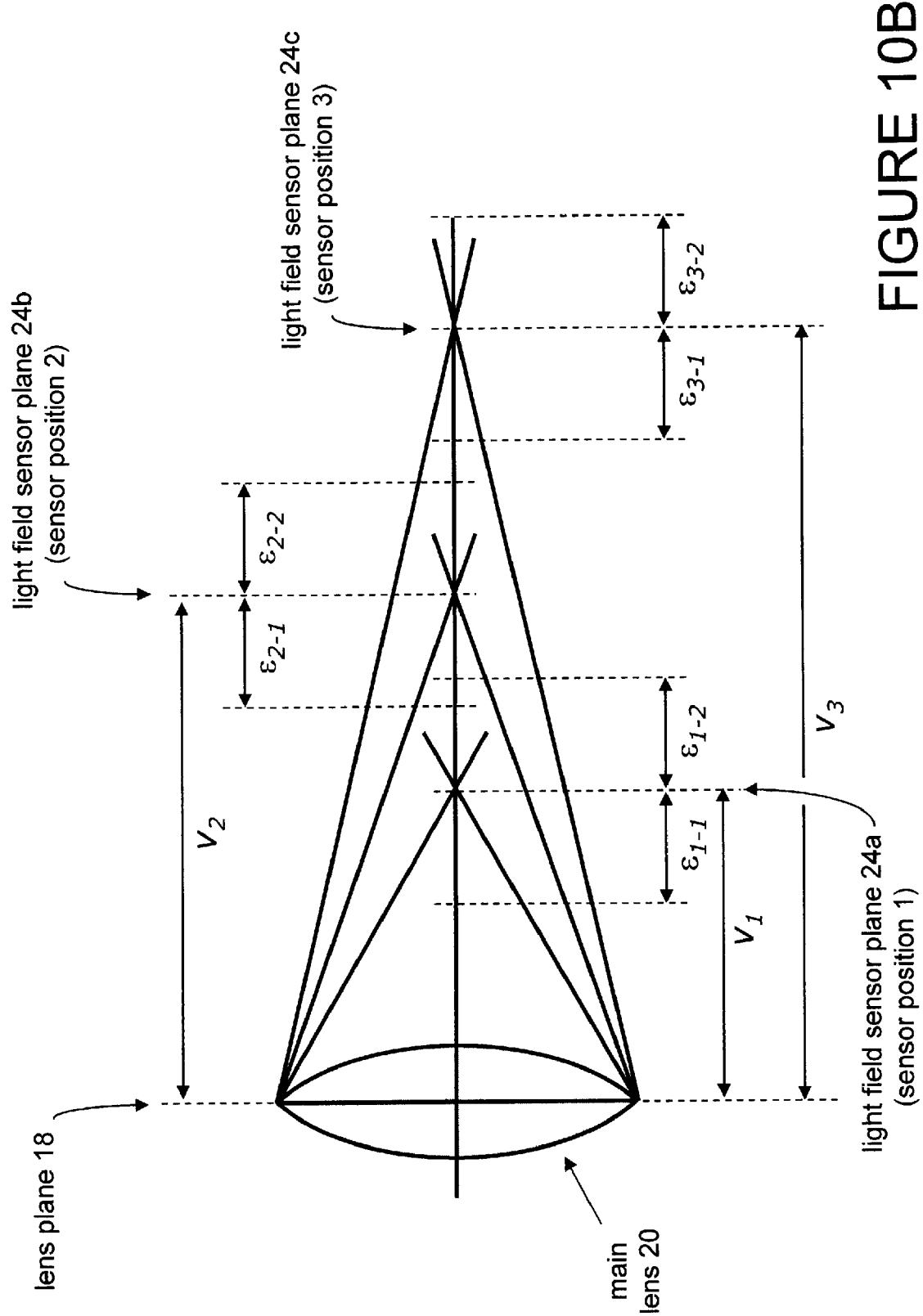
Figure 10C:
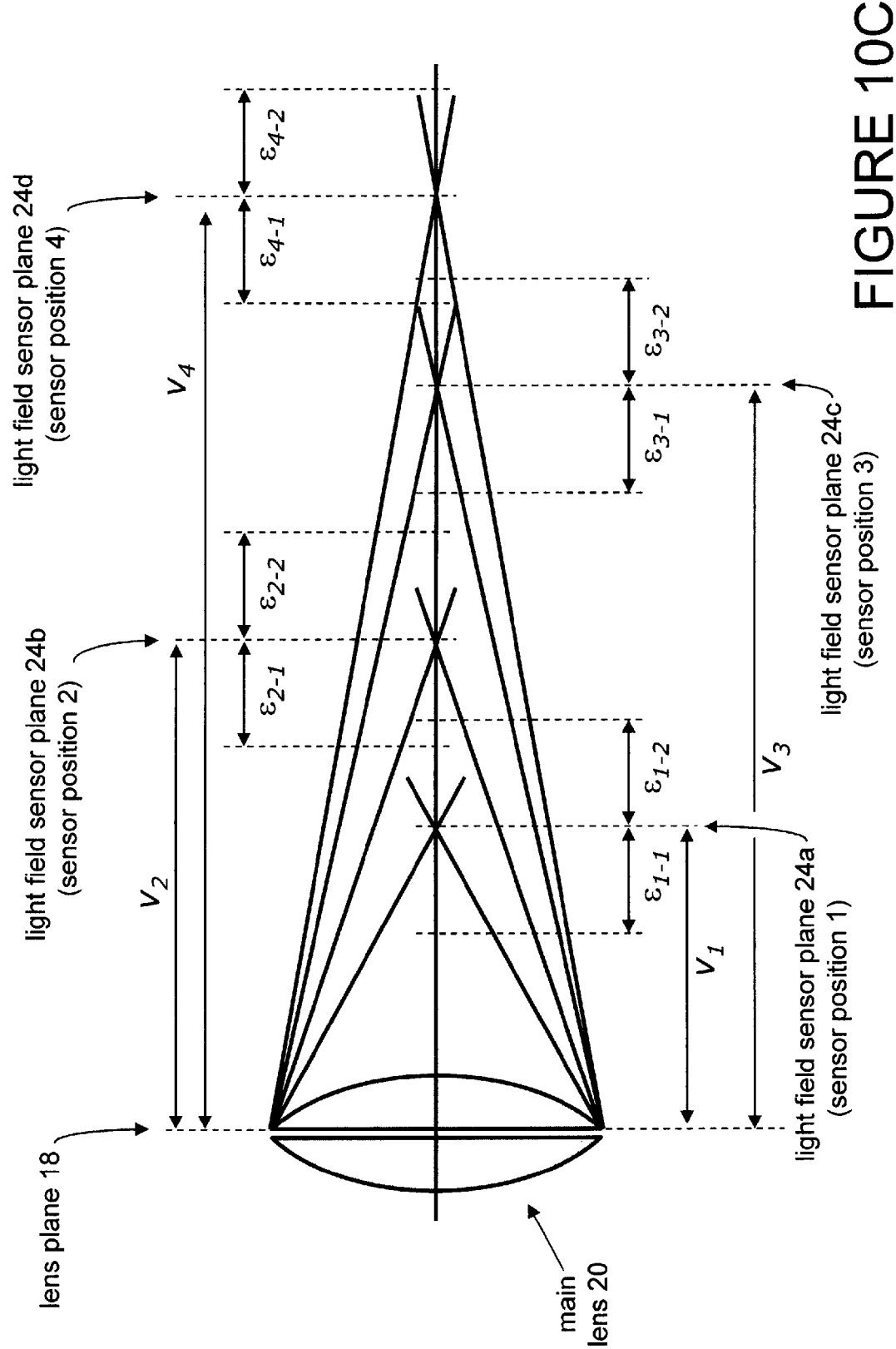

Notably, with reference to FIG. 10C, when light field sensor 14 is located in a fourth position (sensor position 4), the refocusing range of light field data acquisition device 10 corresponds to $+\epsilon_{4-2}$ and $-\epsilon_{4-1}$ relative to light field sensor plane 24d, which overlaps with the refocusing range of light field data acquisition device 10 when light field sensor 14 is located in a third position (sensor position 3).

As with the implementation of the overlapping position (for example, discussed immediately above and illustrated in FIG. 10A), the embodiments of FIGS. 10B and 10C may be implemented via a moveable optics section and/or moveable light field sensor 14. In this regard, the optics and/or the light field sensor 14 may be moveable or adjustable, in a relative manner, between a plurality of fixed positions which provide a plurality of corresponding discrete, fixed-focus "positions" or characteristics corresponding to the plurality of non-overlapping course-grained fixed-focus positions. Although the illustrated embodiment describes that the light field sensor 14 is moveable between a plurality of positions or locations (see, for example, FIGS. 5I-5L), such movement is relative to the optics section (for example, the lens plane 18) and, as such, these embodiments may be implemented via a moveable optics section and a fixed or stationary sensor (and microlens array). (See, for example, FIGS. 5B, 5G and 5H).

Where light field data acquisition device 10 includes a zoom lens (see, for example, FIGS. 5E and 5F) and more than one fixed focus positions overlap (see, for example, FIGS. 10A and 10B), the number of overlapping fixed focus positions that may be necessary to allow any object from a given minimum close distance to infinity to be brought into a predetermined focus may increase as the focal length becomes longer, and may decrease as the focal length becomes shorter. In general, there may be some focal length threshold in the zoom range of the optics at which a single fixed focus position may be all that is required, and at this threshold and at any shorter focal lengths, light field data acquisition device 10 may switch to behaving as a device with a single fixed focus position, as described above.

Notably, for a given light field data acquisition device 10, in general, the number of fixed focus positions that are employed to span or provide a given refocusable range may be a function of the focal length of the main lens of optics 12.

In another embodiment, the light field data acquisition device, according to at least certain aspects of certain embodiments of the present inventions and/or which may implement certain aspects of certain embodiments of the present inventions, includes a physical auto-focus, and optics/circuitry to implement such auto-focus, in those embodiments where the light field data acquisition device includes multiple fixed-focus positions (for example, three positions in the exemplary illustrated embodiment of FIGS. 10A and 10B). In another embodiment, the light field data acquisition device includes a physical auto-focus, and optics/circuitry to implement such auto-focus, in those embodiments where the light field data acquisition device includes independent zoom and focus controls in which a single fixed-focus position (e.g. refocusing from optical infinity down to a close distance) does not provide or cover a sufficiently large focus range. The light field data acquisition devices of these embodiments may employ any physical auto-focus now known or later developed; all of which, when incorporated into the light field data acquisition devices of these embodiments, are intended to fall within the scope of the present inventions.

Notably, a light field data acquisition device with a discrete, fixed or coarse focus mechanism may be able to reduce, minimize and/or eliminate the time spent searching for the correct focus prior to acquisition or capture. In some embodiments, the operation of the light field data acquisition device may be designed such that all other operations, some of which may typically occur during the delay of physical auto focus (e.g. exposure metering, auto-exposure calculations and/or exposure settings), occur prior to the click of the shutter button so as to minimize and/or eliminate all delay between "clicking" the shutter button and the light field data acquisition device acquiring the image data of information of a picture/scene. In one embodiment, the light field data acquisition device may periodically acquire or capture "analysis" images in order to determine, calculate and/or perform tasks (e.g. exposure metering, auto-exposure calculations and/or exposure settings) that would otherwise delay acquisition or capture. In one exemplary embodiment, the light field data acquisition device may capture these "analysis" images at regular intervals occurring at a frequency higher than once a second while in a mode that allows for acquisition or capture.

Conventional Auto-Focus Followed By Light Field Sensor Plane Adjustment: In another embodiment, the light field data acquisition device according to at least certain aspects of certain embodiments of the present inventions and/or which may implement certain aspects of certain embodiments of the present inventions, includes auto-focus (for example, a conventional auto-focus system available on conventional cameras). (See, for example, FIGS. 5M and 5N). In this regard, the auto-focus system may be configured or modified to accommodate implementation with a microlens array of the light field data acquisition device 10 to provide a device having auto-focus functionality. In this embodiment, the light field data acquisition device 10 may configure the focus parameters or characteristics such that the light field sensor 14 (and the corresponding light field sensor plane 24) may be located or positioned a predetermined distance from the focal plane of the subject of interest in the optics of the device (subject's in-focus focal plane). In one embodiment, the predetermined distance may be mathematically or empirically determined, calculated or characterized for different configurations (for example, different ISO settings, aperture, focal length, and/or any other parameters that affect or impact the performance of the auto-focus system) of the light field data acquisition device 10 to provide or produce a database or look-up table(s) that correlates and/or map(s) predetermined configuration of the light field data acquisition device 10 to the location, movement and/or displacement of the optics and/or sensor.

In operation, control circuitry of the light field data acquisition device 10 may employ the database or look-up table(s) to move, adjust and/or locate light field sensor 14 a predetermined, selected or desired distance (e.g., ϵ) from the subject's in-focus image plane. In response to instructions from the control circuitry, the physical focus of the light field data acquisition device 10 moves, adjusts and/or locates the light field sensor plane 24 before (for example, immediately or substantially immediately before) acquisition or capture of light field image data or information by the light field sensor 14 of the light field data acquisition device 10.

Figure 11A:
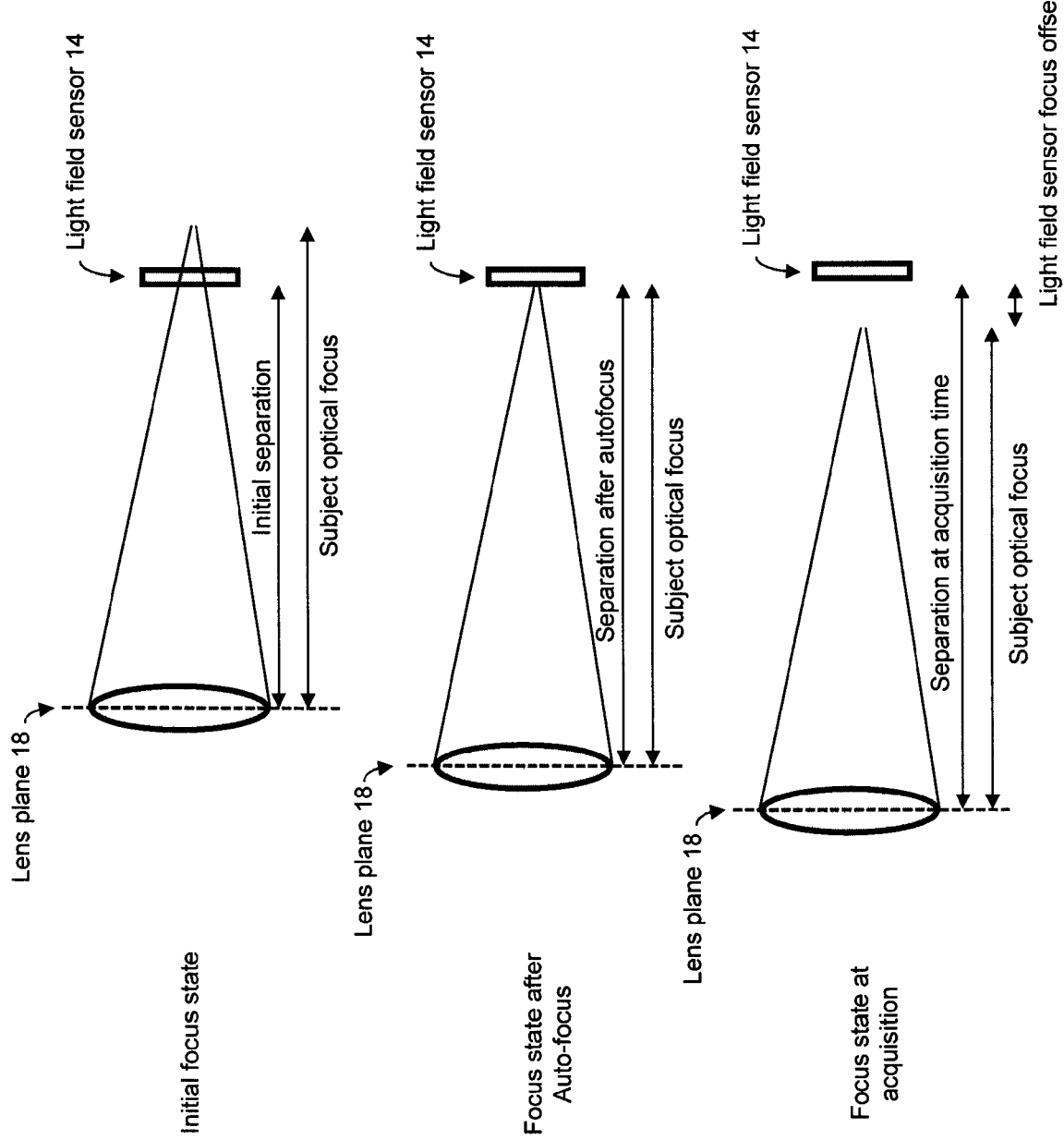
FIG. 11A is a block diagram representation of the relative separation of the lens plane and the light field sensor in an exemplary light field data acquisition device including an auto-focus system, according to at least certain aspects of certain embodiments of the present inventions and/or which may implement certain aspects of certain embodiments of the present inventions, wherein the device starts with a first separation (for example, the separation for the previous capture or acquisition) and using autofocus, adjusts the separation such that there may be a second separation where the subject may be in optical focus on the light field sensor, and prior to acquisition, the separation may be adjusted by a predetermined offset to set a third separation.

With reference to FIG. 11A, in one embodiment the light field data acquisition device 10 may start with an initial separation between lens plane 18 and light field sensor 14. Using an autofocus mechanism (for example, using a Dedicated Auto-focus sensor presented herein), the separation between light field sensor 14 and lens plane 18 may be changed (for example, by mechanically moving the light field sensor relative to the optics) so that the subject may be in a predetermined focus (for example, in optical focus). Before (for example, immediately or substantially immediately before) acquisition or capture of light field image data, light field sensor 14 may be offset by a predetermined amount (for example, to place the subject in a predetermined focus relative to light field sensor 14) relative to the lens plane. Notably, the location of the light field sensor relative to the lens plane may be changed by any means, including but not limited to all systems and techniques presented herein.

Notably, the control circuitry may be implemented via a plurality of discrete or integrated logic, and/or one or more state machines, special or general purpose processors (suitably programmed) and/or field programmable gate arrays (or combinations thereof). Indeed, all circuitry (for example, discrete or integrated logic, state machine(s), special or general purpose processor(s) (suitably programmed) and/or field programmable gate array(s) (or combinations thereof)) to perform the techniques, operations and/or methods, consistent with inventions described and/or illustrated herein, are intended to fall within the scope of the present inventions.

In those embodiments where the light field data acquisition device includes multiple discrete, fixed-focus positions, the control circuitry may control and/or adjust the location of the light field sensor 14 between one of the plurality of discrete, fixed-focus positions (for example, the three position exemplary embodiment of FIG. 10A or four position exemplary embodiment of FIG. 10C) based on one or more considerations. Here, the control circuitry may employ any technique now known or later developed—for example, the control circuitry may determine the location of the light field sensor 14 (and correspondingly the light field sensor plane 24) based on:

the closest fixed-focus position; and/or
the fixed-focus position that provides, allows and/or permits refocusing the furthest towards infinity, such that the imaged object's in-focus plane is within the refocusing range of that fixed-focus position.

Figure 5M:
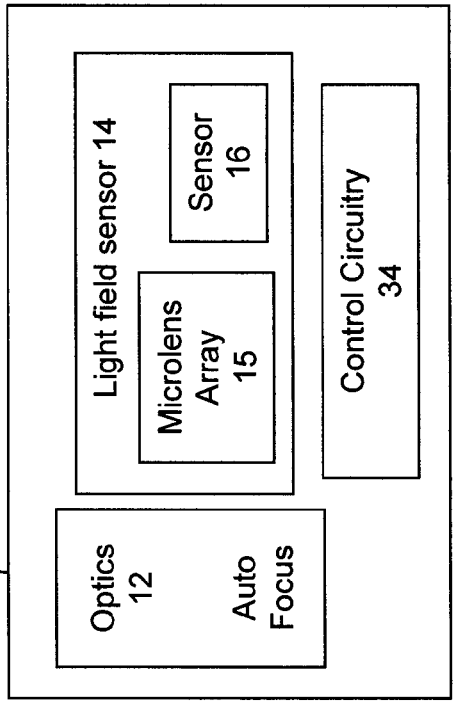
FIGS. 5M and 5N are block diagram representations of exemplary light field data acquisition devices, according to at least certain aspects of certain embodiments of the present inventions and/or which may implement certain aspects of certain embodiments of the present inventions, wherein the light field data acquisition devices include an auto focus system (for example, a conventional type auto focus architecture) and wherein, in certain embodiments, the control circuitry may coordinate the operation of the auto focus system in conjunction with the position of the optics and/or sensor (and microlens array) to provide a predetermined, selected and/or desired focus of the light field data acquisition device.
Figure 5N:
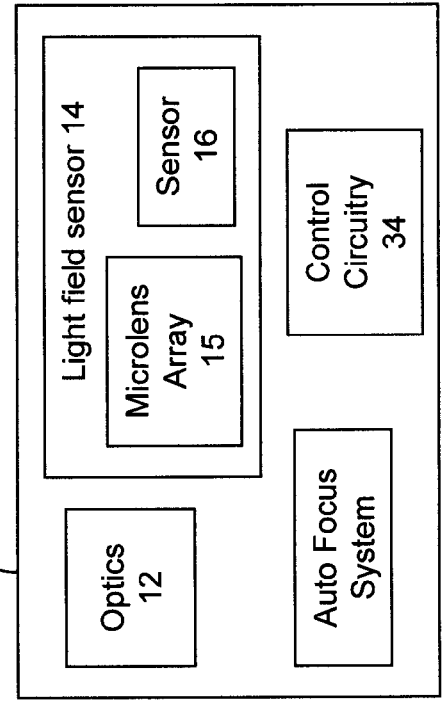
Figure 11B:
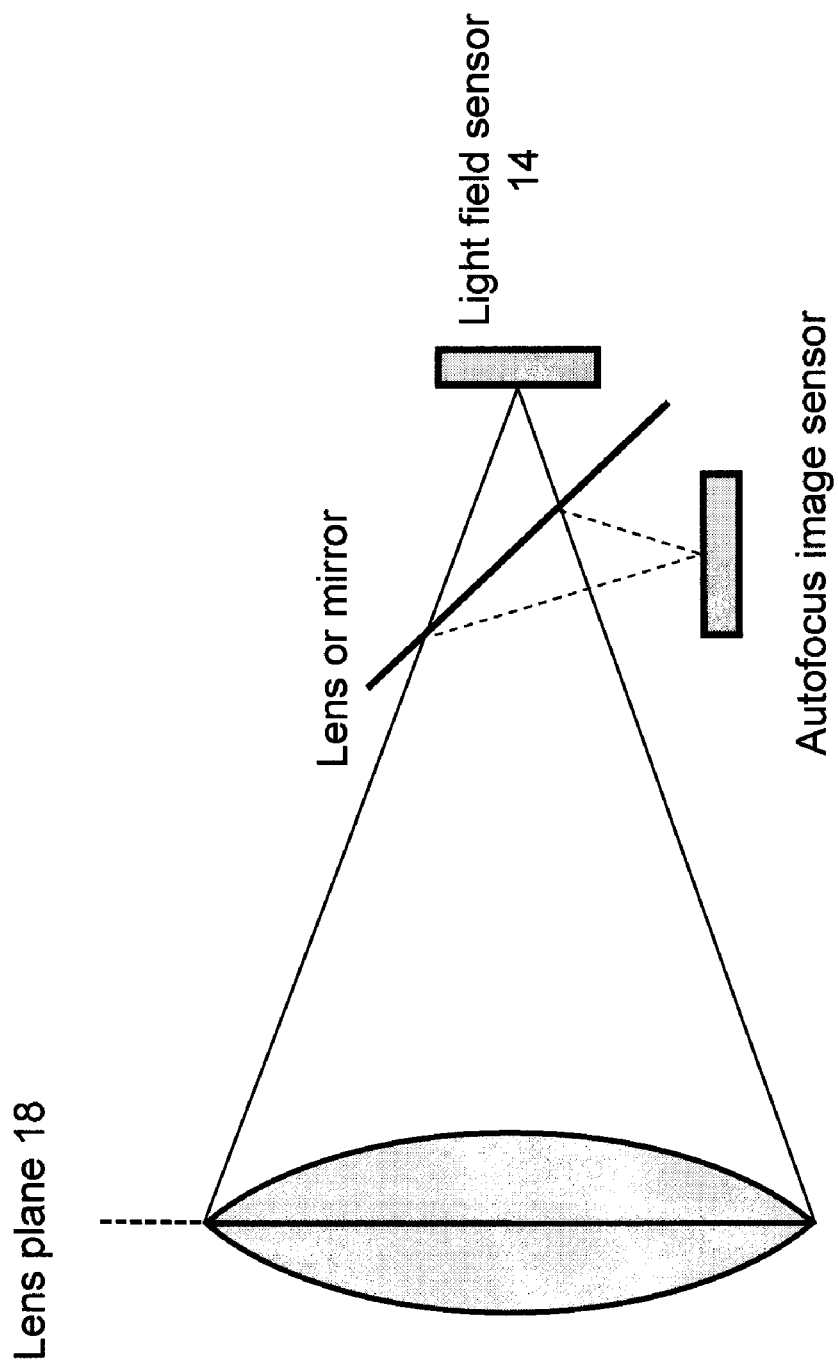
FIG. 11B is a block diagram representation of an exemplary light field data acquisition device containing a second image sensor used for automatic focusing, according to at least certain aspects of certain embodiments of the present inventions and/or which may implement certain aspects of certain embodiments of the present inventions.

Dedicated Auto-Focus Conventional Sensor: In one embodiment, the light field data acquisition device according to the present inventions may employ an off-the-shelf auto-focus system. With reference to FIGS. 5M, 5N and 11B, in this embodiment, the light field data acquisition device may employ a plurality of image sensors, for example, a first image sensor for capturing or acquiring light field image data or information in a first resolution (for example, a high resolution), and a second image sensor to implement or perform auto-focus and capture or acquire a second image data or information set. The second sensor may capture or acquire image data or information at a second resolution (for example, a lower resolution relative to the first resolution). In this embodiment, the auto-focus sensor may not have a microlens disposed in front thereof. Notably, a multiple sensor configuration according to the present inventions may be advantageous in a digital single lens reflex (DSLR) camera or system type configuration or architecture.

With reference to FIG. 11B, in one embodiment, light field data acquisition device 10 may contain light field sensor 14 and a conventional image sensor used for auto-focus. In the figure, a lens or mirror may be disposed between the optics and the light field sensor to divert some or all of the incoming light rays onto the sensor used for auto-focus. The information gathered from the auto-focus sensor may be used and/or analyzed by applying focus metrics (for example, by measuring localized image contrast). These focus metrics may used to guide the focusing system (for example, by adjusting the location of the optics relative to the light field sensor). In some embodiments, the optical path length from the optics to the auto-focus sensor may be the same as or substantially the same as the optical path length from the optics to the light field sensor. In other embodiments, the optical path length from the optics to the auto-focus sensor may be different from, but fixed relative to, the optical path length from the optics to the light field sensor 14. In a specific embodiment, the optical path length from the optics to the auto-focus sensor ($OP_{AF}$) may be fixed relative to the optical path length from the optics to the light field sensor 14 ($OP_{LF}$) in the following manner:

$$OP_{AF} = OP_{LF} - \epsilon$$

Notably, in this specific embodiment, the subject of the auto-focus may be placed at the far end of the designated refocusing range.

Light Field Contrast Auto-Focus: Certain conventional auto-focus systems use image contrast to determine what is in focus or is not in focus. By way of background, at a high level, conventional auto-focus systems transition (typically over approximately a second) the lens' focus over its focus range, and at each position the contrast of regions of the observed image is computed. The focus depth that produces the highest contrast is assumed to be the position at which the imaged subject is in focus.

Figure 11C:
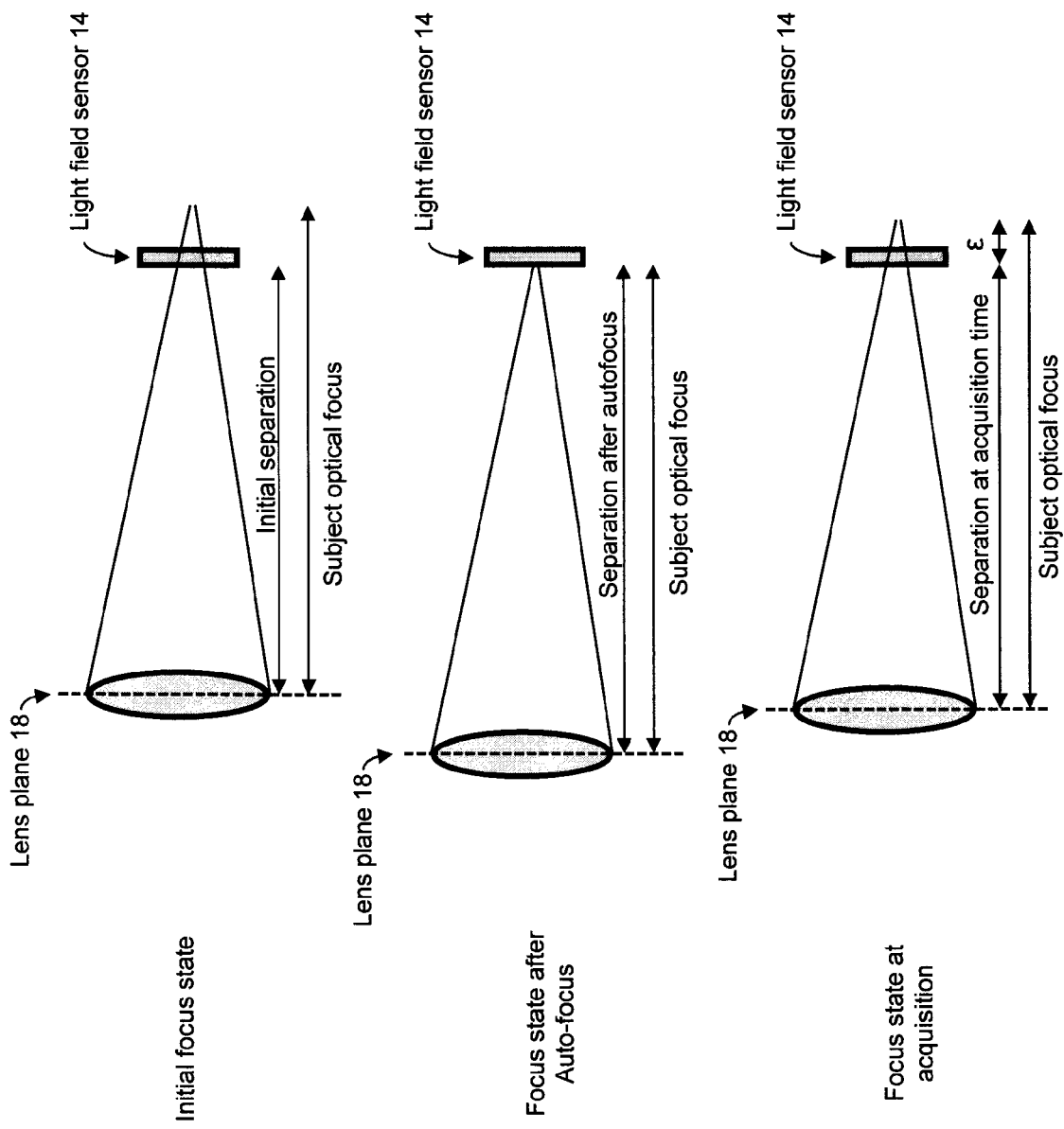
FIG. 11C is a block diagram representation of the relative separation of the lens plane and the light field sensor in an exemplary light field data acquisition device including an auto-focus system, according to at least certain aspects of certain embodiments of the present inventions and/or which may implement certain aspects of certain embodiments of the present inventions, wherein the device starts with a first separation (for example, the separation for the previous capture or acquisition) and using autofocus, adjusts the separation such that there may be a second separation where the subject may be in optical focus on the light field sensor, and prior to acquisition, the separation may be adjusted a distance equal or nearly equal to ϵ to set a third separation.

In an exemplary embodiment of the present invention, a light field data acquisition device 10 according to the present inventions employs such a conventional auto-focusing system (for example, a system that maximizes localized image contrast). (See, for example, FIGS. 5M and 5N). In one such embodiment, the modification of the optical signal on the light field sensor plane 24 due to the microlens array causes the conventional contrast auto focus system to converge the physical auto focus setting onto a position that is approximately equal but slightly offset closer to the lens plane relative to the optical focus position, which is the typical convergence position achieved in a conventional camera. In some embodiments of the present inventions which implement a conventional auto-focusing system, this relative offset may be a fixed distance, for example a multiple of the width of a microlens of microlens array 15, which may be predetermined mathematically or empirically through measurement of the behavior of such a light field data acquisition device. In some embodiments of the present invention, this predetermined offset is used to reposition the location of light field sensor 14 of the light field imaging system relative to the optical focus position after achieving or providing convergence of the physical auto focus setting onto a position that is approximately equal but slightly offset closer to the lens plane relative to the optical focus position. For instance, in one exemplary embodiment, after convergence of the physical auto focus setting in connection with such a position, light field sensor 14 may be repositioned to a distance of $\epsilon$ closer to the lens plane than the optical focus plane (for example, via mechanical system 28) to provide a predetermined range of refocusing (for example, maximal) from the subject at the closest part of the range, and extending beyond. With reference to FIG. 11C and continued reference to this embodiment, the light field data acquisition device 10 may start with an initial separation between the lens plane 18 and the light field sensor 14. Using an autofocus mechanism (for example, using Light field contrast auto-focus presented herein), the separation between the light field sensor 14 and lens plane 18 may be changed (for example, by mechanically moving the light field sensor relative to the optics) so that the subject may be in a predetermined focus (for example, in optical focus). Before (for example, immediately or substantially immediately before) acquisition or capture of light field image data, the light field sensor 14 may be offset by $\epsilon$ relative to the optics, such that the separation is decreased by $\epsilon$. Notably, the location of the light field sensor 14 relative to the lens plane 24 may be changed by any means, including but not limited to all systems and techniques presented herein.

Image Contrast Metric for Light Field Data Acquisition Device: In a conventional image, high image contrast often indicates in-focus regions and low image contrast tends to indicate out-of-focus regions. In one embodiment, a light field data acquisition device, according to certain aspects of the present inventions, employs an auto-focusing system (having processing and/or control circuitry) that determines the degree of focus of predetermined regions based on alternate metrics. (See, for example, FIGS. 5M and 5N). That is, in one embodiment, the auto-focus system according to an embodiment of the present inventions may assess, determine and/or analyze an image corresponding to light field image data (acquired by the light field data acquisition device) and, the auto-focus system, based thereon, may determine the degree of focus of a region. For example, the light field data acquisition device having the auto-focus system may determine the degree of focus based on: a high contrast within a light field disk image indicates an out-of-focus region, and a low contrast within a light field disk image indicates an in-focus region. As such, in one embodiment, the physical auto-focusing system implemented in a light field data acquisition device according to the present inventions employs a metric that is different from metrics employed by conventional auto-focusing systems.

Figure 17A:
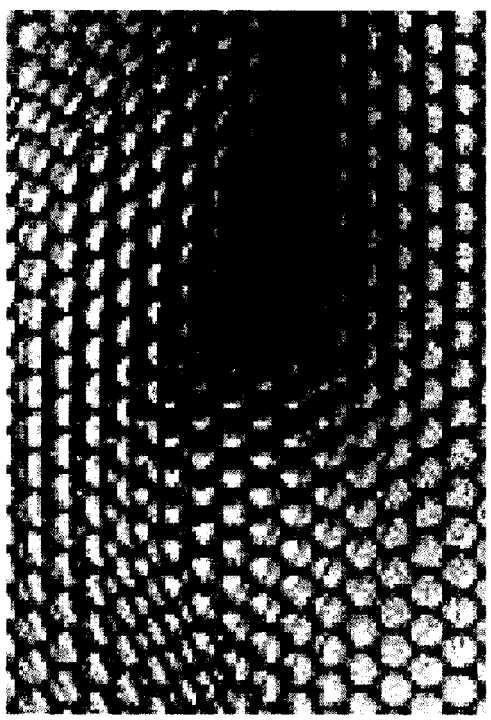
FIGS. 17A and 17B show images corresponding to a region of light field data containing an image of an eye, wherein, in contrast in FIG. 17A, the plane of focus for the eye and the light field sensor plane are not aligned while in FIG. 17B the plane of focus for the eye and the light field sensor plane are aligned.
Figure 17B:
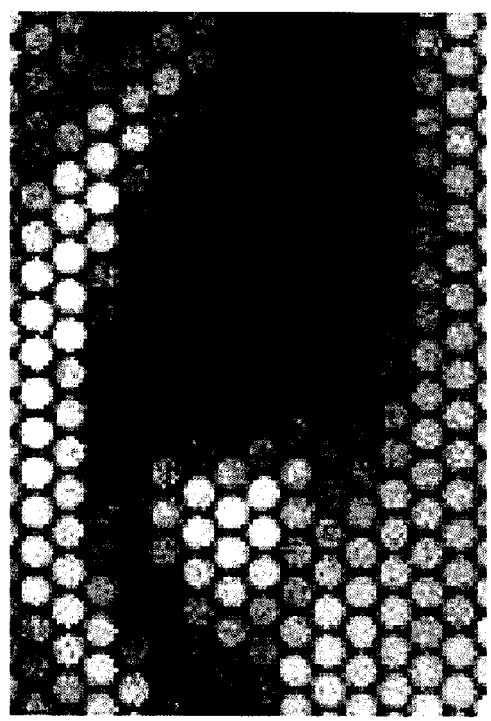

With references to FIGS. 17A and 17B, these figures illustrate the variation in contrast in light field disk images as focus changes. In FIG. 17A, the subject is out of focus, resulting in individual light field disk images with relatively higher variation of pixel colors. In contrast, FIG. 17B displays the same area with the subject in focus, resulting in individual light field disk images with relatively lower variation of pixel colors. In one embodiment, the light field data acquisition device may acquire a series of light field image data samples where the focus may be varied with each sample. For each disk in each sample, a focus metric may be applied (for example, the statistical variance or standard deviation of pixel values) to each light field disk image. These focus metric scores may be aggregated (for example, summed for all light field disk images in a sample) for each sample, and may be used to select a depth of predetermined focus (for example, by using the lowest aggregate variance to determine a depth of sharpest focus).

Notably, in one embodiment, circuitry in the auto-focus system of the light field data acquisition device of the present inventions may discard or ignore information or data associated with edges of disks of the microlens array when determining or analyzing a light field contrast of one or more portions of a light field image. In this regard, in this embodiment, the auto-focus system of the light field data acquisition device (when determining whether or not an object or subject is in a predetermined focus) may improve or enhance the quality of a light field contrast physical auto-focus system by disregarding or ignoring pixels corresponding to disk-edges and concentrating on data or information associated with other pixels of the sensor—i.e., pixels corresponding to non-edges.

Scene-Based Light Field Auto-Focus: In addition to light field contrast metrics, or in lieu thereof, an auto-focus system according to the present inventions may employ a scene-based light field metric. In this regard, given that a light field data from a light field data acquisition device is capable of refocusing an image over a range of scene depths (after acquisition of the image data), in one embodiment, the light field data acquisition device employs an auto-focus system that determines the depth that is in a predetermined focus (for example, in-focus) at one or more spatial locations in a given image or scene, and based thereon determines, selects and/or identifies a focus position of the optics of the light field data acquisition device such that one, some or all (or as many as practically possible) of those depths are within the refocusable range of the acquired or captured light field image data. Based the determined focus position, the auto-focus system may configure the optics (and/or the position of the sensor and microlens array) of the light field data acquisition device.

For example, in an illustrative example, where a scene contains a plurality (for example, two) subjects and/or objects at different distances from the light field data acquisition device, the auto-focus system may determine, select and/or identify a focus position between the two subjects and/or objects. Indeed, light field data acquisition device 10 may determine the optimal focus position is in between such subjects and/or objects, to enable after-the-fact refocusing to bring either or both into a predetermined focus—or to bring both as close as possible to the a predetermined focus or focuses. In one embodiment, the auto-focus system of the light field data acquisition device may determine and configure the focus position of the optics (and/or the position of the sensor and microlens array) to provide the same or substantially the same predetermined focus for plurality of the subjects.

Notably, auto-focus systems according to the present inventions may employ any technique now known or later developed—for example, where there exists a plurality or list of in-focus image plane locations (for different spatial parts of the scene), the focus position of the light field data acquisition device may be determined or based (at least in part) on:

Use the mean image plane location; and/or
Use the image plane location which permits refocusing to the greatest number of in-focus image locations.

Such a plurality or list of focus positions may be generated, determined and/or produced by assessing, analyzing and/or determining the focus depth on a regular grid of image positions, for example by using an M×M or M×P grid of positions of a pre-image that are shown or provided to the user or operator (for example, via a user interface having a viewfinder or LCD or the like display, for example, provided to the user or operator during live-viewing) to determine an appropriate, selected and/or predetermined focus. (See, for example, a 3×3 grid in the exemplary illustration of FIG. 12).

Notably, any technique or method now known or later developed to implement after-the-shot focusing may also be applied to the imaged light field pre-shot by a light field physical auto-focus system.

Selection of Microlens Resolution: As noted above, in certain embodiments of the present inventions, the light field data acquisition device may position the optics and/or light field sensor 14 such that after-the-fact light field processing (i.e., processing of light field data) is capable of refocusing from a predetermined distance relative to the light field data acquisition device (for example, a minimum close distance) to another predetermined distance (for example, infinity or optical infinity). For example, where the framed object is a human face, a field of view is on the order of 15-30 cm by 15-30 cm; under these circumstances, other parameters of the light field data acquisition device (for example, sensor size, lens focal length, desired output resolution and sharpness, F-number, microlens diameter, etc.) may be selected, implemented, determined and/or chosen to provide a refocusing of the light field image data from infinity (or approximately infinity) to a close or predetermined distance which also provides the predetermined field of view.

For example, if parameters of the light field data acquisition device are fixed except for the zoom range of the lens of the optics, and the light field data acquisition device is to be designed to have a passive auto focus system such as the one in FIG. 4, then the longest focal length in the zoom range of the lens of the optics may be determined, set and/or implemented by, for example, tightly framing an object (for example, a human face) at a distance that corresponds to the close refocus distance. In this regard, the close refocus distance (hence the size of the field of view that is framed at that distance) may be an increasing function of the focal length of the optics of the light field data acquisition device. Hence, the maximum focal length of the zoom lens system may be constrained to be the maximum number that satisfied the framing condition.

Figure 18:
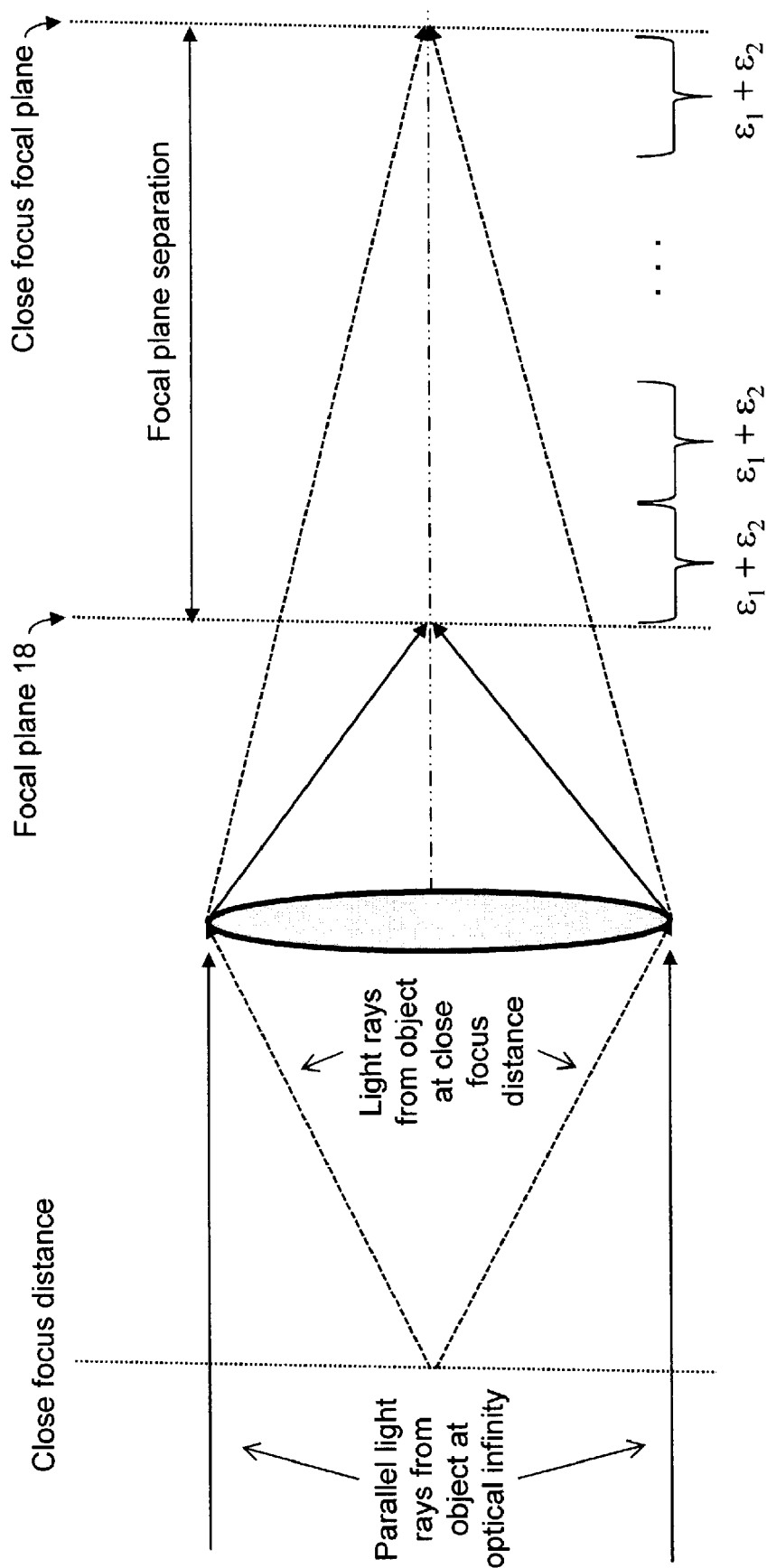
FIG. 18 is a block diagram representation showing how the number of discrete focus positions may be determined based on the main lens, a close focus distance, and $\epsilon$, according to at least certain aspects of certain embodiments of the present inventions and/or which may implement certain aspects of certain embodiments of the present inventions.

In another embodiment, in addition to or in lieu of the focal length parameter, another parameter of the light field data acquisition device that may be varied based on the predetermined (for example, minimum) close distance is the number of fixed focus positions to use. In one embodiment, with reference to FIG. 18, the number of fixed-focus positions may be determined based on a close focus distance and a light field sensor 14. In FIG. 18, the locations of the infinity focal plane and the close focus focal plane are separated by a distance determined by the optics and the close focus distance. In order to obtain full coverage of the focus range, the light field data acquisition device may use the following number of fixed-focus positions:

$$Num\text{Positions}=\text{ROUND-UP}(\text{Focal plane separation}/(\epsilon_1+\epsilon_2)),$$

Where ROUND-UP is a mathematical function taking one argument and returning the smallest integer larger than the given argument. Notably, the formula above may construct focus positions such that each potential focal depth may be within the refocusing range of one focus position. In some embodiments, the number of focus positions may be greater to allow overlapping zones of focus.

In another embodiment, the resolution of the microlens array 15 (for example, the total number of lens elements in the microlens array) may be selected, defined, determined and/or chosen to provide, facilitate and/or enable a trade-off between the ability to refocus an image and the output resolution of computed images. As noted herein, larger values of N allow for an increased range of refocusability, but may result in refocused images with a lower maximum resolution. In some exemplary embodiments, the light field data acquisition device 10 has a value for N such that $8 \leq N \leq 12$.

Notably, in addition to selecting, defining and/or choosing the microlens resolution to provide or enable a predetermined or given refocusing capability, or in lieu thereof, the microlens resolution may be selected, defined, determined and/or chosen to provide, facilitate and/or enable minor focus corrections of images captured using a data acquisition device with a physical focus system, such as a DSLR. In some embodiments, the light field data acquisition device 10 may employ a light field sensor 14 with more limited refocusing ability (for example, using a smaller number for N) in order to produce higher resolution computed images. In some embodiments, the light field data acquisition device may 10 include manual or automatic focusing mechanisms that attempt to capture the light field image in sharp optical focus, and processing circuitry may in some circumstances compute refocused frames using the focus of the light field as it was captured or acquired. As an exemplary embodiment, a DSLR style light field data acquisition device 10 may include a high resolution sensor (for example, 50 mega pixels to 1000 mega pixels) and a high resolution microlens array (for example, containing 1 million to 20 million lens elements). This exemplary embodiment may comprise a small N (for example, $2 \leq N \leq 8$). In one embodiment, light field sensor 14 in the light field data acquisition device 10 may have an N that is between 5 and 7. Notably, some exemplary embodiments may also perform aberration correction to improve the quality of refocused frames (see, for example, United States Patent Application Publication 2009/0128669, titled "Correction of Optical Aberrations", and the provisional applications to which it claims priority; United States Patent Application Publication 2007/0252074, and the provisional application to which it claims priority; and Ren Ng's PhD dissertation, "Digital Light Field Photography", Stanford University 2006, all of which are incorporated here in their entirety by reference), In other embodiments, it may be desirable to enable dramatic refocusing over a large range of focus (for example, in order to bring a face that was originally unrecognizable into sharp focus). In some embodiments, a light field data acquisition device 10 designed for dramatic refocusing may have an N which is greater the 12.

Determination of Light Field Sensor Placement for Fixed-Focus: In some embodiments, the placement of the light field sensor relative to the focal point may be determined by calculating and/or determining a maximum distance $\epsilon$ where subjects at or near optical infinity may be brought into sharp focus based on the properties and/or configuration of the light field data acquisition device, and placing the light field sensor at that distance $\epsilon$ beyond the focal point relative to the optics.

Notably, in many of the following embodiments, the optical depth of field of the optics with respect to the light field sensor does not include optical infinity. For clarity, as a way of illustration, in many of the following embodiments, if the light field image sensor were replaced with a conventional imaging sensor placed in the same manner, pictures of subjects at optical infinity would not appear sharp.

Briefly, the selection of $\epsilon$ (and the location of the light field sensor) may be performed such that the light field sensor may be placed the maximum distance beyond the focal point of the optics which allows processing circuitry to compute an image, virtually refocused onto a subject appearing at optical infinity, where that subject appears visually sharp to an observer. In comparison to a device where the light field sensor is placed in such a manner, in the cases where $\epsilon$ may be greater (and the light field sensor is further from the focal point), images refocused to a subject appearing at optical infinity may appear soft and/or out of focus to an observer. Further, in cases where $\epsilon$ may be smaller (and the light field sensor is closer to the focal point), light fields acquired by the device may not be able to focus as sharply onto subjects close to the device.

In one embodiment, $\epsilon$ (and the location of the light field sensor) may be selected such that the light field sensor may be placed the maximum distance beyond the focal point of the optics which allows processing circuitry to compute an image, virtually refocused to a subject appearing at optical infinity, which appears visually sharp to an observer, and further, that such image an image may appear substantially at least as sharp as an image refocused onto a subject appearing to be at a location "beyond optical infinity". Briefly, when referring to a subject appearing at a location "beyond optical infinity" and/or "focusing beyond optical infinity", "beyond optical infinity" may be characterized as a subject and/or ray source in which the rays appear to be divergent relative to the optics of the light field data acquisition device. As a way of example, parallel rays passing through a concave lens or lens group prior to passing through optics of the light field data acquisition device, would appear divergent relative to the device, as if they had originated from a subject "beyond optical infinity". In a similar manner, a refocused image computed using a virtual plane of focus that is located closer to the optics than the focal point, may be characterized as "focusing beyond optical infinity".

Notably, the appearance of visual sharpness may vary as the size of the computed refocused images is changed. As a result, images computed at smaller resolutions (for example, 640×480 pixels) may appear sharp when the same image computed at a larger resolution (4000×3000 pixels) would not.

As noted herein, selection of the appropriate value(s) for $\epsilon$ may vary based on the intended output resolution of refocused images. In some embodiments, the following formula may be used:

Let $W_{MLA}$ equal the width of the microlens array, in number of lens elements Let $W_{output}$ equal the width of the refocused image, in number of pixels Determines $\epsilon$ such that:

$$\varepsilon = \frac{C * N_{usable} * W_{MLA} * F\#_{optics} * m}{W_{output}}$$

where C is a constant. In some embodiments, $0.7 \leq C \leq 3$. In these embodiments, minimum and maximum values for $\epsilon$ are established based on the intended resolution of images computed from light fields captured by the device.

In another embodiment, $\epsilon$ (and the location of the light field sensor) may be determined for devices where the sharpness of the computed images may not be limited by the resolution of the computed images (for example, when the resolution of the computed images is more than sufficient to accurately depict all details that may be captured). In these embodiments, $\epsilon$ may be selected without regard for the output resolution of computed images and may be based on the formula previously presented herein:

$$\epsilon = KN_{usable}m(F\#_{optics})$$

In some embodiments, a minimum value for $\epsilon$ may be established at the point where the diameter of the optical blur on the light field sensor from rays originating at optical infinity is at least m (the diameter of a microlens). In these embodiments, $b \geq m$, which, solving for K, leads to:

$$b \geq m$$

$$\epsilon = b(F\#_{optics})$$

$$\epsilon = KN_{usable}m(F\#_{optics})$$

Thus, $$K \geq 1/N_{usable}$$

Notably, as the diameter of the blur introduced by misfocus at this separation equals the size of a microlens diameter, the optical depth of field of the optics with respect to the light field sensor may be considered to end nearer to the device than optical infinity. In other embodiments, a minimum value for $\epsilon$ may be established at the point where the diameter of the optical blur on the light field sensor from rays originating at optical infinity is at most $N_{usable}*m$, which may allow refocusing with detail maintained to approximately the resolution of the microlens array. In these embodiments, $K \leq 1.0$. In one exemplary embodiment, $1/N_{usable} \leq K \leq 1.0$. In a specific exemplary embodiment, $K = 0.6$.

Figure 21:
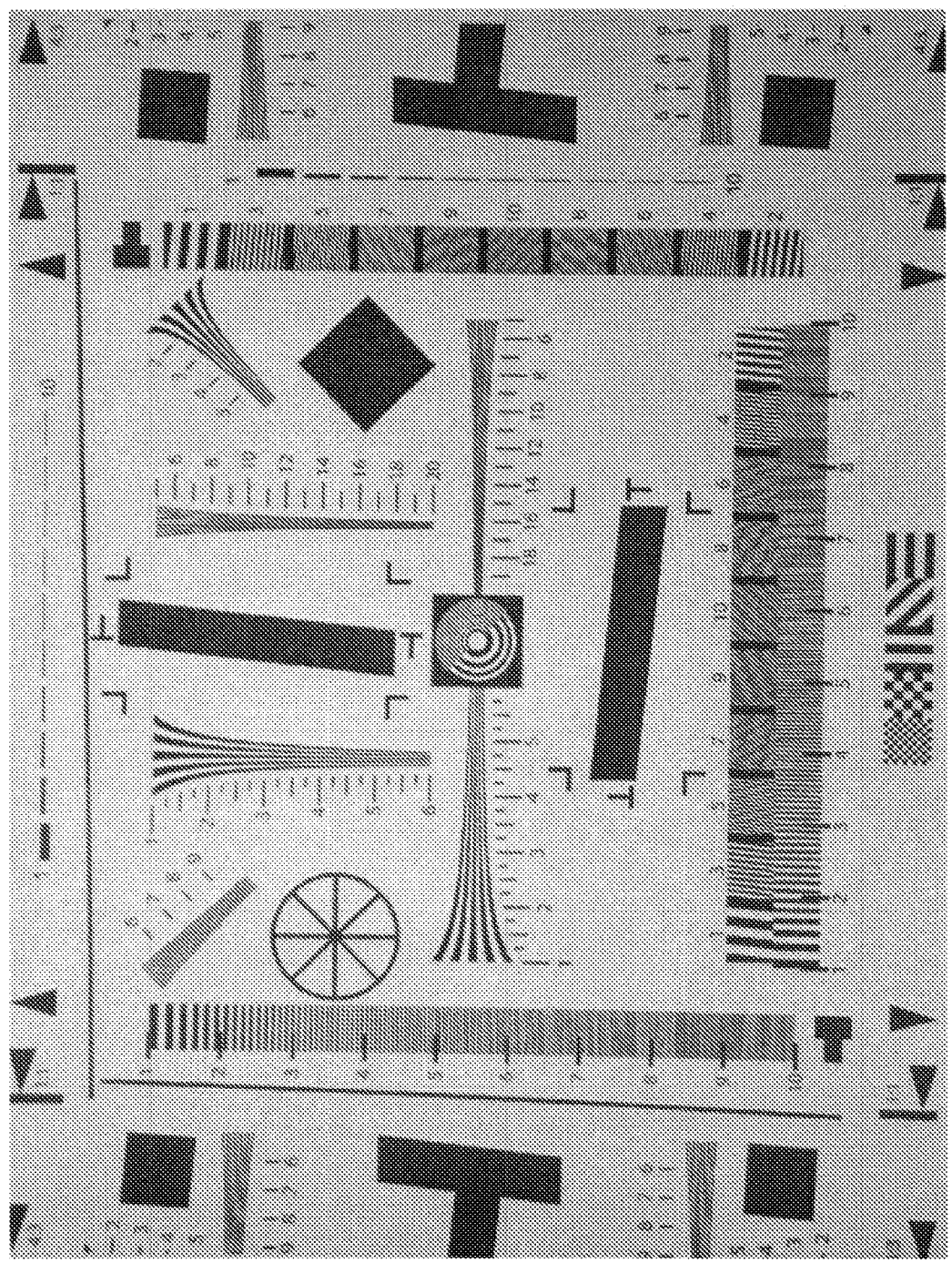
FIG. 21 is an image of an exemplary resolution chart used to measure lines per picture height (LPH).

In another embodiment, $\epsilon$ (and the location of the light field sensor) may be determined based on the output resolution of computed images and empirical analysis of the resolution of computed refocused images. In this embodiment, the resolution of the image in lines per picture height (LPH) may be measured across a range of values for $\epsilon$ (for example, by taking pictures of a resolution chart (see, for example, International Standards Organization, Standard 12233 (www.iso.org) or the like)). In this manner, $\epsilon$ may be selected as the largest or near largest value such that an image refocused onto a subject located at or near optical infinity would appear sharp at the output resolution. In one embodiment, the measurable resolution in LPH of the scene refocused to optical infinity may be between 0.5 and 0.8 times the height of the computed image size, in pixels. Briefly, lines per picture height (LPH) may be characterized as the number of distinct lines that may be distinguished across a distance equal to the height of the picture. One way of measuring LPH may be to acquire an image of a specifically designed resolution chart (see, for example, FIG. 21), and then determine by inspection the highest number of lines that can be visually distinguished.

In another embodiment, $\epsilon$ (and the location of the light field sensor) may be determined based on the maximum resolution of computed images and the empirical resolution of computed refocused images. Briefly, in this context the maximum resolution is the maximum resolution in LPH for a refocused image sharply focused at any value for $\epsilon$. In this embodiment, the resolution in LPH may be measured across a range of values for $\epsilon$ (for example, by using a resolution chart (see, for example, International Standards Organization, Standard 12233)). In this manner, $\epsilon$ may be selected as the largest or near largest value such that an image refocused onto a subject located at or near optical infinity would maintain a measurable resolution in LPH of a fraction of the maximum resolution.

Notably, in cases where the measurable resolution may be limited by the size of the computed images, the height, in pixels, of the computed image may be considered the maximum resolution (for example, the maximum possible resolution in LPH of an image 640×480 pixels may be considered 480).

Generally, as $\epsilon$ increases, the measurable resolution for an image, focused sharply and computed at a virtual focus depth a distance $\epsilon$ from the light field sensor plane, decreases. In some embodiments, it may be desirable that an image computed to focus on a subject located at or near optical infinity appears sharp to the viewer. In these embodiments, the location of $\epsilon$ may be set such that the measurable LPH of images refocused to subjects located at optical infinity is a minimum fraction (for example, one half) of the maximum resolution. Notably, in these embodiments, an upper bound may be determined for E. Furthermore, under normal circumstances, the ability of the light field data acquisition device to enable sharp refocusing onto subjects beyond optical infinity may not be needed. Indeed, by making $\epsilon$ too small, the device may lose the ability to sharply focus on subjects near the device (for example, at the close focus distance). In some embodiments, $\epsilon$ may be set such that the measurable LPH of images refocused to subjects located at optical infinity is no greater than a fraction (for example, four-fifths) of the maximum measurable LPH. Notably, in these embodiments, a lower bound may be determined for $\epsilon$. In one embodiment, measurable resolution in LPH of the scene refocused to optical infinity may be between 0.5 and 0.8 times the LPH of the maximum resolution for the device.

As noted herein, in some embodiments $\epsilon$ may be determined in order to allow a range of refocusing from infinity to a close focus distance. With that in mind, in one embodiment, one of the predetermined distances (for example, the minimum close distance) is determined and fixed (for example, temporarily or permanently, and/or during manufacture, at start-up) by framing an object (for example, a human face). In one embodiment, $\epsilon$ may be determined, where:

Let $L_{focal}$ be equal to the focal length of the main lens, in millimeters

Let $H_{sensor}$ be equal to the height of the sensor, in millimeters

Let $H_{subject}$ be equal to the height of the subject, in millimeters

Such that:

$$\varepsilon \geq \frac{1}{2 * \left( \frac{1}{L_{focal}} - \frac{H_{sensor}}{L_{focal} * H_{subject}} \right)} - \frac{L_{focal}}{2}$$

In this manner, $\epsilon$ may be selected such that the light field sensor plane is placed evenly between the focal plane of the optics and the plane of focus for an object located at the selected close focus distance. In an exemplary embodiment, the chosen close subject is a human face, hence $H_{subject}$ is chosen to be approximately 300 millimeters. In another exemplary embodiment, the chosen close subject is a standing human, hence $H_{subject}$ is chosen to be approximately 2000 millimeters.

Zoom Lens with Constant Exit Pupil: Some designs for main lenses have the characteristic that the exit pupil changes its apparent size and/or location as the physical focus and/or zoom changes. Utilizing such a main lens design in a light field data acquisition device, may affect the geometry of the captured light field as a function of physical focus and/or zoom. Under these circumstances, there are various approaches that the light field data acquisition device of certain aspects of the present inventions may implement to address this phenomenon, including:

Calibrate the light field processing such that at each focus/zoom position, the processes are able to model the geometry with sufficient accuracy as a function of the focus/zoom position; and/or Use a main lens design in which the exit pupil's size and position does not change with zoom and/or focus. One example of this design is to have static (non-moving) lens elements between the aperture of the light field data acquisition device and the sensor thereof, with all moving lens elements between the aperture and the scene (outside World).

In some embodiments, the light field data acquisition device may be calibrated at each focus/zoom position to create a geometric model of the light field disk images as they project onto the imaging sensor. This calibration may be performed in the following manner:

Acquire or capture a light field image for that zoom/focus position of an evenly illuminated or low contrast scene (for example, a wall). It may be desirable to capture this image using a small aperture.

Determine the geometric parameters, starting with known values, including pixel size, microlens size, pixel pattern, and microlens grid pattern.

Find the center of an initial light field disk image, by maximizing the value of a search function.

In one search function, a series of potential microlens centers are tested (for example, a grid spaced at ¼ pixel increments).

For each potential center, a spatial filter may be applied (for example, a cubic filter with a positive area equal to the expected area of a light field disk image.

The potential center with the largest score may be selected as the center of the microlens element.

Estimate the location of a neighboring light field disk center using the previously determined center and the known parameters (pixel size, microlens size, and grid patterns).

Determine the center of the neighboring light field disk center using the estimated center and by maximizing the value of a localized search function (for example, as described above).

Continue finding light field disk centers by estimation and search function (as in the previous 2 steps) until enough centers are located (for example, all centers or all centers inside a 500 pixel border).

Use the centers located to create a geometric model that is a good fit for the determined data.

In one embodiment, the light field disk image grid pattern (for example, rotation and separation of light field disk image grid coordinates) and offsets (for example, the X and Y offset from the center pixel to a light field disk image grid coordinate).

In some embodiments, the geometric model determined from calibration is used when computing refocused images. (See, for example, Ren Ng's PhD dissertation, "Digital Light Field Photography", Stanford University 2006, U.S. Provisional Application Ser. No. 61/170,620, entitled "Light Field Camera Image, File and Configuration Data, and Method of Using, Storing and Communicating Same", filed Apr. 18, 2009.

Device Optics for Maximizing Captured Directional Resolution Across Zoom or a Predetermined Portion Thereof: A typical zoom lens property is to have the lens' aperture vary with the focal length. For example, a lens may be f/2.8 at its 35 mm zoom position, and f/5.6 at its 200 mm zoom position. In a light field data acquisition device, the nature of the light captured relates to the relationship between the microlens F-number and the main lens F-number, as is illustrated in FIG. 13.

Figure 13:
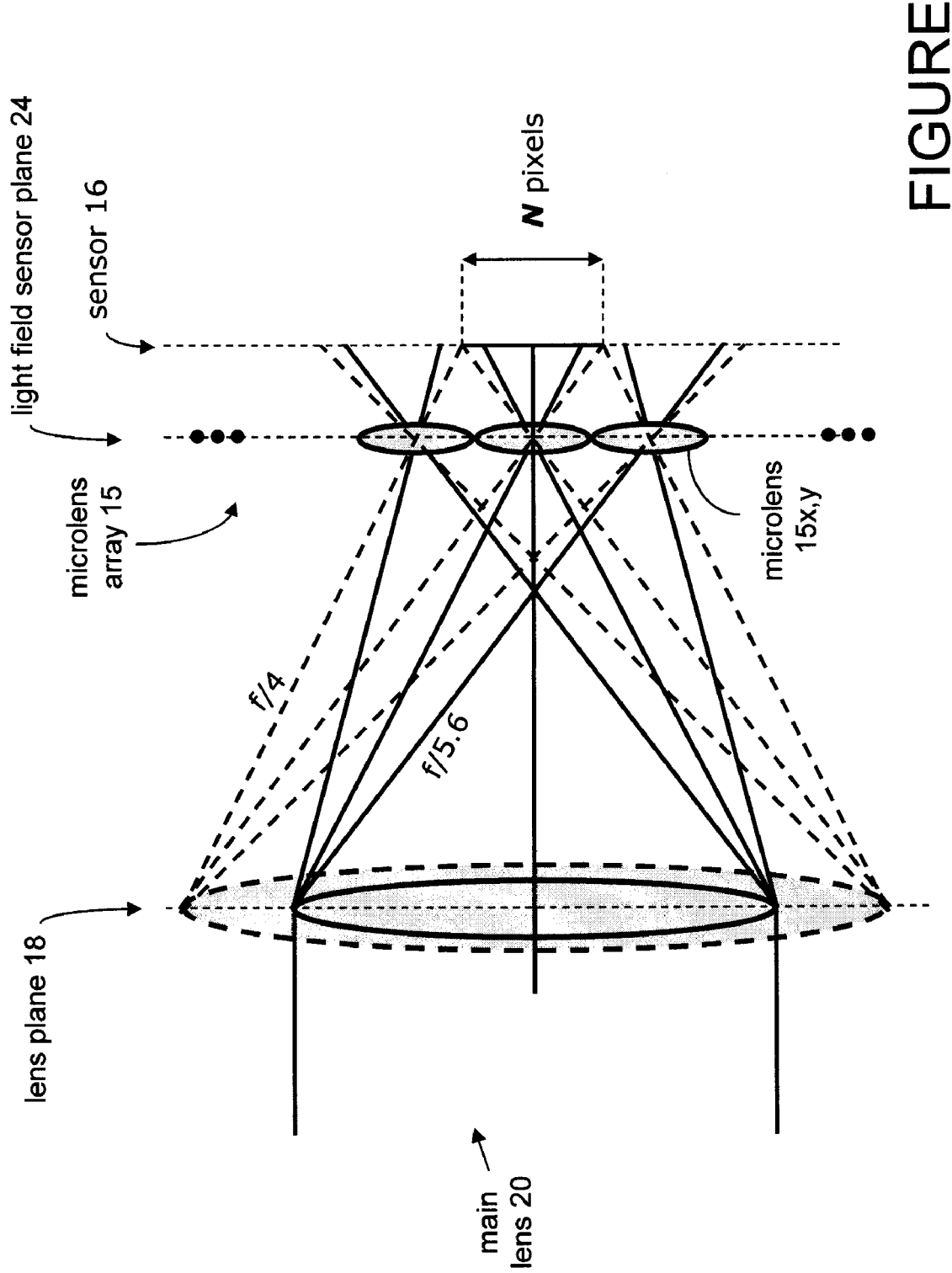
FIG. 13 illustrates the nature of the light captured in relation to the microlens F-number and the main lens F-number, wherein when the F-number of the main lens is higher than the F-number of a microlens of the microlens array, the "disk images" that appear on and are captured by the sensor are smaller, which may reduce the directional resolution of the acquired, sampled and/or captured light field.
Figure 14A:
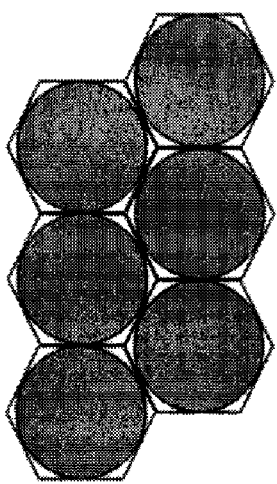
FIGS. 14A, 14B and 14C illustrate exemplary disk image projections and a relationship between the F-number of the main lens and the F-number of a microlens of the microlens array on the acquired, sampled and/or captured light field by the sensor; wherein, in contrast with the "full-sized" disk images of the microlens array as projected on the associated sensor array (FIG. 14A), when the F-number of the main lens is higher than the F-number of a microlens of the microlens array, the light field projects smaller disk images on the associated sensor array and the unshaded areas of the disk images (FIG. 14B), which correspond to non-illuminated sensor pixels that do not acquire, sample and/or capture light field data and, as such, do not contribute to the image and may be characterized as "wasted" or "unused" pixels or sensors, and correspondingly, when the F-number of the main lens is smaller than the F-number of a microlens of the microlens array, the light field projects larger disks on the associated sensor array (FIG. 14C)
Figure 14B:
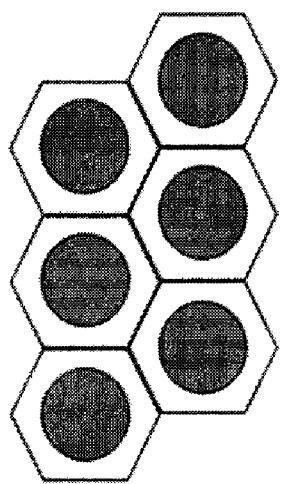

With reference to FIGS. 3A and 13, where the F-number of main lens 20 is higher than the F-number of a microlens (x,y) of array 15, then the "disk images" that appear on and are captured by sensor 16 are smaller, and in effect the directional resolution of the captured light field is reduced. This is shown in an illustrative light field image, in which FIG. 14A shows "full-sized" disk images, and FIG. 14B shows smaller disk images; the unshaded areas correspond to non-illuminated sensor pixels that are wasted or unused. In some embodiments, the usable number of pixels across each microlens disk image, $N_{usable}$, that may be used for processing may be reduced using the following:

$$N_{usable} = N * F\#_{MLA}/F\#_{optics}$$

Figure 14C:
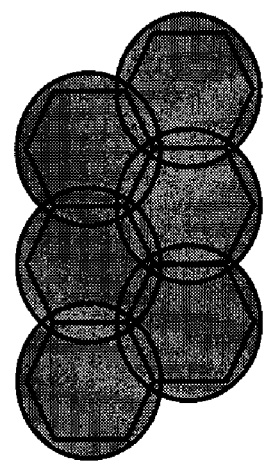

Correspondingly, where the F-number of the main lens 20 is smaller than the F-number of a microlens of array 15, then the "disk images" that appear on and are captured by sensor 16 are larger, and in effect overlap. This is shown in an illustrative light field image, in which FIG. 14C shows overlapping disk images. In some embodiments with overlapping disk images, the usable number of pixels across each microlens disk image, $N_{usable}$, is given by the following:

$$N_{usable} = N * (2.0 - F\#_{MLA}/F\#_{optics})$$

In a further embodiment, $N_{usable}$ may be reduced by the width of one or two pixels. Main Lens with F-Number Independent of Zoom: With the aforementioned in mind, in one embodiment, the light field data acquisition device, according to certain aspects of the present inventions, may include a main lens which provides, includes and/or maintains the same or substantially the same effective aperture (e.g. constant exit pupil) across its zoom range, or a predetermined portion thereof, and/or which correlates or matches to the F-number of a microlens of the microlens array. With reference to FIGS. 3A and 15, in one embodiment, light field data acquisition device 10 includes a mechanism to stop down the aperture of main lens 20 for shorter focal lengths in order to match the highest F-number of main lens 20 across its range of zoom and/or range of focus.

In another embodiment, the light field data acquisition device includes a main lens having a constant or substantially constant F-number (for example, a maximum F-number). In one embodiment, the lens elements of the optics between the aperture of the light field data acquisition device and the sensor-side of the lens do not vary with zoom position, focus and/or the image of the aperture as seen from the perspective of the sensor does not vary. Briefly, there are commercially available zoom lenses that maintain a constant or substantially constant maximum F-number across a range of zoom positions. In some exemplary embodiments of the present aspect of the inventions, the design of the acquisition system selects such lenses, or adopts such design for lenses, that maintain a constant or substantially constant maximum F-number across a range of zoom positions, Notably, any lens design currently known or invented in the future, which maintains a constant or substantially constant maximum F-number across a range of zoom positions, is intended to fall within the scope of the present aspect of the inventions.

In addition, there are commercially available zoom lenses that maintain a constant or substantially constant exit pupil across a range of zoom and/or optical focus positions. In some exemplary embodiments of the present aspect of the inventions, the design of the acquisition system selects such lenses, or adopts such design for lenses, that maintain such a constant or substantially constant exit pupil across a range of zoom and/or optical focus positions. Notably, any lens design currently known or invented in the future, which maintains a constant or substantially constant exit pupil across a range of zoom and/or optical focus positions, is intended to fall within the scope of the present aspect of the inventions.

In sum, by maintaining a constant exit pupil in ways such as these, or by employing other techniques or structures to provide a constant exit pupil, the captured disk images may be "full-sized" or more full-sized across all zoom or focus positions and/or a portion thereof.

Live View

Notably, the light field data acquisition device may include processing circuitry 38 to compute images (using light field data or information acquired, sampled, sensed and/or obtained by light field sensor 14) for real-time (or near real-time) display to the user or operator via user interface 36. (See, for example, FIG. 3B). In one embodiment, data which is representative of the images is provided to a display of user interface 36 on data acquisition device 10, in a real-time or near real-time manner, during subject composition and before image data or information acquisition for the final image. This may be referred to herein as a "live-view" mode.

The live-view processing may be implemented using any light field processing technique now known or later developed, including, for example, a fully general high-quality refocusing computation featuring scene analysis to determine what focus depth and aperture to use for the displayed image. All such light field data acquisition and/or processing techniques to implement live viewing are intended to fall within the scope of the present inventions.

For example, in one embodiment, processing circuitry 38 of light field data acquisition device 10 generates a live-view image using a portion of the data or information collected, acquired and/or sampled by light field sensor 14. In this regard, light field data acquisition device 10 may down-sample to accelerate generation of image data which is representative of the images to be provided to user interface 36

(for example, a display) during the live-view process. For example, in one embodiment, light field sensor 14 of light field data acquisition device 10 (or circuitry associated therewith) may sub-sample and/or down-sample the light field image by storing, reading, sampling and/or obtaining a subset of pixels associated with each disk image, optionally combining or filtering their values, and aggregating the light field data in and/or generating an image array in order to construct an image which is lower-resolution relative to images generated using more or all of the light field data acquired by light field sensor 14. The lower resolution image (which may be generated more rapidly than a higher resolution image using more of the light field image data) may be provided to the user interface 36 for display to the user or operator during the live-view process.

Figure 20:
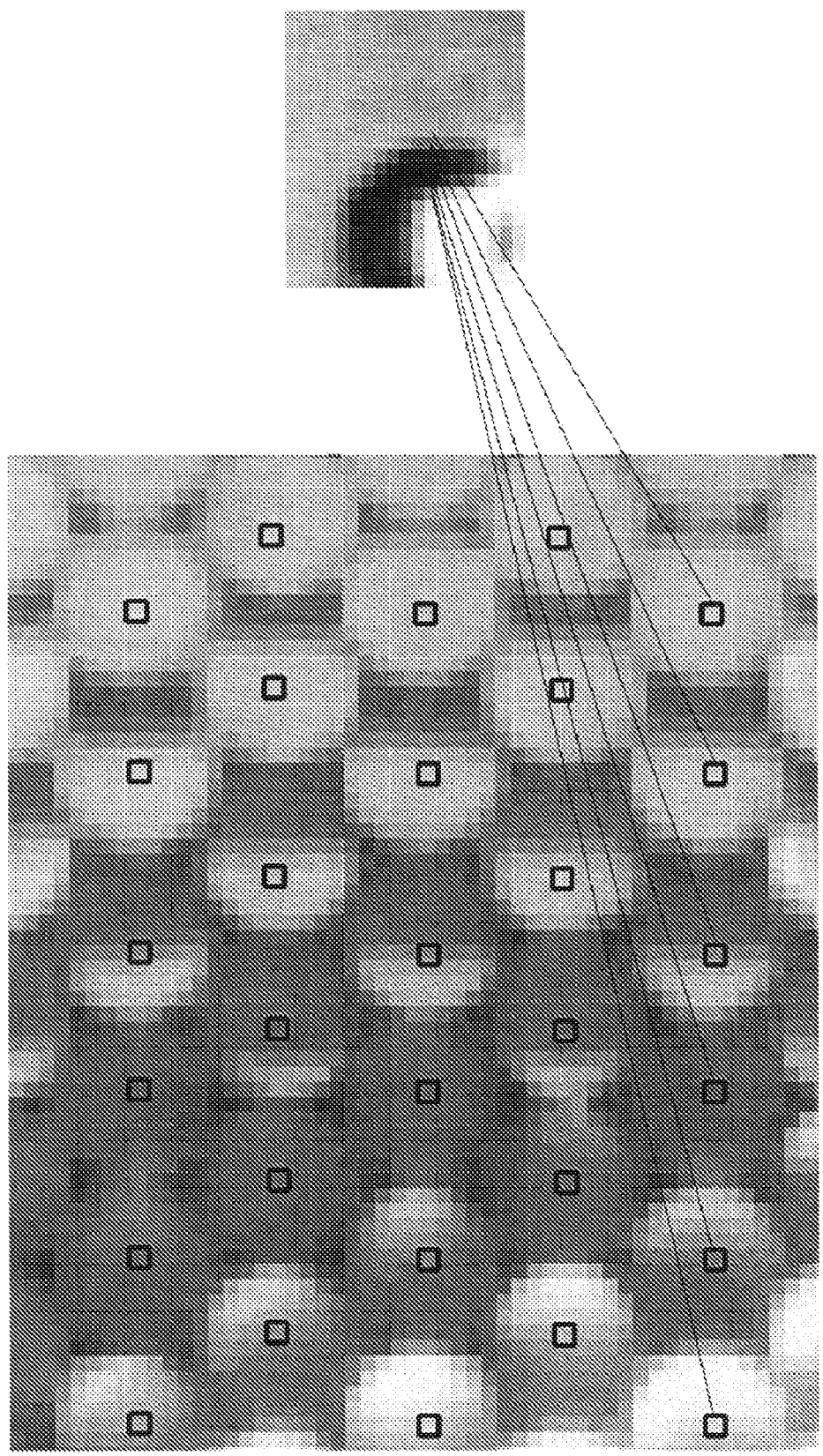
FIG. 20 is an illustration indicating how a pixel from or under each microlens may be selected to create or form an image of a scene with a large depth of field for example, for "live" view; notably, the image on the left is a zoomed and magnified section of a light field image with pixel near center of each projected microlens disk highlighted; the black box near the center of each disk is a representation of an exemplary technique of selecting a pixel near or at the center and the lines and image on the right conceptually demonstrate how the individual pixels from the disk centers (in this exemplary embodiment) may be assembled into a final image that may be employed, for example, in connection with "live" view.

In one exemplary embodiment, the subset of pixels of each disk may be those pixels near the center regions of disk images, for example, the center 50% of the pixels. In another exemplary embodiment, with reference to FIG. 20, the pixel nearest to the center of each microlens "disk image" may be selected and a small live-view frame may be computed where the value for each pixel in the live view frame is the value of the pixel nearest the center of the corresponding "disk image". In this way, this technique may produce a low-resolution image with a depth of field that extends over the entire refocusing range. Notably, where the light field data acquisition device includes a fixed-focus configuration or architecture (for example, a refocusing range from some close distance to infinity), the depth of field of the generated image approximately extends from the same close distance to infinity. Indeed, the sub-sampled image may be re-sampled into a desired output resolution that matches the display for live-view.

Narrow Depth of Field by Down-Sampling One or More Entire Disks: In another embodiment, the light field data acquisition device may down-sample pixels across entire disks into, and aggregate the resulting down-sampled pixels into a 2D array to construct an output image. Moreover, in certain embodiments, partially-illuminated disk edge pixels may be discarded or scaled up to full intensity. This technique may provide or yield a live-view image that has better signal to noise characteristics.

Figure 19A:
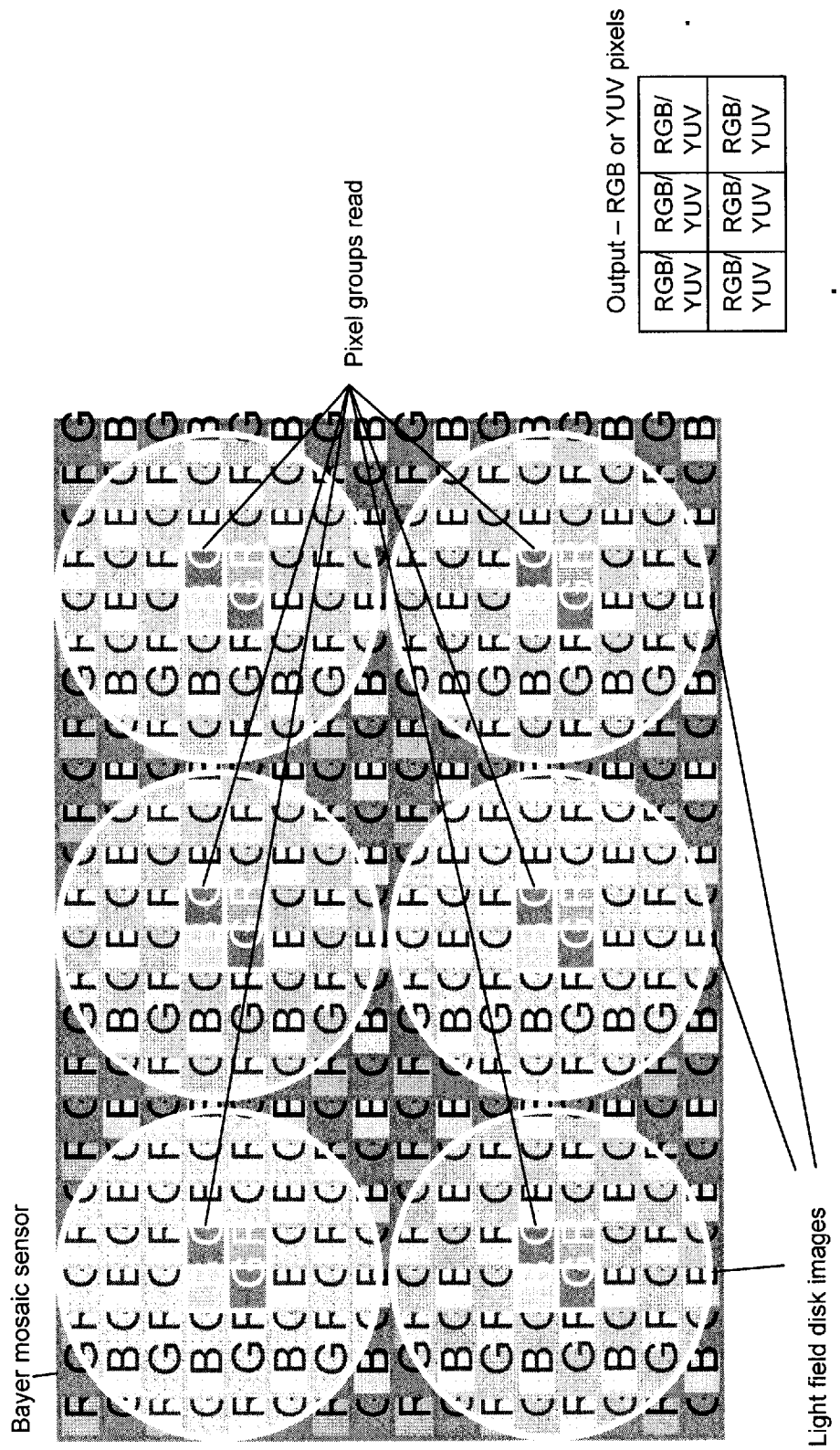
FIG. 19A is an illustration of a readout mode on a light field sensor that combines the center four pixels in each light field disk image and generates an RGB or YUV image from the data.
Figure 19B:
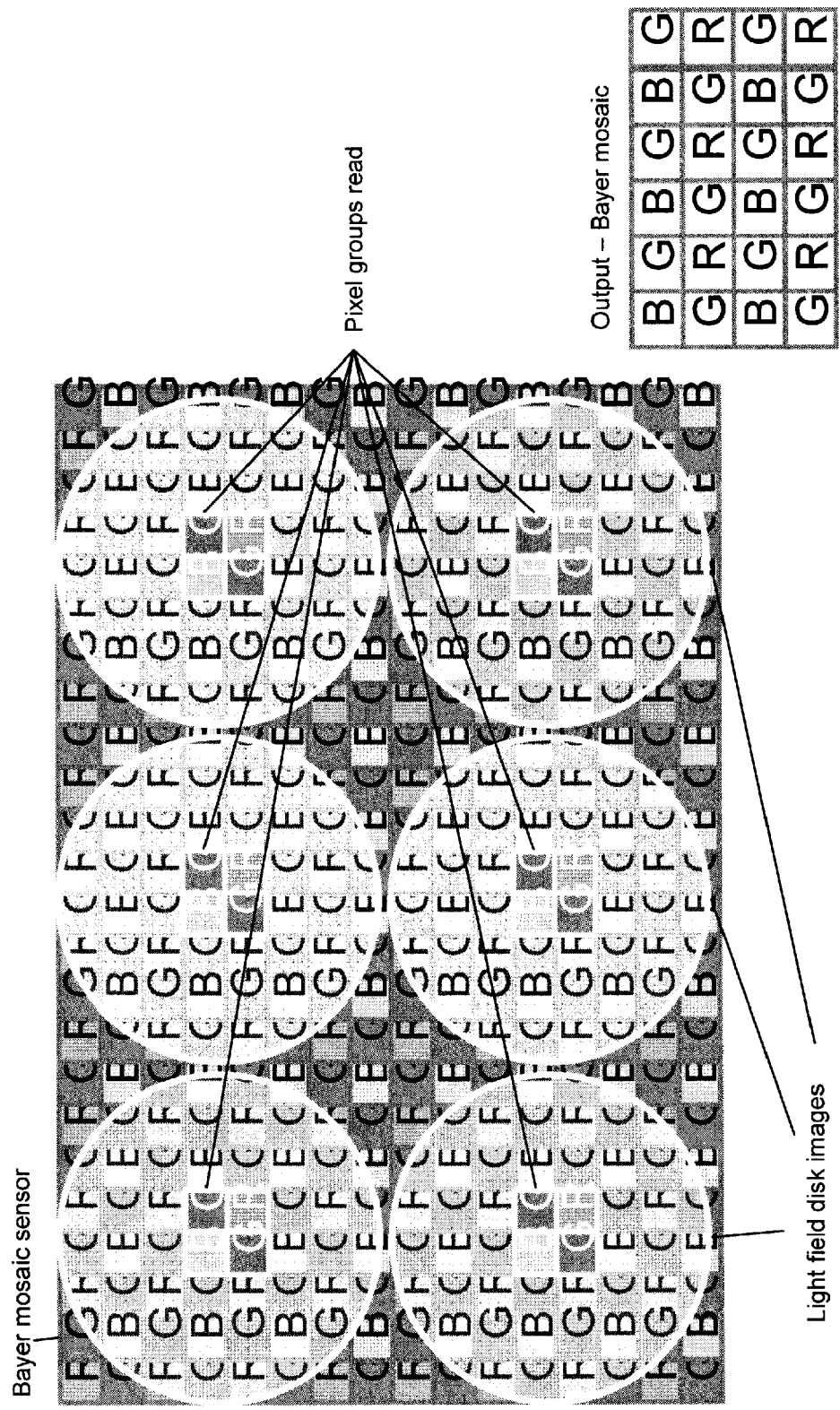
FIG. 19B is an illustration of a readout mode on a light field sensor that reads the center four pixels in each light field disk image and generates a smaller Bayer pattern mosaic image from the data.

In another exemplary embodiment, the light field image sensor may contain readout mode(s) in order to allow a higher frame rate, to generate preview frames, to generate frames for video recording, and/or to generate narrow depth of field frames directly from sensor data. Briefly, conventional image sensors may contain a plurality of readout modes which may fully sample, sub-sample, and/or combine pixel data to output a plurality of image sizes at a plurality of frame rates and generally each mode may have differing speeds and power requirements. Depending on how the conventional digital camera is being used (for example, acquiring a still picture at a certain resolution, displaying live view, or recording video), a different readout mode may be used. In some embodiments, the light field sensor and microlens array may be designed and/or manufactured in tandem to allow precise alignment of microlens elements to the sensor readout mode(s). In another embodiment, the light field sensor may allow sufficient readout mode configuration flexibility to be tuned after manufacturing and/or image data may undergo additional post-processing before or after the read out. In another embodiment, the light field sensor may have a readout mode that reads one or multiple pixel data from all or alternating rows and all or alternating columns of light field disk images which later may undergo either (a) combining the pixels by color (e.g. R is combined with R, G with G, B with B), resulting in reduced resolution of sensor readout pattern (e.g. Bayer mosaic) or (b) combining the pixels (e.g. 2 green pixels, 1 red and 1 blue) to create single RGB, YUV or any other color image representation format or (c) combining the pixels to create a grayscale output image (e.g. luminance component only) or (d) data is readout without further down-sampling (i.e. without combining pixels), maintaining sensor pattern output (e.g. Bayer mosaic), which may contain less pixels than the full sensor pattern. In one specific embodiment, and with reference to FIG. 19A, the sensor 16 may have a readout mode that may output a single RGB or YUV value for each light field disk image, combining the four pixel values nearest the center of each light field disk image (for example, 2 green pixels, 1 red and 1 blue). In another specific embodiment, the light field sensor may have a readout mode that reads a single pixel value (for example, R, G or B) and combines values for 4 neighboring light field disk images to create an RGB or YUV value. In another embodiment, with reference to FIG. 19B, the light field sensor may have a readout mode that reads out the four pixels values nearest the center of each light field disk image (for example, 2 green pixels, 1 red and 1 blue), and then combine this readout without combining pixel values, into another Bayer mosaic pattern that may contain less pixels than the full sensor pattern. Indeed, there are many readout modes that may be desirable when reading from a light field sensor, and any readout mode now known or later developed that couples a readout pattern to the pattern of light field disk images is intended to fall within the scope of the present inventions.

Automatic Focusing after the Shot

In another aspect, the present inventions are directed to system 100 including post-processing circuitry 102 that automatically computes one or more images for display after acquisition of the light field image data (i.e., after the shot is taken). (See, for example, FIG. 3F, wherein light field data acquisition device 10 may be or include any of the embodiments described and/or illustrated herein). In one embodiment, light field data acquisition device 10 acquires, captures and/or samples light field image data using, for example, a fixed or simplified physical focus, and, post-processing circuitry 102, implementing one or more after-the-shot focusing techniques, determines one or more images to compute and/or generate. Thereafter, the one or more images may be displayed to a user or operator, for example, via a display of, for example, user interface 36 or external display (for example, through a data output port on the data acquisition device or system). (See, for example, FIGS. 3B-3E).

Notably, in addition thereto, or in lieu thereof, system 100 may store the light field data and/or the processed data (for example, the refocused data) which is representative of the one or more images may be stored in or saved to internal or external memory (for example, external storage such as a FLASH memory card—see, for example, FIG. 3E). The system 100 may store the "raw" refocusable light field data (as output from light field sensor 14) and/or a representation thereof (for example, a compressed refocusable light field data, multiple light field data (for example, a plurality images of the same scene, each image being refocused at different a focal plane) and/or combinations thereof). Moreover, the system 100 may store the light field data or representations thereof (for example, one or more images that are generated using the light field data) using one or more of the embodiments of U.S. Provisional Patent Application Ser. No. 61/170,620, filed Apr. 18, 2009, entitled "Light Field Camera Image, File and Configuration Data, and Method of Using, Storing and Communicating Same," which, as noted above, is incorporated herein in its entirety by reference. All permutations and combinations of data storage formats of the light field data or representations thereof (for example, one or more images that are generated using the light field data) are intended to fall within the scope of the present inventions.

In another embodiment, system 100 may generate a plurality of images, via after-the-shot focusing and acquired or collected light field data or information, and thereafter automatically generate and produce an animation thereof to, for example, the user or operator, via a display on the light field data acquisition device or external display (for example, through a data output port on the device or system, and/or data networks and the internet). (See, for example, FIGS. 3E and 3F). In one embodiment, system 100 may generate an animation that adjusts focus between automatically or manually designated subjects of interest. For each subject of interest, the system adds a transition animation from an initial focus depth to the focus depth of the subject of interest, pauses for a time, and transitions to the next subject of interest.

Figure 16:
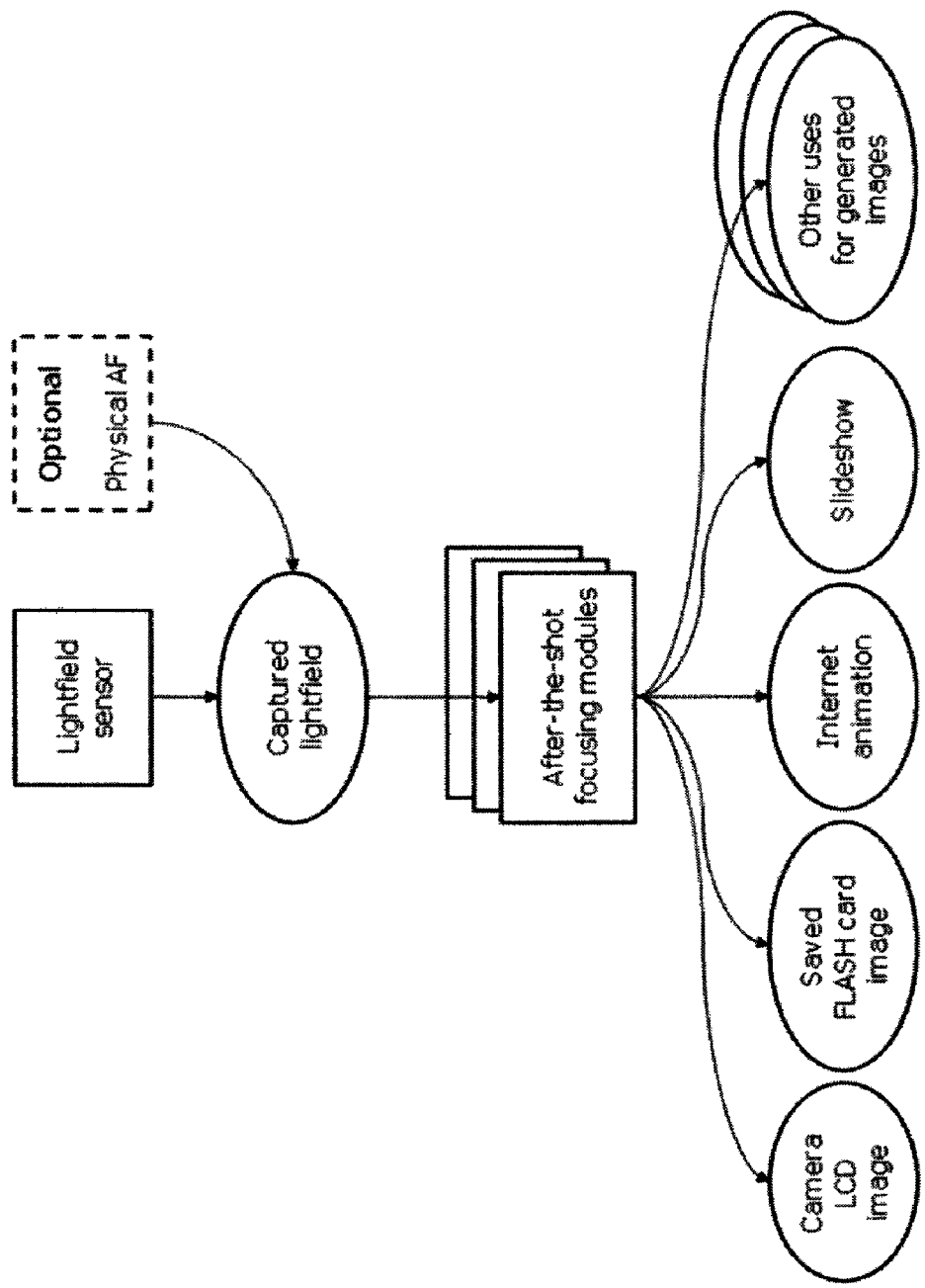
FIG. 16 illustrates, in a block diagram manner, certain aspects of a plurality of exemplary operations, functions and/or embodiments of after-the-shot focusing or refocusing.

In yet another embodiment, system 100 may generate a plurality of images, using after-the-shot focusing, and use the plurality of images to automatically generate a slideshow of the plurality of images. The slideshow may contain still images generated and/or produced using similar modules. As discussed above, the images may be provided to an internal and/or external display (for example, an LCD or the like on the light field data acquisition device) and/or internal and/or external memory (for example, FLASH memory card). Indeed, the display and/or memory may display or contain animations similar to the animations mentioned above, and, in certain embodiments, may combine images and animations from multiple light fields to produce new images and animations. FIG. 16 illustrates, in a block diagram manner, certain aspects of the plurality of the embodiments of system 100, including after-the-shot focusing embodiments, techniques and/or operations performed thereby. Notably, system 100 may employ any technique now known or later developed to implement any of the after-the-shot focusing embodiments. For example, system 100 (for example, light field data acquisition device 10 or post-processing circuitry 102) may implement scene analysis to compute or provide one or more images. In this regard, the data acquisition device 10 may implement:

Scene analysis to perform automatic focus selection; and/or

Scene analysis to perform automatic aperture (i.e., Depth of Field) selection; and/or Scene analysis to perform automatic tilt/shift selection.

In one embodiment, system 100 (for example, light field data acquisition device 10 or post-processing circuitry 102 may implement the following technique:

generate a stack of images that are focused at different scene depths from, for example, a minimum close distance to infinity;

thereafter, analyze each image in order to compute a measure of importance of the subjects contained in the image; and thereafter, output the image that has the highest measure of importance.

Notably, a variation on this approach outputs an image that is a result of compositing the high-importance regions from a number of frames.

In addition to scene analysis, or in lieu thereof, system 100 (for example, light field data acquisition device 10 and/or post-processing circuitry 102) may perform light field scene analysis to implement any of the after-the-shot focusing embodiments. Indeed, any light field scene analysis technique now known or later developed is intended to fall within the scope of the present inventions. For example, the light field data acquisition device or system may implement:

Face-detection: identify where in the captured image faces are (for example, using a suitably configured Haar cascade classifier). In general, identify where human-related features are (e.g.) smile detection, etc; and/or Face-recognition: identify presence and location of known individuals in the captured image, potentially using a database that contains computed characteristics of known individuals' faces. Any facial recognition method now known or later developed may be used, including principal component analysis (PCA) or elastic bunch graph matching (EBGM); and/or Focus analysis: for a given image region (e.g., a face) determine where it is in focus; and/or Focus analysis: for a given image region at a certain focus depth, determine how in-focus (or the degree of focus) the image or region thereof is.

In another embodiment, system 100 (for example, light field data acquisition device 10 or post-processing circuitry 102) may assess and/or determine the focus and depth of field based on evaluating whether the image includes one or more faces and—if there are faces in the image, choose the focus depth to make or bring one or more of the faces (for example, the largest face) into a predetermined focus (for example, in-focus); otherwise extend the depth of field as far as possible.

Alternatively, system 100 (for example, light field data acquisition device 10 or post-processing circuitry 102) may assess and/or determine the focus and depth of field based on evaluating whether there are a plurality of faces and—if so, select or choose the focus depth that is in the middle of the closest and furthest faces, and extend the depth of field only as far as is required to bring all faces into a predetermined focus (for example, in-focus); otherwise, extend the depth of field (for example, as far as possible).

Notably, any method or technique for ranking the contents of a scene in terms of importance, and then choosing the focus and depth of field based on the importance and focus depths of the scene's contents, may be used. Indeed, several of the analysis methods or techniques disclosed in U.S. patent application Ser. No. 12/622,655 ("System of and Method for Video Refocusing", filed Nov. 20, 2009). All such methods or techniques, now known or later developed, are intended to fall within the scope of the present inventions. For example, computation of the measure of importance may be determined as follows:

A face detection method is used on each image in the stack.

If one of more focused faces are detected in an image, then the measure of importance is the area of the focused faces in the image.

If no faces are detected in the image, then the measure of importance is the area of the image that is in-focus.

Interaction for User-Guided Focus

In another aspect, the present inventions are directed to a system including circuitry and/or performing techniques that enables the operator or user to interact with the system 100 (for example, light field data acquisition device 10 or post-processing circuitry 102) to control final image processing. In one embodiment, the user or operator may determine the final output image(s), for example, using the after-the-shot focusing. The after-the-shot focusing may implement the techniques described in "Interactive Refocusing of Electronic Images", U.S. patent application Ser. No. 11/948,901, filed Nov. 30, 2007 (U.S. Patent Application Publication 2008/0131019), which is incorporated herein in its entirety by reference. For example, system 100 (for example, light field data acquisition device 10 or post-processing circuitry 102) may employ one or more of the following:

- Selection of which objects/subjects to focus on, for example by clicking on the desired portion of the image displayed on a touch screen on the device; and/or
- Selection of the depth of field to use; and/or
- In general, selection of any parameter that may be described herein as being automatically determined; accordingly, such parameter may be selected manually and, for the sake of brevity, such discussion will not be repeated in this context.

Notably, in the exemplary embodiments hereof, the data processing, analyses, computations, generations and/or manipulations may be implemented in or with circuitry disposed (in part or in whole) in/on the data acquisition device or in/on an external processing system. Such circuitry may include one or more microprocessors, Application-Specific Integrated Circuits (ASICs), digital signal processors (DSPs), and/or programmable gate arrays (for example, field-programmable gate arrays (FPGAs)). Indeed, the circuitry may be any type or form of circuitry whether now known or later developed. For example, the signal processing circuitry may include a single component or a multiplicity of components (microprocessors, FPGAs, ASICs and DSPs), either active and/or passive, which are coupled together to implement, provide and/or perform a desired operation/function/application; all of which are intended to fall within the scope of the present invention.

Further, as mentioned above, in operation, the processing circuitry may perform or execute one or more applications, routines, programs and/or data structures that implement particular methods, techniques, tasks or operations described and illustrated herein (for example, acquiring and/or editing the refocusable light field data and/or generating or rendering output image data corresponding to refocusable light field data using one, some or all of the aforementioned acquisition, editing and/or generating techniques). The operations of the applications, routines or programs may be combined or distributed. Further, the processing circuitry may implement one or more, or all of such techniques in any combination and all permutations; such techniques may be employed alone or in combination with one or more of the other techniques of acquiring and/or editing the refocusable light field data and/or generating or outputting image data corresponding to refocusable light field data. The techniques, methods and/or applications may be implemented by the processing circuitry using any programming language whether now known or later developed, including, for example, assembly, FORTRAN, C, C++, and BASIC, whether compiled or uncompiled code; all of which are intended to fall within the scope of the present invention.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the above embodiments of the inventions are merely exemplary. They are not intended to be exhaustive or to limit the inventions to the precise forms, techniques, materials and/or configurations disclosed. Many modifications and variations are possible in light of this disclosure. It is to be understood that other embodiments may be utilized and operational changes may be made without departing from the scope of the present inventions. As such, the scope of the inventions is not limited solely to the description above because the description of the above embodiments has been presented for the purposes of illustration and description.

As noted above, there are many inventions described and illustrated herein. While certain embodiments, features, materials, configurations, attributes and advantages of the inventions have been described and illustrated, it should be understood that many other, as well as different and/or similar embodiments, features, materials, configurations, attributes, structures and advantages of the present inventions that are apparent from the description, illustration and claims. As such, the embodiments, features, materials, configurations, attributes, structures and advantages of the inventions described and illustrated herein are not exhaustive and it should be understood that such other, similar, as well as different, embodiments, features, materials, configurations, attributes, structures and advantages of the present inventions are within the scope of the present invention.

Importantly, each of the aspects of the present invention, and/or embodiments thereof, may be employed alone or in combination with one or more of such other aspects and/or embodiments. For the sake of brevity, those permutations and combinations will not be discussed separately herein. Indeed, the present inventions are not limited to any single aspect or embodiment thereof nor to any combinations and/or permutations of such aspects and/or embodiments.

As such, the above embodiments of the present inventions are merely exemplary embodiments. They are not intended to be exhaustive or to limit the inventions to the precise forms, techniques, materials and/or configurations disclosed. Many modifications and variations are possible in light of the above teaching. It is to be understood that other embodiments may be utilized and operational changes may be made without departing from the scope of the present inventions. As such, the foregoing description of the exemplary embodiments of the inventions has been presented for the purposes of illustration and description of exemplary embodiments. Many modifications and variations are possible in light of the above teaching. It is intended that the scope of the inventions not be limited solely to the description above.

It should be noted that the term "circuit" may mean, among other things, a single component (for example, electrical/electronic) or a multiplicity of components (whether in integrated circuit form or otherwise), which are active and/or passive, and which are coupled together to provide or perform a desired function. The term "circuitry" may mean, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" may mean, among other things, a current or voltage signal(s) (plural or singular) whether in an analog or a digital form, which may be a single bit (or the like) or multiple bits (or the like).

It should be further noted that the various circuits and circuitry disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

What is claimed is:

1. A light field imaging device for acquiring light field image data of a scene, the device comprising:
   optics, wherein the optics includes an optical path and a focal point, wherein the focal point is associated with a focal length of the optics;
   a light field sensor, located (i) in the optical path of the optics to acquire light field image data and (ii) at a substantially fixed, predetermined location relative to the focal point of the optics, wherein the predetermined location is substantially independent of the scene, and wherein an optical depth of field of the optics with respect to the light field sensor extends to a depth that is closer than optical infinity;
   a user interface to receive a plurality of user inputs, including first and second user inputs, wherein, in response to the first user input, the light field sensor acquires the light field image data of the scene; and
   processing circuitry, coupled the user interface, to generate and output image data which is representative of an image, the processing circuitry to:
      determine a first virtual focus depth of the light field image data, wherein the first virtual focus depth is different from the optical focus depth of the light field image data,
      automatically generate data which is representative of a first image of the scene using the light field image data, wherein the first image includes a focus which corresponds to the first virtual focus depth,
      output the data which is representative of the first image, and, after outputting the data which is representative of the first image and in response to the second user input,
         determine a second virtual focus depth of the light field image data using data which is representative of the second user input, wherein the second user input is indicative of the second virtual focus depth and the second virtual focus depth is different from the optical focus depth of the light field image data, and
         generate data which is representative of a second image of the scene using the light field image data wherein the second image includes a focus which corresponds to the second virtual focus depth.

2. The light field imaging device of claim 1 wherein the optics is configurable to include a plurality of different focal lengths having associated focal points.

3. The light field imaging device of claim 2 wherein the substantially fixed, predetermined location of the light field sensor, relative to the focal point of the optics, changes in accordance with the focal length of the optics.

4. The light field imaging device of claim 1 wherein the optics includes a zoom lens system having a plurality of zoom positions.

5. The light field imaging device of claim 4 further including a mechanical system, coupled to the light field sensor, to maintain the light field sensor unit at the same fixed, predetermined location relative to the focal point of the optics for the plurality of the zoom positions.

6. The light field imaging device of claim 4 wherein the zoom lens system includes a continuous zoom providing the plurality of zoom positions.

7. The light field imaging device of claim 4 wherein the light field sensor maintains the predetermined location relative to the focal point of the optics for the plurality of the zoom positions of the zoom lens system.

8. The light field imaging device of claim 4 further including a mechanical system, coupled to the light field sensor and/or the optics, to maintain the light field sensor unit at the predetermined location relative to the focal point of the optics for the plurality of the zoom positions of the zoom lens system.

9. The light field imaging device of claim 8 further including:
   a spatial adjustment unit, coupled to the light field sensor and/or the optics, to responsively move the light field sensor unit; and
   control circuitry, coupled to the spatial adjustment unit, to control the spatial adjustment unit to maintain the light field sensor unit at the predetermined location relative to the focal point of the optics.

10. The light field imaging device of claim 9 further including memory, coupled to the control circuitry, to store data which is representative of a plurality of locations of the light field sensor corresponding to a plurality of associated zoom positions.

11. The light field imaging device of claim 9 further including memory, coupled to the control circuitry, wherein the memory includes a database or lookup table which correlates a plurality of locations of the light field sensor according to a plurality of associated zoom positions.

12. The light field imaging device of claim 11 wherein the control circuitry accesses the database or lookup table having data which is representative of the location based on the zoom position of the zoom lens system and generates control signal which are applied to the spatial adjustment unit to responsively move the light field sensor unit.

13. The light field imaging device of claim 8 wherein, in response, to outputting the first image, the user interface receives the second user input which is indicative of the second virtual focus depth.

14. The light field imaging device of claim 1 further including a mechanical system, coupled to the light field sensor and/or the optics, to maintain the light field sensor unit at the predetermined location relative to the focal point of the optics for a plurality of focuses of the optics.

15. The light field imaging device of claim 14 wherein the mechanical system is active.

16. The light field imaging device of claim 1 wherein the optics is configurable to include a plurality of zoom positions which provide a plurality of different focal lengths having associated focal points and the device further includes a mechanical system, coupled to the light field sensor, to maintain the light field sensor unit at the same fixed, predetermined location relative to the focal point of the optics for the plurality of focuses.

17. The light field imaging device of claim 16 wherein the mechanical system is active or passive.

18. The light field imaging device of claim 1 wherein the user interface includes a display to (i) receive the data which is representative of the first image and (ii) output the first image.

19. The light field imaging device of claim 1 further including memory, coupled to the processing circuitry, to store the data which is representative of the second image.

20. The light field imaging device of claim 1 wherein the processing circuitry computes output images having an array of output pixels, and wherein the light field sensor includes (i) a microlens array having a plurality of microlenses and (ii) a sensor having an array of sensor pixels, and wherein the predetermined distance is between $(0.7*N_{usable}*W_{MLA}*F\#_{optics}*m)/(W_{output})$ and $(3.0*N_{usable}*W_{MLA}*F\#_{optics}*m)/(W_{output})$,
where:
$N_{usable}$ is equal to the number of pixels containing usable directional information across a microlens disk image that is formed, through each microlens, on the sensor, or are located under a microlens,
$W_{MLA}$ is representative of a number of microlenses across a width of the microlens array,
$W_{output}$ is representative of a number of pixels across a width of the array of output pixels,
m is equal to a distance between the centers of two neighboring microlenses in the microlens array, and
$F\#_{optics}$ is equal to an F-number of the optics.

21. The light field imaging device of claim 1 wherein the light field sensor includes (i) a microlens array having a plurality of microlenses and (ii) a sensor having an array of pixels, and wherein the predetermined distance is greater than $(m*F\#_{optics})$,
where:
m is equal to the distance between the centers of two neighboring microlenses in the microlens array, and
$F\#_{optics}$ is equal to an F-number of the optics.

22. The light field imaging device of claim 1 wherein the light field sensor includes (i) a microlens array having a plurality of microlenses and (ii) a sensor having an array of pixels, and wherein the predetermined distance is less than $(N_{usable}*m*F\#_{optics})$,
where:
$N_{usable}$ is equal to the number of pixels containing usable directional information across a microlens disk image that is formed, through each microlens, on the sensor, or are located under a microlens,
m is equal to the distance between the centers of two neighboring microlenses in the microlens array, and
$F\#_{optics}$ is equal to an F-number of the optics.

23. A light field imaging device for acquiring light field image data of a subject in a scene, wherein the subject is in a focal plane, the device comprising:
optics, wherein the optics includes an optical path, an optical depth of field and an autofocus mechanism, wherein the autofocus selects between a plurality of focuses including a first focus which is related to a focal plane of the subject;
a light field sensor, located (i) in the optical path of the optics to acquire light field image data and (ii) at a predetermined location, relative to the optics, during acquisition of the light field data, wherein the predetermined location is at a substantially fixed separation relative to the focal plane corresponding to the subject, and wherein the focal plane of the subject is outside of the optical depth of field of the optics with respect to the light field sensor; and
processing circuitry to generate an output image data which is representative of an image including the subject in the scene, the processing circuitry to:
determine a virtual focus depth of the light field image data, wherein the virtual focus depth is different from the optical focus depth of the light field image data, and
automatically generate data which is representative of the image of the scene using the light field image data and data which is representative of the virtual focus depth, wherein the image includes a focus which corresponds to the virtual focus depth.

24. The light field imaging device of claim 23 further including memory, coupled to the processing circuitry, to store the data which is representative of the image of the scene.

25. The light field imaging device of claim 23 further including:
a user interface to receive a plurality of user inputs, including first and second user inputs, wherein, in response to the first user input, the light field sensor acquires the light field image data of the scene; and
wherein the processing circuitry outputs the data which is representative of the image of the scene, and, after outputting the data which is representative of the image of the scene and in response to the second user input,
determines a final virtual focus depth of the light field image data using data which is representative of the second user input, wherein the second user input is indicative of the final virtual focus depth, and
generates data which is representative of the final image of the scene using the light field image data wherein the final image includes a focus which corresponds to the final virtual focus depth.

26. The light field imaging device of claim 23 further including control circuitry and wherein:
the autofocus mechanism includes an autofocus image sensor to acquire focus data,
the control circuitry determines focus metrics using the focus data, and
the optics includes a second optics to provide at least a portion of the light in the optical path onto the autofocus image sensor.

27. A light field imaging device for acquiring light field image data of a subject in a scene, wherein the subject is in a focal plane, the device comprising:
optics, wherein the optics includes an optical path, an optical depth of field and an autofocus mechanism, wherein the autofocus selects between a plurality of focuses including a first focus which is related to a focal plane of the subject;

a light field sensor, located (i) in the optical path of the optics to acquire light field image data and (ii) at a predetermined separation, relative to the optics, during acquisition of the light field data, wherein the focal plane of the subject is outside of the optical depth of field of the optics with respect to the light field sensor;

control circuitry to adjust the separation between the light field sensor and the optics between a plurality of discrete, fixed-focus separations, wherein each discrete separation provides a refocusing range of the light field image data; and processing circuitry to generate an output image data which is representative of an image including the subject in the scene, the processing circuitry to:

determine a virtual focus depth of the light field image data, wherein the virtual focus depth is different from the optical focus depth of the light field image data, and automatically generate data which is representative of the image of the scene using the light field image data and data which is representative of the virtual focus depth, wherein the image includes a focus which corresponds to the virtual focus depth.

28. The light field imaging device of claim 27 wherein the discrete, fixed-focus separations overlap in refocusing range of the light field image data.

29. The light field imaging device of claim 27 wherein the control circuitry selects a discrete, fixed-focus separation based on which of the discrete, fixed-focus separations provides a range of refocusing which is the furthest towards optical infinity and the in-focus plane of the subject is within the range of refocusing of the selected discrete, fixed-focus separation.

30. The light field imaging device of claim 29, wherein:
the autofocus mechanism includes an autofocus image sensor to acquire focus data, wherein the control circuitry determines focus metrics using the focus data, and
the optics includes a second optics to divert at least a portion of the light in the optical path onto the autofocus image sensor.

31. The light field imaging device of claim 27 further including:
a user interface to receive a plurality of user inputs, including first and second user inputs, wherein, in response to the first user input, the light field sensor acquires the light field image data of the scene; and
wherein the processing circuitry outputs the data which is representative of the image of the scene, and, after outputting the data which is representative of the image of the scene and in response to the second user input,
determines a final virtual focus depth of the light field image data using data which is representative of the second user input, wherein the second user input is indicative of the final virtual focus depth, and
generates data which is representative of the final image of the scene using the light field image data wherein the final image includes a focus which corresponds to the final virtual focus depth.

32. The light field imaging device of claim 27 further including control circuitry and wherein:
the autofocus mechanism includes an autofocus image sensor to acquire focus data,
the control circuitry determines focus metrics using the focus data, and
the optics includes a second optics to provide at least a portion of the light in the optical path onto the autofocus image sensor.

33. A light field imaging device for acquiring light field image data of a scene, wherein the light field image device includes a maximum output image resolution, the device comprising:
optics, wherein the optics includes an optical path and a focal point;
a light field sensor, located (i) in the optical path of the optics to acquire light field image data and (ii) at a substantially fixed location relative to the focal point of the optics, wherein the substantially fixed location: (a) is substantially independent of the scene and (b) creates an optical depth of field of the optics with respect to the light field sensor that extends to a depth that is closer than optical infinity; and
processing circuitry to generate and output image data which is representative of an output image of the scene, the processing circuitry to:
determine a virtual focus depth of the light field image data, wherein the virtual focus depth is different from the optical focus depth of the light field image data, and
automatically generate data which is representative of the output image of the scene using the light field image data and data which is representative of the virtual focus depth, wherein the output image includes a focus which corresponds to the virtual focus depth; and
wherein the light field sensor, which is located at the substantially fixed location relative to the focal point of the optics, acquires light field image data which corresponds to an output image of the scene which includes a virtual focus of optical infinity and a resolution in lines per picture height (LPH) that is at least 0.5 times the maximum output image resolution of the light field imaging device.

34. The light field imaging device of claim 33 wherein the maximum output image resolution of the device is a number of rows of pixels in an image output by the device.

35. The light field imaging device of claim 33 wherein maximum output image resolution of the device is the maximum resolution in LPH of any image output by the device virtually refocused to any subject depth.

36. The light field imaging device of claim 33 wherein the light field sensor, which is located at the substantially fixed location relative to the focal point of the optics, acquires light field image data which corresponds to an output image of the scene which includes a focus of optical infinity and a resolution in lines per picture height (LPH) that is less than 0.8 times the maximum output image resolution of the light field imaging device.

* * * * *